United States Patent
Park et al.

(10) Patent No.: US 12,047,169 B2
(45) Date of Patent: **\*Jul. 23, 2024**

(54) METHOD OF TRANSMITTING UPLINK CONTROL INFORMATION BY USER EQUIPMENT IN WIRELESS COMMUNICATION SYSTEM AND DEVICE FOR SUPPORTING SAME

(71) Applicant: LG ELECTRONICS INC., Seoul (KR)

(72) Inventors: Hanjun Park, Seoul (KR); Suckchel Yang, Seoul (KR); Joonkui Ahn, Seoul (KR); Seonwook Kim, Seoul (KR); Changhwan Park, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

This patent is subject to a terminal disclaimer.

(21) Appl. No.: 18/219,250

(22) Filed: Jul. 7, 2023

(65) Prior Publication Data
US 2023/0353276 A1 Nov. 2, 2023

Related U.S. Application Data

(63) Continuation of application No. 17/573,065, filed on Jan. 11, 2022, now Pat. No. 11,742,981, which is a
(Continued)

(51) Int. Cl.
*H04L 1/00* (2006.01)
*H04L 1/06* (2006.01)
(Continued)

(52) U.S. Cl.
CPC .............. *H04L 1/0026* (2013.01); *H04L 1/00* (2013.01); *H04L 1/0067* (2013.01);
(Continued)

(58) Field of Classification Search
CPC ....... H04L 1/0026; H04L 1/00; H04L 1/0067; H04L 1/0693; H04L 1/1607; H04L 5/00;
(Continued)

(56) References Cited

U.S. PATENT DOCUMENTS

| 2015/0003302 A1* | 1/2015 | Ekpenyong | ........... H04L 1/1861 |
| | | | 370/280 |
| 2016/0006548 A1* | 1/2016 | Yang | ................. H04W 72/0446 |
| | | | 370/329 |

(Continued)

FOREIGN PATENT DOCUMENTS

| CN | 102223215 | 10/2011 |
| CN | 103858370 | 6/2014 |

(Continued)

OTHER PUBLICATIONS

The State Intellectual Property Office of the People's Republic of China Application Serial No. 201880008967.0, Publication of Registration dated Jan. 23, 2024, 114 pages.

(Continued)

*Primary Examiner* — Sharmin Chowdhury
(74) *Attorney, Agent, or Firm* — LEE, HONG, DEGERMAN, KANG & WAIMEY

(57) ABSTRACT

The present invention discloses a method of transmitting uplink control information by a user equipment in a wireless communication system and device for supporting the same. Specifically, the present invention discloses a method by which a user equipment maps uplink control information to a physical uplink shared channel when the user equipment intends to transmit the uplink control information on the physical uplink shared channel and transmission operation for the uplink control information based on the same.

20 Claims, 45 Drawing Sheets

Related U.S. Application Data continuation of application No. 16/706,516, filed on Dec. 6, 2019, now Pat. No. 11,316,615, which is a continuation of application No. 16/065,073, filed as application No. PCT/KR2018/001499 on Feb. 5, 2018, now Pat. No. 10,530,528.

(60) Provisional application No. 62/620,391, filed on Jan. 22, 2018, provisional application No. 62/616,463, filed on Jan. 12, 2018, provisional application No. 62/592,312, filed on Nov. 29, 2017, provisional application No. 62/591,147, filed on Nov. 27, 2017, provisional application No. 62/590,638, filed on Nov. 26, 2017, provisional application No. 62/586,872, filed on Nov. 15, 2017, provisional application No. 62/577,743, filed on Oct. 27, 2017, provisional application No. 62/576,071, filed on Oct. 23, 2017, provisional application No. 62/570,594, filed on Oct. 10, 2017, provisional application No. 62/566,561, filed on Oct. 2, 2017, provisional application No. 62/566,343, filed on Sep. 30, 2017, provisional application No. 62/560,657, filed on Sep. 19, 2017, provisional application No. 62/555,688, filed on Sep. 8, 2017, provisional application No. 62/543,967, filed on Aug. 11, 2017, provisional application No. 62/524,482, filed on Jun. 24, 2017, provisional application No. 62/520,519, filed on Jun. 15, 2017, provisional application No. 62/505,178, filed on May 12, 2017, provisional application No. 62/501,066, filed on May 3, 2017, provisional application No. 62/457,833, filed on Feb. 11, 2017, provisional application No. 62/454,878, filed on Feb. 5, 2017.

(51) Int. Cl.
*H04L 1/1607* (2023.01)
*H04L 5/00* (2006.01)
*H04L 27/26* (2006.01)
*H04W 72/1268* (2023.01)
*H04W 72/21* (2023.01)

(52) U.S. Cl.
CPC .......... *H04L 1/0693* (2013.01); *H04L 1/1607* (2013.01); *H04L 5/00* (2013.01); *H04L 27/2602* (2013.01); *H04W 72/1268* (2013.01); *H04W 72/21* (2023.01); *H04L 5/0051* (2013.01); *H04L 27/26025* (2021.01); *H04L 27/26035* (2021.01)

(58) Field of Classification Search
CPC .............. H04L 27/2602; H04L 5/0051; H04L 27/26025; H04L 27/26035; H04L 5/0057; H04L 1/1861; H04L 5/0055; H04L 1/0068; H04L 5/0053; H04W 72/1268; H04W 72/21
See application file for complete search history.

(56) References Cited

U.S. PATENT DOCUMENTS

| | | | | |
|---|---|---|---|---|
| 2018/0167931 | A1* | 6/2018 | Papasakellariou | .... H04L 1/1861 |
| 2019/0069322 | A1* | 2/2019 | Davydov | .............. H04L 5/0091 |
| 2019/0215127 | A1* | 7/2019 | Li | ......................... H04L 1/1812 |
| 2021/0006375 | A1* | 1/2021 | Takeda | .................. H04W 28/04 |

FOREIGN PATENT DOCUMENTS

| | | |
|---|---|---|
| CN | 104052581 | 9/2014 |
| WO | 2016093600 | 6/2016 |

OTHER PUBLICATIONS

Ericsson, "Solutions supporting large HARQ-ACK payloads multiplexed with PUSCH". R1-165150, 3GPP TSG-RAN WG1#85, May 2016, 4 pages.

\* cited by examiner

FIG. 14

| 0  | 4  | 8  |   |   |   |
|----|----|----|---|---|---|
| 12 | 16 | 20 |   |   |   |
|    |    |    |   |   |   |
| 2  | 6  | 10 |   |   |   |
| 14 | 18 |    |   |   |   |
|    |    |    |   |   |   |
| 3  | 7  | 11 |   |   |   |
| 15 | 19 |    |   |   |   |
|    |    |    |   |   |   |
| 1  | 5  | 9  |   |   |   |
| 13 | 17 |    |   |   |   |
|    |    |    |   |   |   |

METHOD OF TRANSMITTING UPLINK CONTROL INFORMATION BY USER EQUIPMENT IN WIRELESS COMMUNICATION SYSTEM AND DEVICE FOR SUPPORTING SAME

CROSS-REFERENCE TO RELATED APPLICATIONS

This application is a continuation of U.S. patent application Ser. No. 17/573,065, filed on Jan. 11, 2022, which is a continuation of U.S. patent application Ser. No. 16/706,516, filed on Dec. 6, 2019, now U.S. Pat. No. 11,316,615, which is a continuation of U.S. patent application Ser. No. 16/065,073, filed on Jun. 21, 2018, now U.S. Pat. No. 10,530,528, which is the National Stage filing under 35 U.S.C. 371 of International Application No. PCT/KR2018/001499, filed on Feb. 5, 2018, which claims the benefit of U.S. Provisional Application No. 62/454,878, filed on Feb. 5, 2017, 62/457,833, filed on Feb. 11, 2017, 62/501,066, filed on May 3, 2017, 62/505,178, filed on May 12, 2017, 62/520,519, filed on Jun. 15, 2017, 62/524,482, filed on Jun. 24, 2017, 62/543,967, filed on Aug. 11, 2017, 62/555,688, filed on Sep. 8, 2017, 62/560,657, filed on Sep. 19, 2017, 62/566,343, filed on Sep. 30, 2017, 62/566,561, filed on Oct. 2, 2017, 62/570,594, filed on Oct. 10, 2017, 62/576,071, filed on Oct. 23, 2017, 62/577,743, filed on Oct. 27, 2017, 62/586,872, filed on Nov. 15, 2017, 62/590,638, filed on Nov. 26, 2017, 62/591,147, filed on Nov. 27, 2017, and 62/592,312, filed on Nov. 29, 2017, 62/616,463, filed on Jan. 12, 2018, and 62/620,391, filed on Jan. 22, 2018, the contents of which are all hereby incorporated by reference herein in their entirety.

TECHNICAL FIELD

The present invention relates to a wireless communication system, and more particularly, to a method of transmitting uplink control information to a base station by a user equipment in a wireless communication system where various numerology is applicable and device for supporting the same.

More specifically, the present invention is directed to a method performed by a user equipment for mapping uplink resource information and transmitting the uplink resource information on a physical uplink shared channel.

BACKGROUND ART

Wireless access systems have been widely deployed to provide various types of communication services such as voice or data. In general, a wireless access system is a multiple access system that supports communication of multiple users by sharing available system resources (a bandwidth, transmission power, etc.) among them. For example, multiple access systems include a Code Division Multiple Access (CDMA) system, a Frequency Division Multiple Access (FDMA) system, a Time Division Multiple Access (TDMA) system, an Orthogonal Frequency Division Multiple Access (OFDMA) system, and a Single Carrier Frequency Division Multiple Access (SC-FDMA) system.

As a number of communication devices have required higher communication capacity, the necessity of the mobile broadband communication much improved than the existing radio access technology (RAT) has increased. In addition, massive machine type communications (MTC) capable of providing various services at anytime and anywhere by connecting a number of devices or things to each other has been considered in the next generation communication system. Moreover, a communication system design capable of supporting services/UEs sensitive to reliability and latency has been discussed.

As described above, the introduction of the next generation RAT considering the enhanced mobile broadband communication, massive MTC, Ultra-reliable and low latency communication (URLLC), and the like has been discussed.

DISCLOSURE OF THE INVENTION

Technical Task

An object of the present invention is to provide a method of transmitting uplink control information by a user equipment in a newly proposed communication system.

In particular, another object of the present invention is to provide a method performed by a user equipment for uplink control channel mapping and operation performed by the user equipment for transmitting uplink control information when the user equipment intends to transmit the uplink control information on a physical uplink shared channel in the newly proposed communication system.

It will be appreciated by persons skilled in the art that the objects that could be achieved with the present disclosure are not limited to what has been particularly described hereinabove and the above and other objects that the present disclosure could achieve will be more clearly understood from the following detailed description.

Technical Solution

The present invention provides a method of transmitting uplink control information by a user equipment in a wireless communication system and devices therefor.

In an aspect of the present invention, provided herein is a method of transmitting uplink control information (UCI) to a base station (BS) by a user equipment (UE) in a wireless communication system, including: mapping the UCI to a physical uplink shared channel (PUSCH), wherein acknowledgement information included in the UCI is mapped to the PUSCH by applying either rate-matching or puncturing to resources for transmitting the acknowledgement information on the PUSCH based on a size of the acknowledgement information; and transmitting the mapped UCI on the PUSCH In another aspect of the present invention, provided herein is a user equipment (UE) for transmitting uplink control information (UCI) to a base station (BS) in a wireless communication system, including: a transmitter; and a processor connected to the transmitter, wherein the processor is configured to: map the UCI to a physical uplink shared channel (PUSCH), wherein acknowledgement information included in the UCI is mapped to the PUSCH by applying either rate-matching or puncturing to resources for transmitting the acknowledgement information on the PUSCH based on a size of the acknowledgement information; and transmit the mapped UCI on the PUSCH.

In this case, when the size of the acknowledgement information is more than a predetermined value, the acknowledgement information may be mapped to the PUSCH by applying the rate-matching to the resources for transmitting the acknowledgement information on the PUSCH. On the other hand, when the size of the acknowledgement information is equal to or less than the predetermined value, the acknowledgement information may be mapped to the PUSCH by applying the puncturing to the resources for transmitting the acknowledgement information on the PUSCH.

At this time, the acknowledgement information may not be mapped to any symbol before a symbol where a first demodulation reference signal (DM-RS) is transmitted on the PUSCH.

In addition, when channel state information (CSI) is included in the UCI, the CSI may be mapped to the PUSCH by applying the rate-matching to resources for transmitting the CSI on the PUSCH.

In this case, the CSI may be mapped to resources except a predetermined amount of resources which are reserved for the acknowledgement information on the PUSCH.

Moreover, the size of the acknowledgement information may be determined based on an uplink downlink assignment index (DAI) value in uplink grant received from the BS.

Further, the amount of the resources for transmitting the acknowledgement information on the PUSCH may be determined based on a first beta parameter, and if among a plurality of sets configured through higher layer signaling, one set is indicated by uplink grant, the first beta parameter may correspond to a beta parameter that is determined based on the size of the acknowledgement information among a plurality of beta parameters included in the one set indicated by the uplink grant.

Additionally, part or all of the UCI may be mapped to resources in a symbol where a demodulation reference signal (DM-RS) is transmitted on the PUSCH.

Additionally, when the PUSCH is a semi persistence scheduling (SPS) PUSCH, the rate-matching or puncturing may be performed based on maximum UCI payload dedicated to the SPS PUSCH.

Additionally, when the PUSCH is a semi persistence scheduling (SPS) PUSCH, the rate-matching or puncturing may be performed based on a beta offset value included in downlink control information that activates the SPS PUSCH.

It is to be understood that both the foregoing general description and the following detailed description of the present disclosure are exemplary and explanatory and are intended to provide further explanation of the disclosure as claimed.

Advantageous Effects

As is apparent from the above description, the embodiments of the present disclosure have the following effects.

According to the present invention, when a UE intends to map acknowledgement information in uplink control information to a physical uplink shared channel, the UE can perform rate-matching or puncturing according to size of the acknowledgement information and then map the acknowledgement information to the physical uplink shared channel.

In addition, the UE can apply a more efficient mapping method in terms of the performance of the physical uplink shared channel or complexity thereof and then transmit an uplink control channel including the acknowledgement information on the physical uplink shared channel.

The effects that can be achieved through the embodiments of the present invention are not limited to what has been particularly described hereinabove and other effects which are not described herein can be derived by those skilled in the art from the following detailed description. That is, it should be noted that the effects which are not intended by the present invention can be derived by those skilled in the art from the embodiments of the present invention.

DESCRIPTION OF DRAWINGS

The accompanying drawings, which are included to provide a further understanding of the invention, provide embodiments of the present invention together with detail explanation. Yet, a technical characteristic of the present invention is not limited to a specific drawing. Characteristics disclosed in each of the drawings are combined with each other to configure a new embodiment. Reference numerals in each drawing correspond to structural elements.

FIG. 14 is a diagram schematically illustrating UCI mapping on first three symbols according to method #1;

FIGS. 43 to 49 are diagrams schematically illustrating examples where PUSCH puncturing or rate-matching is applied for HARQ-ACK;

BEST MODE FOR INVENTION

Figure 1:
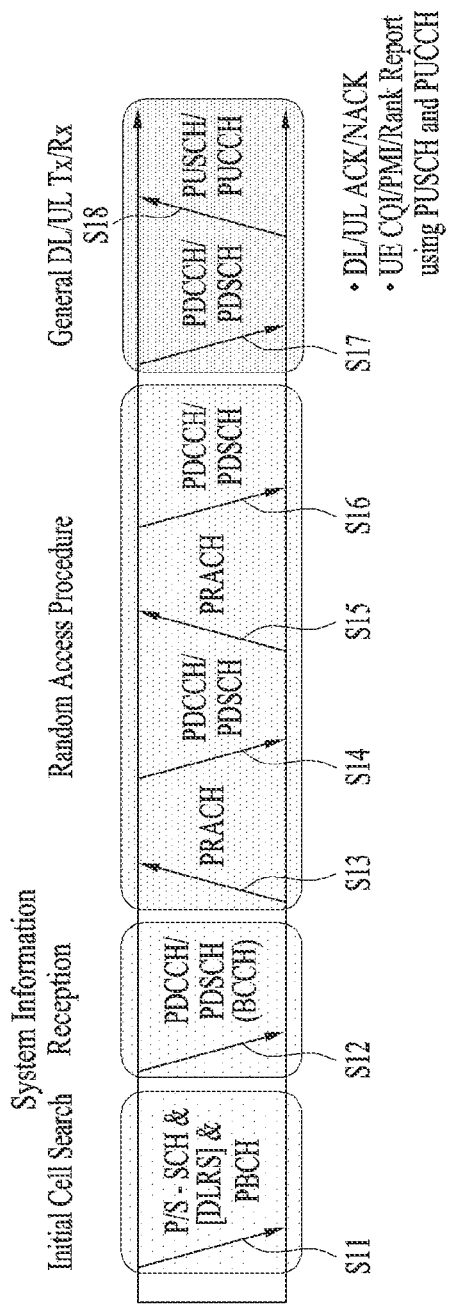
FIG. 1 is a diagram illustrating physical channels and a signal transmission method using the physical channels.

The embodiments of the present disclosure described below are combinations of elements and features of the present disclosure in specific forms. The elements or features may be considered selective unless otherwise mentioned. Each element or feature may be practiced without being combined with other elements or features. Further, an embodiment of the present disclosure may be constructed by combining parts of the elements and/or features. Operation orders described in embodiments of the present disclosure may be rearranged. Some constructions or elements of any one embodiment may be included in another embodiment and may be replaced with corresponding constructions or features of another embodiment.

In the description of the attached drawings, a detailed description of known procedures or steps of the present disclosure will be avoided lest it should obscure the subject matter of the present disclosure. In addition, procedures or steps that could be understood to those skilled in the art will not be described either.

Throughout the specification, when a certain portion "includes" or "comprises" a certain component, this indicates that other components are not excluded and may be further included unless otherwise noted. The terms "unit", "-or/er" and "module" described in the specification indicate a unit for processing at least one function or operation, which may be implemented by hardware, software or a combination thereof. In addition, the terms "a or an", "one", "the" etc. may include a singular representation and a plural representation in the context of the present disclosure (more particularly, in the context of the following claims) unless indicated otherwise in the specification or unless context clearly indicates otherwise.

In the embodiments of the present disclosure, a description is mainly made of a data transmission and reception relationship between a Base Station (BS) and a User Equipment (UE). A BS refers to a terminal node of a network, which directly communicates with a UE. A specific operation described as being performed by the BS may be performed by an upper node of the BS.

Namely, it is apparent that, in a network comprised of a plurality of network nodes including a BS, various operations performed for communication with a UE may be performed by the BS, or network nodes other than the BS. The term 'BS' may be replaced with a fixed station, a Node B, an evolved Node B (eNode B or eNB), an Advanced Base Station (ABS), an access point, etc.

In the embodiments of the present disclosure, the term terminal may be replaced with a UE, a Mobile Station (MS), a Subscriber Station (SS), a Mobile Subscriber Station (MSS), a mobile terminal, an Advanced Mobile Station (AMS), etc.

A transmission end is a fixed and/or mobile node that provides a data service or a voice service and a reception end is a fixed and/or mobile node that receives a data service or a voice service. Therefore, a UE may serve as a transmission end and a BS may serve as a reception end, on an UpLink (UL). Likewise, the UE may serve as a reception end and the BS may serve as a transmission end, on a DownLink (DL).

The embodiments of the present disclosure may be supported by standard specifications disclosed for at least one of wireless access systems including an Institute of Electrical and Electronics Engineers (IEEE) 802.xx system, a 3rd Generation Partnership Project (3GPP) system, a 3GPP Long Term Evolution (LTE) system, and a 3GPP2 system. In particular, the embodiments of the present disclosure may be supported by the standard specifications, 3GPP TS 36.211, 3GPP TS 36.212, 3GPP TS 36.213, 3GPP TS 36.321 and 3GPP TS 36.331. That is, the steps or parts, which are not described to clearly reveal the technical idea of the present disclosure, in the embodiments of the present disclosure may be explained by the above standard specifications. All terms used in the embodiments of the present disclosure may be explained by the standard specifications.

Reference will now be made in detail to the embodiments of the present disclosure with reference to the accompanying drawings. The detailed description, which will be given below with reference to the accompanying drawings, is intended to explain exemplary embodiments of the present disclosure, rather than to show the only embodiments that can be implemented according to the disclosure.

The following detailed description includes specific terms in order to provide a thorough understanding of the present disclosure. However, it will be apparent to those skilled in the art that the specific terms may be replaced with other terms without departing the technical spirit and scope of the present disclosure.

For example, the term, TxOP may be used interchangeably with transmission period or Reserved Resource Period (RRP) in the same sense. Further, a Listen-Before-Talk (LBT) procedure may be performed for the same purpose as a carrier sensing procedure for determining whether a channel state is idle or busy.

Hereinafter, 3GPP LTE/LTE-A systems are explained, which are examples of wireless access systems.

The embodiments of the present disclosure can be applied to various wireless access systems such as Code Division Multiple Access (CDMA), Frequency Division Multiple Access (FDMA), Time Division Multiple Access (TDMA), Orthogonal Frequency Division Multiple Access (OFDMA), Single Carrier Frequency Division Multiple Access (SC-FDMA), etc.

CDMA may be implemented as a radio technology such as Universal Terrestrial Radio Access (UTRA) or CDMA2000. TDMA may be implemented as a radio technology such as Global System for Mobile communications (GSM)/General packet Radio Service (GPRS)/Enhanced Data Rates for GSM Evolution (EDGE). OFDMA may be implemented as a radio technology such as IEEE 802.11 (Wi-Fi), IEEE 802.16 (WiMAX), IEEE 802.20, Evolved UTRA (E-UTRA), etc.

UTRA is a part of Universal Mobile Telecommunications System (UMTS). 3GPP LTE is a part of Evolved UMTS (E-UMTS) using E-UTRA, adopting OFDMA for DL and SC-FDMA for UL. LTE-Advanced (LTE-A) is an evolution of 3GPP LTE. While the embodiments of the present disclosure are described in the context of a 3GPP LTE/LTE-A system in order to clarify the technical features of the present disclosure, the present disclosure is also applicable to an IEEE 802.16e/m system, etc.

1. 3GPP LTE/LTE-A System 1.1. Physical Channels and Signal Transmission and Reception Method Using the Same In a wireless access system, a UE receives information from an eNB on a DL and transmits information to the eNB on a UL. The information transmitted and received between the UE and the eNB includes general data information and various types of control information. There are many physical channels according to the types/usages of information transmitted and received between the eNB and the UE.

FIG. 1 illustrates physical channels and a general signal transmission method using the physical channels, which may be used in embodiments of the present disclosure.

When a UE is powered on or enters a new cell, the UE performs initial cell search (S11). The initial cell search involves acquisition of synchronization to an eNB. Specifically, the UE synchronizes its timing to the eNB and acquires information such as a cell Identifier (ID) by receiving a Primary Synchronization Channel (P-SCH) and a Secondary Synchronization Channel (S-SCH) from the eNB.

Then the UE may acquire information broadcast in the cell by receiving a Physical Broadcast Channel (PBCH) from the eNB.

During the initial cell search, the UE may monitor a DL channel state by receiving a Downlink Reference Signal (DL RS).

After the initial cell search, the UE may acquire more detailed system information by receiving a Physical Downlink Control Channel (PDCCH) and receiving a Physical Downlink Shared Channel (PDSCH) based on information of the PDCCH (S12).

To complete connection to the eNB, the UE may perform a random access procedure with the eNB (S13 to S16). In the random access procedure, the UE may transmit a preamble on a Physical Random Access Channel (PRACH) (S13) and may receive a PDCCH and a PDSCH associated with the PDCCH (S14). In the case of contention-based random access, the UE may additionally perform a contention resolution procedure including transmission of an additional PRACH (S15) and reception of a PDCCH signal and a PDSCH signal corresponding to the PDCCH signal (S16).

After the above procedure, the UE may receive a PDCCH and/or a PDSCH from the eNB (S17) and transmit a Physical Uplink Shared Channel (PUSCH) and/or a Physical Uplink Control Channel (PUCCH) to the eNB (S18), in a general UL/DL signal transmission procedure.

Control information that the UE transmits to the eNB is generically called Uplink Control Information (UCI). The UCI includes a Hybrid Automatic Repeat and reQuest Acknowledgement/Negative Acknowledgement (HARQ-ACK/NACK), a Scheduling Request (SR), a Channel Quality Indicator (CQI), a Precoding Matrix Index (PMI), a Rank Indicator (RI), etc.

In the LTE system, UCI is generally transmitted on a PUCCH periodically. However, if control information and traffic data should be transmitted simultaneously, the control information and traffic data may be transmitted on a PUSCH. In addition, the UCI may be transmitted aperiodically on the PUSCH, upon receipt of a request/command from a network.

1.2. Resource Structure

Figure 2:
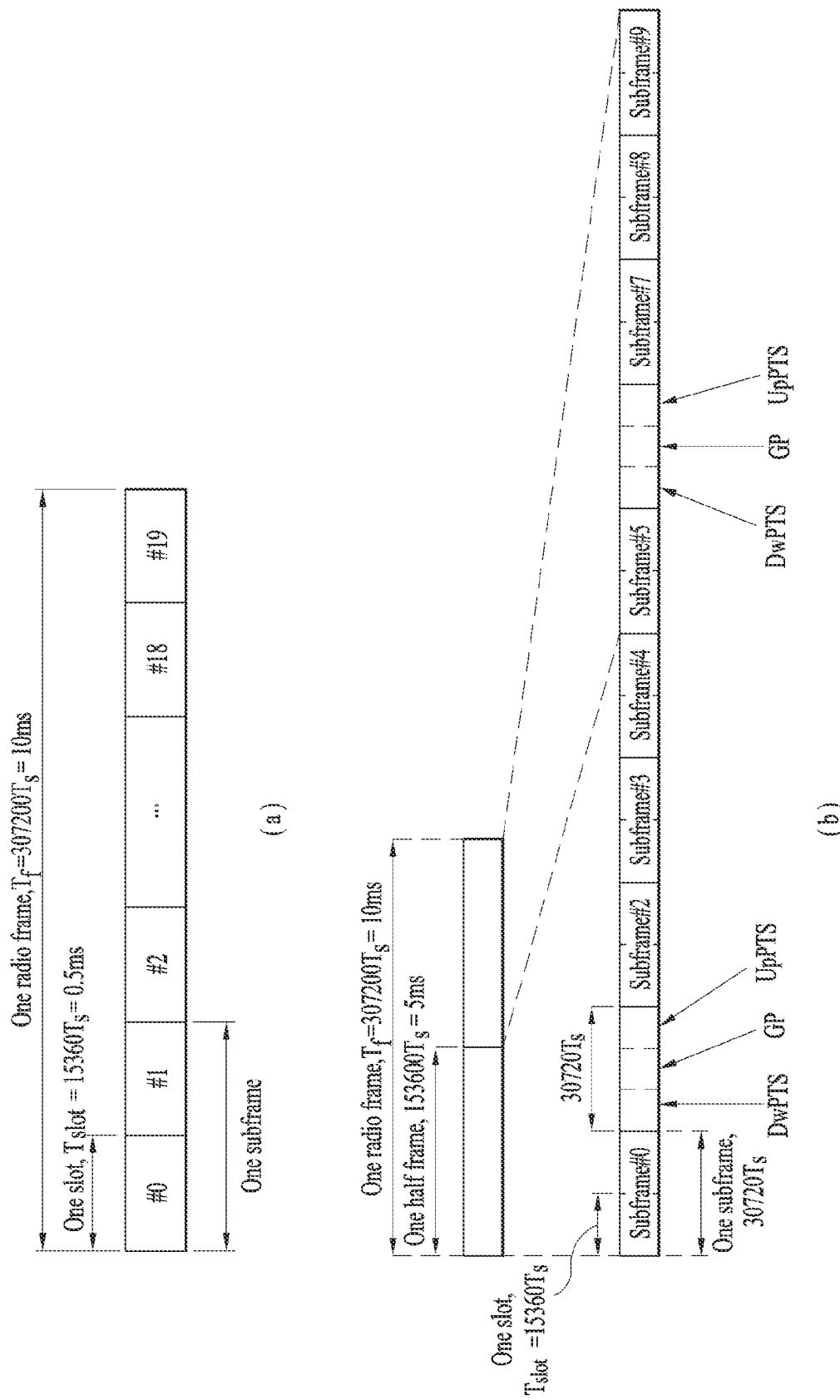
FIG. 2 is a diagram illustrating exemplary radio frame structures.

FIG. 2 illustrates exemplary radio frame structures used in embodiments of the present disclosure.

FIG. 2(a) illustrates frame structure type 1. Frame structure type 1 is applicable to both a full Frequency Division Duplex (FDD) system and a half FDD system.

One radio frame is 10 ms (Tf=307200·Ts) long, including equal-sized 20 slots indexed from 0 to 19. Each slot is 0.5 ms (Tslot=15360·Ts) long. One subframe includes two successive slots. An ith subframe includes 2ith and (2i+1)th slots. That is, a radio frame includes 10 subframes. A time required for transmitting one subframe is defined as a Transmission Time Interval (TTI). Ts is a sampling time given as Ts=1/(15 kHz×2048)=3.2552×10-8 (about 33 ns). One slot includes a plurality of Orthogonal Frequency Division Multiplexing (OFDM) symbols or SC-FDMA symbols in the time domain by a plurality of Resource Blocks (RBs) in the frequency domain.

A slot includes a plurality of OFDM symbols in the time domain. Since OFDMA is adopted for DL in the 3GPP LTE system, one OFDM symbol represents one symbol period. An OFDM symbol may be called an SC-FDMA symbol or symbol period. An RB is a resource allocation unit including a plurality of contiguous subcarriers in one slot.

In a full FDD system, each of 10 subframes may be used simultaneously for DL transmission and UL transmission during a 10-ms duration. The DL transmission and the UL transmission are distinguished by frequency. On the other hand, a UE cannot perform transmission and reception simultaneously in a half FDD system.

The above radio frame structure is purely exemplary. Thus, the number of subframes in a radio frame, the number of slots in a subframe, and the number of OFDM symbols in a slot may be changed.

FIG. 2(b) illustrates frame structure type 2. Frame structure type 2 is applied to a Time Division Duplex (TDD) system. One radio frame is 10 ms (Tf=307200·Ts) long, including two half-frames each having a length of 5 ms (=153600·Ts) long. Each half-frame includes five subframes each being 1 ms (=30720·Ts) long. An ith subframe includes 2ith and (2i+1)th slots each having a length of 0.5 ms (Tslot=15360·Ts). Ts is a sampling time given as Ts=1/(15 kHz×2048)=3.2552×10-8 (about 33 ns).

A type-2 frame includes a special subframe having three fields, Downlink Pilot Time Slot (DwPTS), Guard Period (GP), and Uplink Pilot Time Slot (UpPTS). The DwPTS is used for initial cell search, synchronization, or channel estimation at a UE, and the UpPTS is used for channel estimation and UL transmission synchronization with a UE at an eNB. The GP is used to cancel UL interference between a UL and a DL, caused by the multi-path delay of a DL signal.

[Table 1] below lists special subframe configurations (DwPTS/GP/UpPTS lengths).

Figure 5:
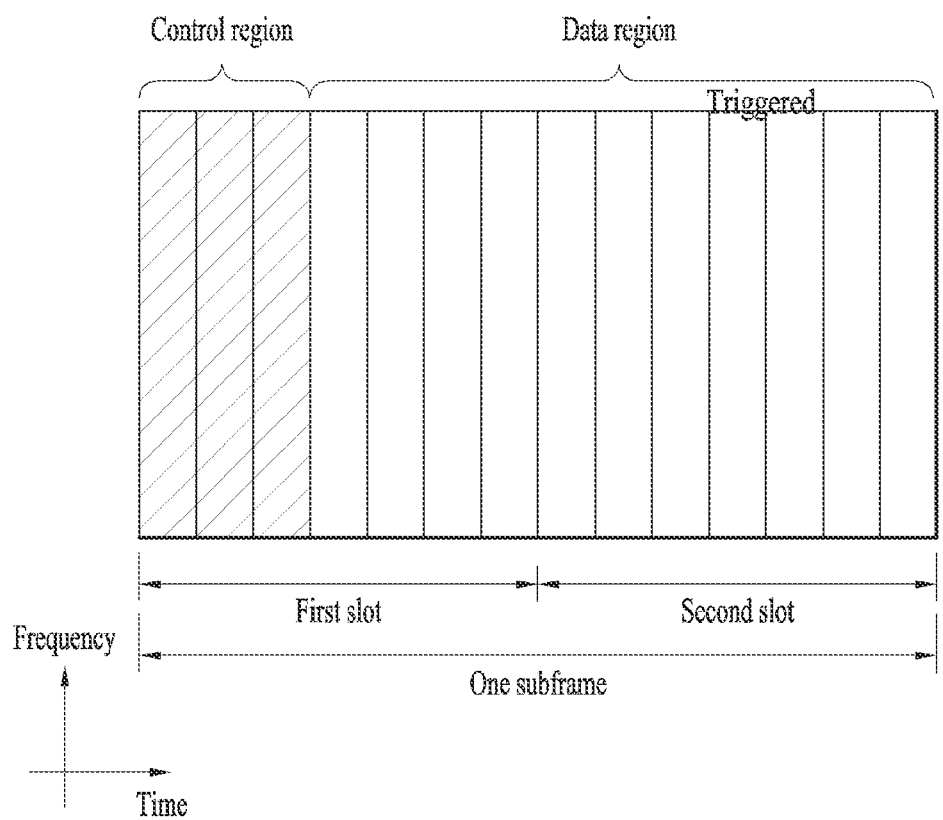
FIG. 5 is a diagram illustrating an exemplary structure of a downlink subframe.

FIG. 5 illustrates a structure of a DL subframe that may be used in embodiments of the present disclosure.

Referring to FIG. 5, up to three OFDM symbols of a DL subframe, starting from OFDM symbol 0 are used as a control region to which control channels are allocated and the other OFDM symbols of the DL subframe are used as a data region to which a PDSCH is allocated. DL control channels defined for the 3GPP LTE system include a Physical Control Format Indicator Channel (PCFICH), a PDCCH, and a Physical Hybrid ARQ Indicator Channel (PHICH).

The PCFICH is transmitted in the first OFDM symbol of a subframe, carrying information about the number of OFDM symbols used for transmission of control channels (i.e. the size of the control region) in the subframe. The PHICH is a response channel to a UL transmission, delivering an HARQ ACK/NACK signal. Control information carried on the PDCCH is called Downlink Control Information (DCI). The DCI transports UL resource assignment information, DL resource assignment information, or UL Transmission (Tx) power control commands for a UE group.

1.3. CSI Feedback

In the 3GPP LTE or LTE-A system, a user equipment (UE) is defined to report channel state information (CSI) to a base station (or eNB). Herein, the CSI collectively refers

TABLE 1

| Special subframe configuration | Normal cyclic prefix in downlink | | | Extended cyclic prefix in downlink | | |
| --- | --- | --- | --- | --- | --- | --- |
| | | UpPTS | | | UpPTS | |
| | DwPTS | Normal cyclic prefix in uplink | Extended cyclic prefix in uplink | DwPTS | Normal cyclic prefix in uplink | Extended cyclic prefix in uplink |
| 0 | 6592·$T_s$ | 2192·$T_s$ | 2560·$T_s$ | 7680·$T_s$ | 2192·$T_s$ | 2560·$T_s$ |
| 1 | 19760·$T_s$ | | | 20480·$T_s$ | | |
| 2 | 21952·$T_s$ | | | 23040·$T_s$ | | |
| 3 | 24144·$T_s$ | | | 25600·$T_s$ | | |
| 4 | 26336·$T_s$ | | | 7680·$T_s$ | 4384·$T_s$ | 5120·$T_s$ |
| 5 | 6592·$T_s$ | 4384·$T_s$ | 5120·$T_s$ | 20480·$T_s$ | | |
| 6 | 19760·$T_s$ | | | 23040·$T_s$ | | |
| 7 | 21952·$T_s$ | | | — | — | — |
| 8 | 24144·$T_s$ | | | — | — | — |

Figure 3:
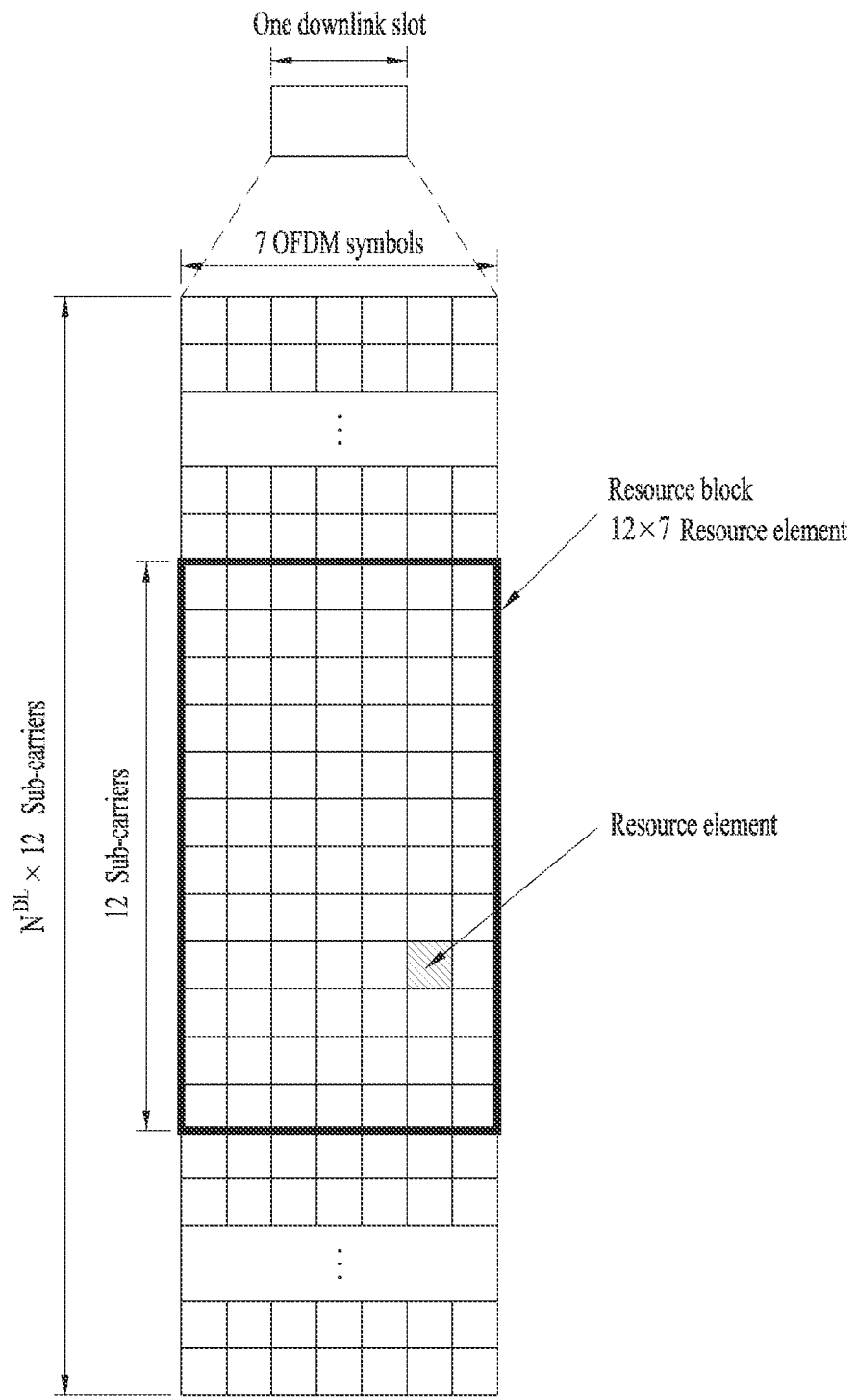
FIG. 3 is a diagram illustrating an exemplary resource grid for the duration of a downlink slot.

FIG. 3 illustrates an exemplary structure of a DL resource grid for the duration of one DL slot, which may be used in embodiments of the present disclosure.

Referring to FIG. 3, a DL slot includes a plurality of OFDM symbols in the time domain. One DL slot includes 7 OFDM symbols in the time domain and an RB includes 12 subcarriers in the frequency domain, to which the present disclosure is not limited.

Each element of the resource grid is referred to as a Resource Element (RE). An RB includes 12×7 REs. The number of RBs in a DL slot, NDL depends on a DL transmission bandwidth. A UL slot may have the same structure as a DL slot.

Figure 4:
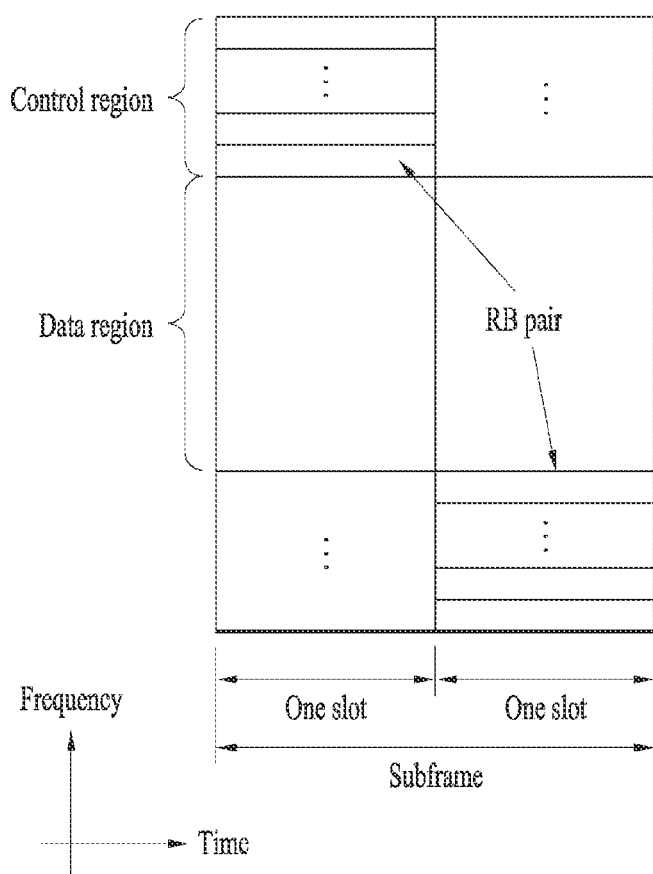
FIG. 4 is a diagram illustrating an exemplary structure of an uplink subframe.

FIG. 4 illustrates a structure of a UL subframe which may be used in embodiments of the present disclosure.

Referring to FIG. 4, a UL subframe may be divided into a control region and a data region in the frequency domain. A PUCCH carrying UCI is allocated to the control region and a PUSCH carrying user data is allocated to the data region. To maintain a single carrier property, a UE does not transmit a PUCCH and a PUSCH simultaneously. A pair of RBs in a subframe are allocated to a PUCCH for a UE. The RBs of the RB pair occupy different subcarriers in two slots. Thus it is said that the RB pair frequency-hops over a slot boundary.

to information indicating the quality of a radio channel (link) established between a UE and an antenna port.

For example, the CSI may include a rank indicator (RI), a precoding matrix indicator (PMI), and a channel quality indicator (CQI).

Herein, the RI, which indicates rank information about a channel, represents the number of streams that a UE receives through the same time-frequency resources. The RI value is determined depending on long-term fading of the channel and is thus usually fed back to the eNB by the UE with a longer period than that for the PMI and CQI.

The PMI, which is a value reflecting the channel space characteristics, indicates a precoding index preferred by the UE based on a metric such as the SINR.

The CQI, which is a value indicating the intensity of a channel, typically indicates a reception SINR which may be obtained by the eNB when the PMI is used.

In the 3GPP LTE or LTE-A system, the eNB configures a plurality of CSI processes for the UE and receive CSI for each process from the UE. In this case, the CSI process is configured with a CSI-RS for measuring the quality of the signal from the eNB and CSI interference measurement (CSI-IM) resources.

1.4. RRM Measurement

The LTE system supports radio resource management (RRM) operation including power control, scheduling, cell search, cell reselection, handover, radio link or connection monitoring, and connection establishment and re-establishment. In this case, the serving cell may request the UE to send RRM measurement information corresponding to the measurement value for performing the RRM operation. As representative examples, in the LTE system, the UE may measure cell search information, reference signal received power (RSRP), reference signal received quality (RSRQ), and the like for each cell and then transmit the measured information. Specifically, in the LTE system, the UE receives 'measConfig' for the RRM measurement from the serving cell through a higher layer signal and then measure RSRP or RSRQ according to information in 'measConfig'.

In the LTE system, the RSRP, RSRQ, and RSSI has been defined as follows.

The RSRP is defined as the linear average over the power contributions (in [W]) of the resource elements that carry cell-specific reference signals within the considered measurement frequency bandwidth. For example, for RSRP determination, the cell-specific reference signals $R_0$ shall be used. For RSRP determination, the cell-specific reference signals $R_0$ shall be used. If the UE can reliably detect that $R_1$ is available, it may use $R_1$ in addition to $R_0$ to determine RSRP.

The reference point for the RSRP shall be the antenna connector of the UE.

If receiver diversity is in use by the UE, the reported value shall not be lower than the corresponding RSRP of any of the individual diversity branches.

The RSRQ is defined as the ratio N×RSRP/(E-UTRA carrier RSSI), where N is the number of RBs of the E-UTRA carrier RSSI measurement bandwidth. The measurements in the numerator and denominator shall be made over the same set of resource blocks.

The E-UTRA carrier RSSI comprises the linear average of the total received power (in [W]) observed only in OFDM symbols containing reference symbols for antenna port 0, in the measurement bandwidth, over N number of resource blocks by the UE from all sources, including co-channel serving and non-serving cells, adjacent channel interference, thermal noise etc. If higher-layer signaling indicates certain subframes for performing RSRQ measurements, then RSSI is measured over all OFDM symbols in the indicated subframes.

The reference point for the RSRQ shall be the antenna connector of the UE.

If receiver diversity is in use by the UE, the reported value shall not be lower than the corresponding RSRQ of any of the individual diversity branches.

The RSSI is defined as the received wide band power, including thermal noise and noise generated in the receiver, within the bandwidth defined by the receiver pulse shaping filter.

The reference point for the measurement shall be the antenna connector of the UE.

If receiver diversity is in use by the UE, the reported value shall not be lower than the corresponding UTRA carrier RSSI of any of the individual receive antenna branches.

Based on the above-described definitions, in the case of intra-frequency measurement, the UE operating in the LTE system may measure the RSRP in the bandwidth indicated by the allowed measurement bandwidth related information element (IE) transmitted in system information block type 3 (SIB3). Meanwhile, in the case of inter-frequency measurement, the UE may measure the RSRP in the bandwidth corresponding to one of 6, 15, 25, 50, 75, 100 resource blocks (RBs) indicated by the allowed measurement bandwidth related IE transmitted in SIB5. Alternatively, when there is no IE, the UE may measure the RSRP in the entire downlink system frequency band as the default operation.

Upon receiving information on the allowed measurement bandwidth, the UE may consider the corresponding value as the maximum measurement bandwidth and then freely measure the RSRP value in the corresponding value. However, if the service cell transmits an IE defined as WB-RSRQ to the UE and set the allowed measurement bandwidth equal to or higher than 50 RBs, the UE should calculate the RSRP value for the entire allowed measurement bandwidth. Meanwhile, when intending to the RSSI, the UE measures the RSSI using a frequency band of the UE's receiver according to the definition of RSSI bandwidth.

2. New Radio Access Technology System

As a number of communication devices have required higher communication capacity, the necessity of the mobile broadband communication much improved than the existing radio access technology (RAT) has increased. In addition, massive machine type communications (MTC) capable of providing various services at anytime and anywhere by connecting a number of devices or things to each other has also been required. Moreover, a communication system design capable of supporting services/UEs sensitive to reliability and latency has been proposed.

As the new RAT considering the enhanced mobile broadband communication, massive MTC, Ultra-reliable and low latency communication (URLLC), and the like, a new RAT system has been proposed. In the present invention, the corresponding technology is referred to as the new RAT or new radio (NR) for convenience of description.

2.1. Numerologies

The NR system to which the present invention is applicable supports various OFDM numerologies shown in the following table. In this case, the value of μ and cyclic prefix information per carrier bandwidth part can be signaled in DL and UL, respectively. For example, the value of μ and cyclic prefix information per downlink carrier bandwidth part may be signaled though DL-BWP-mu and DL-MWP-cp corresponding to higher layer signaling. As another example, the value of μ and cyclic prefix information per uplink carrier bandwidth part may be signaled though UL-BWP-mu and UL-MWP-cp corresponding to higher layer signaling.

TABLE 2

| μ | $\Delta f = 2^{\mu} \cdot 15$ [kHz] | Cyclic prefix |
|---|---|---|
| 0 | 15 | Normal |
| 1 | 30 | Normal |
| 2 | 60 | Normal, Extended |
| 3 | 120 | Normal |
| 4 | 240 | Normal |

2.2 Frame Structure

DL and UL transmission are configured with frames with a length of 10 ms. Each frame may be composed of ten subframes, each having a length of 1 ms. In this case, the number of consecutive OFDM symbols in each subframe is $N_{symb}^{subframe,\mu} = N_{symb}^{slot} N_{slot}^{subframe,\mu}$.

In addition, each subframe may be composed of two half-frames with the same size. In this case, the two half-frames are composed of subframes 0 to 4 and subframes 5 to 9, respectively.

Regarding the subcarrier spacing μ, slots may be numbered within one subframe in ascending order like $n_s^\mu \in \{0, \ldots, N_{slot}^{subframe,\mu}-1\}$ slot and may also be numbered within a frame in ascending order like $n_{s,f}^\mu \in \{0, \ldots, N_{slot}^{frame,\mu}-1\}$. In this case, the number of consecutive OFDM symbols in one slot ($N_{symb}^{slot}$) may be determined as shown in the following table according to the cyclic prefix. The start slot ($n_s^\mu$) of one subframe is aligned with the start OFDM symbol ($n_s^\mu N_{symb}^{slot}$) of the same subframe in the time dimension. Table 3 shows the number of OFDM symbols in each slot/frame/subframe in the case of the normal cyclic prefix, and Table 4 shows the number of OFDM symbols in each slot/frame/subframe in the case of the extended cyclic prefix.

TABLE 3

| μ | $N_{symb}^{slot}$ | $N_{slot}^{frame,\mu}$ | $N_{slot}^{subframe,\mu}$ |
|---|---|---|---|
| 0 | 14 | 10 | 1 |
| 1 | 14 | 20 | 2 |
| 2 | 14 | 40 | 4 |
| 3 | 14 | 80 | 8 |
| 4 | 14 | 160 | 16 |
| 5 | 14 | 320 | 32 |

TABLE 4

| μ | $N_{symb}^{slot}$ | $N_{slot}^{frame,\mu}$ | $N_{slot}^{subframe,\mu}$ |
|---|---|---|---|
| 2 | 12 | 40 | 4 |

In the NR system to which the present invention can be applied, a self-contained slot structure can be applied based on the above-described slot structure.

Figure 6:
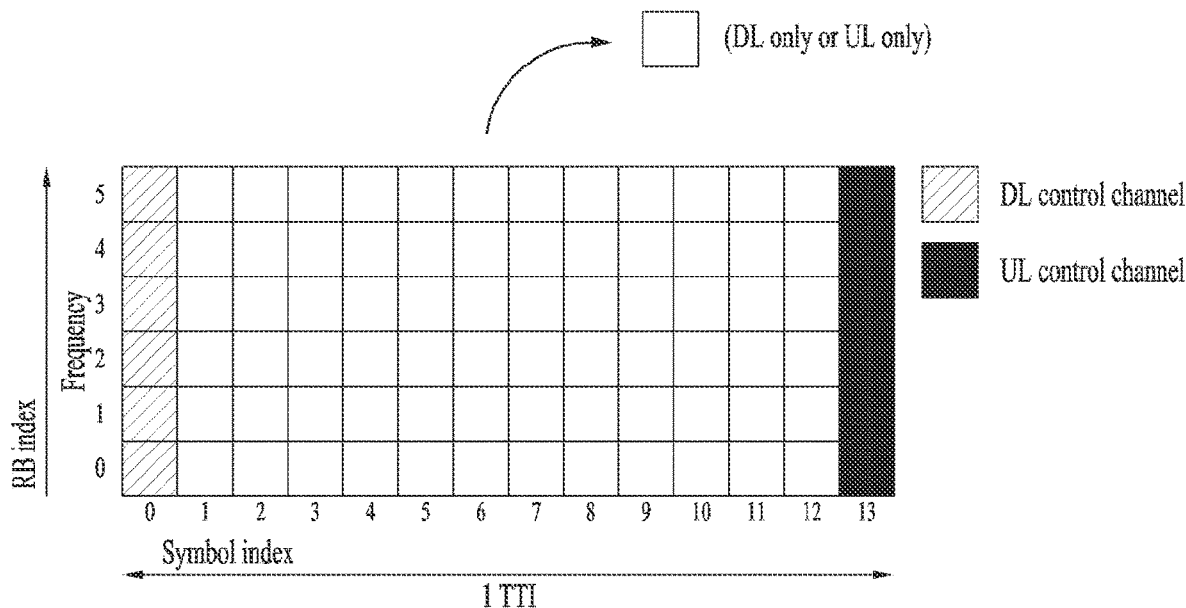
FIG. 6 is a diagram illustrating a self-contained subframe structure applicable to the present invention.

FIG. 6 is a diagram illustrating a self-contained slot structure applicable to the present invention.

In FIG. 6, the hatched area (e.g., symbol index=0) indicates a downlink control region, and the black area (e.g., symbol index=13) indicates an uplink control region. The remaining area (e.g., symbol index=1 to 13) can be used for DL or UL data transmission.

Based on this structure, the eNB and UE can sequentially perform DL transmission and UL transmission in one slot. That is, the eNB and UE can transmit and receive not only DL data but also UL ACK/NACK in response to the DL data in one slot. Consequently, due to such a structure, it is possible to reduce a time required until data retransmission in case a data transmission error occurs, thereby minimizing the latency of the final data transmission.

In this self-contained slot structure, a predetermined length of a time gap is required for the process of allowing the eNB and UE to switch from transmission mode to reception mode and vice versa. To this end, in the self-contained slot structure, some OFDM symbols at the time of switching from DL to UL are set as a guard period (GP).

Although it is described that the self-contained slot structure includes both the DL and UL control regions, these control regions can be selectively included in the self-contained slot structure. In other words, the self-contained slot structure according to the present invention may include either the DL control region or the UL control region as well as both the DL and UL control regions as shown in FIG. 6.

In addition, for example, the slot may have various slot formats. In this case, OFDM symbols in each slot can be divided into downlink symbols (denoted by 'D'), flexible symbols (denoted by 'X'), and uplink symbols (denoted by 'U').

Thus, the UE can assume that DL transmission occurs only in symbols denoted by 'D' and 'X' in the DL slot. Similarly, the UE can assume that UL transmission occurs only in symbols denoted by 'U' and 'X' in the UL slot.

2.3. Analog Beamforming

In a millimeter wave (mmW) system, since a wavelength is short, a plurality of antenna elements can be installed in the same area. That is, considering that the wavelength at 30 GHz band is 1 cm, a total of 100 antenna elements can be installed in a 5*5 cm panel at intervals of 0.5 lambda (wavelength) in the case of a 2-dimensional array. Therefore, in the mmW system, it is possible to improve the coverage or throughput by increasing the beamforming (BF) gain using multiple antenna elements.

In this case, each antenna element can include a transceiver unit (TXRU) to enable adjustment of transmit power and phase per antenna element. By doing so, each antenna element can perform independent beamforming per frequency resource.

However, installing TXRUs in all of the about 100 antenna elements is less feasible in terms of cost. Therefore, a method of mapping a plurality of antenna elements to one TXRU and adjusting the direction of a beam using an analog phase shifter has been considered. However, this method is disadvantageous in that frequency selective beamforming is impossible because only one beam direction is generated over the full band.

To solve this problem, as an intermediate form of digital BF and analog BF, hybrid BF with B TXRUs that are fewer than Q antenna elements can be considered. In the case of the hybrid BF, the number of beam directions that can be transmitted at the same time is limited to B or less, which depends on how B TXRUs and Q antenna elements are connected.

Figure 7:
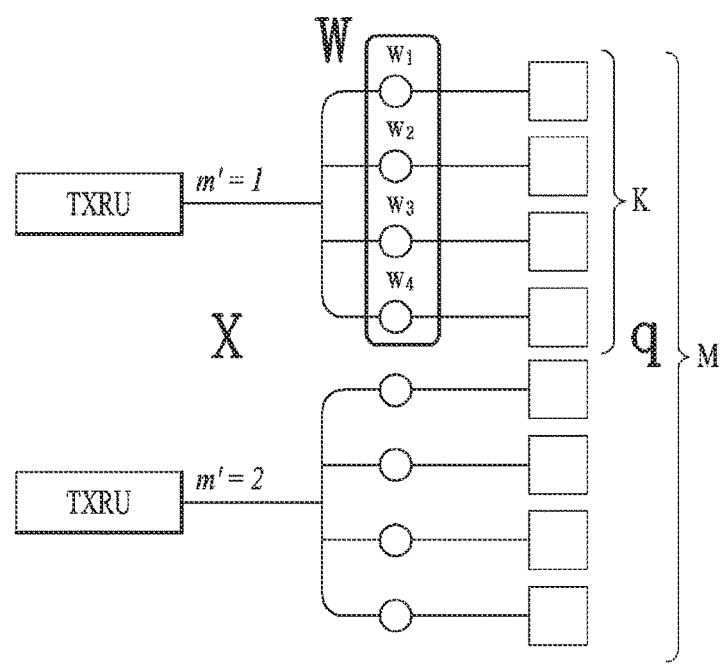
FIGS. 7 and 8 are diagrams illustrating representative methods for connecting TXRUs to antenna elements.
Figure 8:
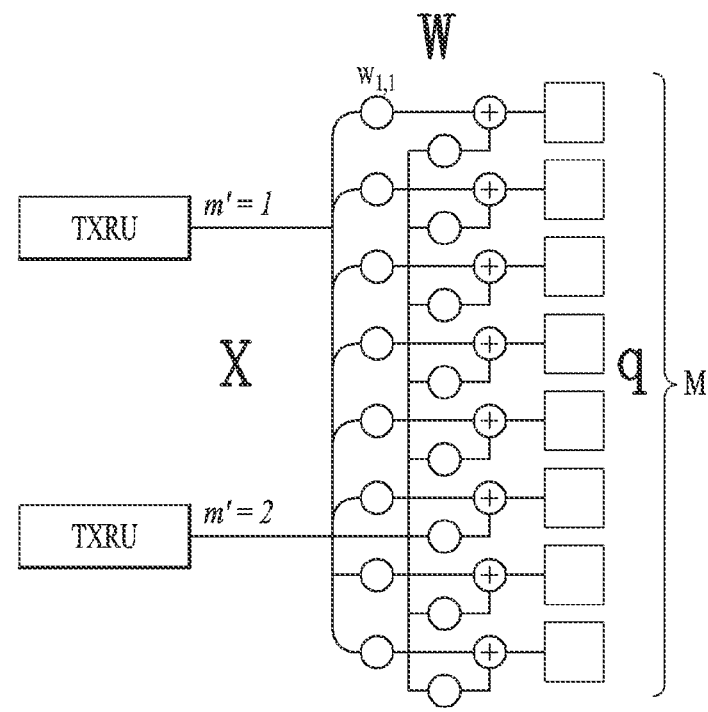

FIGS. 7 and 8 are diagrams illustrating representative methods for connecting TXRUs to antenna elements. Here, the TXRU virtualization model represents the relationship between TXRU output signals and antenna element output signals.

FIG. 7 shows a method for connecting TXRUs to sub-arrays. In FIG. 7, one antenna element is connected to one TXRU.

Meanwhile, FIG. 8 shows a method for connecting all TXRUs to all antenna elements. In FIG. 8, all antenna element are connected to all TXRUs. In this case, separate addition units are required to connect all antenna elements to all TXRUs as shown in FIG. 8.

In FIGS. 7 and 8, W indicates a phase vector weighted by an analog phase shifter. That is, W is a major parameter determining the direction of the analog beamforming. In this case, the mapping relationship between CSI-RS antenna ports and TXRUs may be 1:1 or 1-to-many.

The configuration shown in FIG. 7 has a disadvantage in that it is difficult to achieve beamforming focusing but has an advantage in that all antennas can be configured at low cost.

On the contrary, the configuration shown in FIG. 8 is advantageous in that beamforming focusing can be easily achieved. However, since all antenna elements are connected to the TXRU, it has a disadvantage of high cost.

When a plurality of antennas are used in the NR system to which the present invention is applicable, the hybrid beamforming method obtained by combining the digital beamforming and analog beamforming can be applied. In this case, the analog (or radio frequency (RF)) beamforming means the operation where precoding (or combining) is performed at the RF end. In the case of the hybrid beamforming, precoding (or combining) is performed at the baseband end and RF end, respectively. Thus, the hybrid beamforming is advantageous in that it guarantees the performance similar to the digital beamforming while reducing the number of RF chains and D/A (digital-to-analog) (or A/D (analog-to-digital) z converters.

For convenience of description, the hybrid beamforming structure can be represented by N transceiver units (TXRUs) and M physical antennas. In this case, the digital beamforming for L data layers to be transmitted by the transmitting end may be represented by the N*L (N by L) matrix. Thereafter, N converted digital signals are converted into analog signals by the TXRUs, and then the analog beamforming, which may be represented by the M*N (M by N) matrix, is applied to the converted signals.

Figure 9:
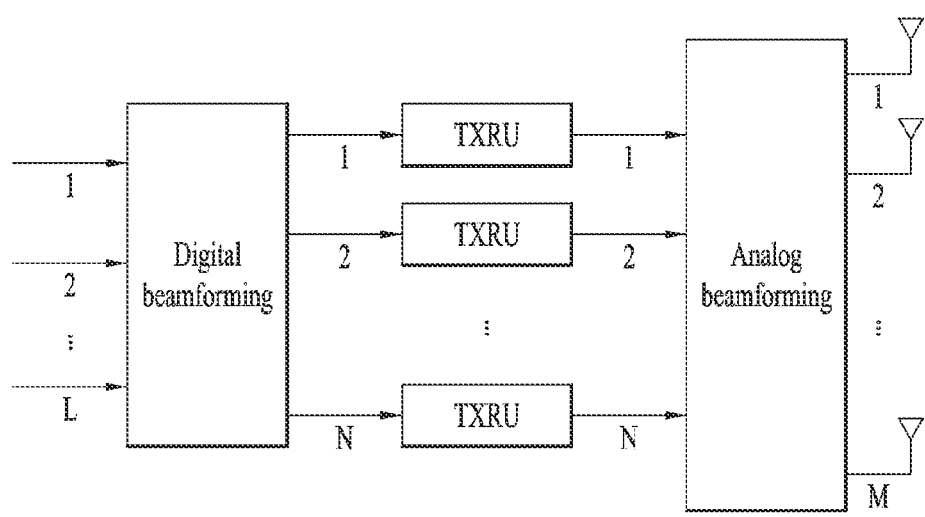
FIG. 9 is a schematic diagram illustrating a hybrid beamforming structure according to an embodiment of the present invention from the perspective of TXRUs and physical antennas.

FIG. 9 is a schematic diagram illustrating a hybrid beamforming structure according to an embodiment of the present invention from the perspective of TXRUs and physical antennas. In FIG. 9, it is assumed that the number of digital beams is L and the number of analog beams is N.

Additionally, a method for providing efficient beamforming to UEs located in a specific area by designing an eNB capable of changing analog beamforming on a symbol basis has been considered in the NR system to which the present invention is applicable. Further, a method of introducing a plurality of antenna panels where independent hybrid beamforming can be applied by defining N TXRUs and M RF antennas as one antenna panel has also been considered in the NR system to which the present invention is applicable.

When the eNB uses a plurality of analog beams as described above, each UE has a different analog beam suitable for signal reception. Thus, the beam sweeping operation where the eNB applies a different analog beam per symbol in a specific subframe (SF) (at least with respect to synchronization signals, system information, paging, etc.) and then perform signal transmission in order to allow all UEs to have reception opportunities has been considered in the NR system to which the present invention is applicable.

Figure 10:
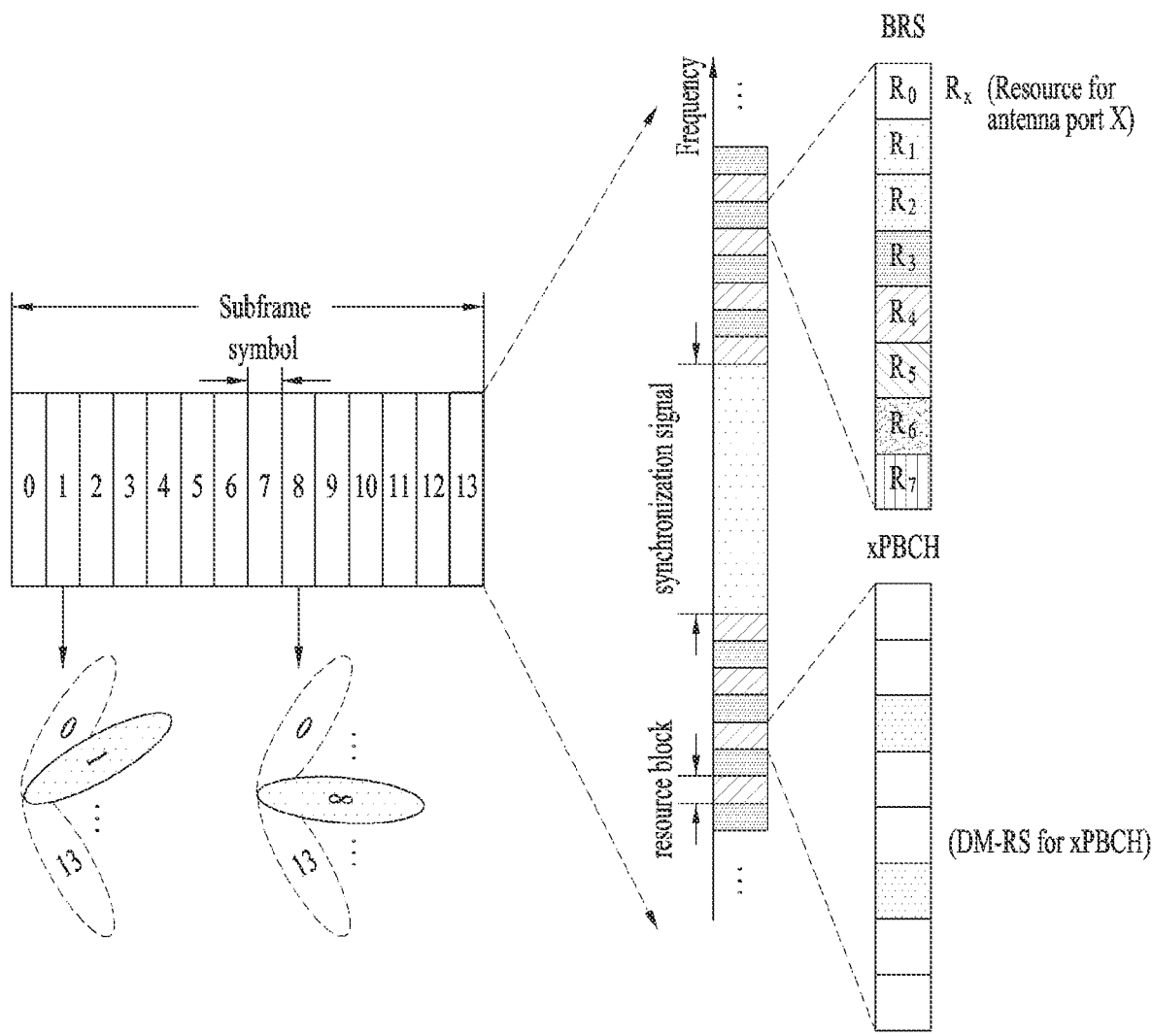
FIG. 10 is a diagram schematically illustrating beam sweeping operation for synchronization signals and system information during a downlink (DL) transmission process according to an embodiment of the present invention.

FIG. 10 is a diagram schematically illustrating the beam sweeping operation for synchronization signals and system information during a downlink (DL) transmission process according to an embodiment of the present invention In FIG. 10, a physical resource (or channel) for transmitting system information of the NR system to which the present invention is applicable in a broadcasting manner is referred to as a physical broadcast channel (xPBCH). In this case, analog beams belonging to different antenna panels can be simultaneously transmitted in one symbol.

In addition, the introduction of a beam reference signal (BRS) corresponding to the reference signal (RS) to which a single analog beam (corresponding to a specific antenna panel) is applied has been discussed as the configuration for measuring a channel per analog beam in the NR system to which the present invention is applicable. The BRS can be defined for a plurality of antenna ports, and each BRS antenna port may correspond to a single analog beam. In this case, unlike the BRS, all analog beams in the analog beam group can be applied to the synchronization signal or xPBCH unlike the BRS to assist a random UE to correctly receive the synchronization signal or xPBCH.

3. Proposed Embodiments

Based on the above-described technical features, uplink control information (UCI) mapping methods when UCI is transmitted in a physical uplink shared channel (PUSCH) resource region corresponding to a physical layer channel for UL data transmission will be described hereinafter. In other words, particular methods performed by a UE for transmitting UCI on a PUSCH will be described in detail in the present invention.

In the legacy LTE system, the peak to average power ratio (PAPR) is reduced to allow a UE to perform UL data transmission with high transmit power. By doing so, it is possible to increase UL coverage. That is, in the legacy LTE system, transmission has been performed based on the SC-FDMA (Single Carrier-Frequency Division Multiplexing Access), which has the single carrier property, or the DFT-s-OFDM (Discrete Fourier Transform-spread-OFDM) scheme. According to the SC-FDMA scheme, DFT precoding (or DFT spreading) is applied to data before the OFDM-based IDFR (Inverse Discrete Fourier Transform) (or IFFT (Inverse Fast Fourier Transform)) process. Thus, if the UE processes the M-point DFT block and N-point IDFT block (where N≥M) after generating M pieces of data, time-domain data of the UE is converted into the time-domain signal up-sampled by a ratio of N/M so that the single carrier features are satisfied.

However, the NR system to which the present invention is applicable can support not only SC-FDMA based PUSCH transmission but also CP-OFDM (Cyclic Prefix-OFDM) based PUSCH transmission (that is, the OFDM scheme where the DFT block is applied to data before OFDM), using PUSCH transmission waveforms. If the CP-OFDM based PUCCH transmission is performed, the NR system can support data and RS resource mapping which is somewhat free from the single carrier property. By doing so, it is possible to minimize RS overhead in each channel.

Accordingly, the NR system to which the present invention is applicable can support two schemes for the PUSCH transmission. As a particular example, if narrow UL coverage is enough, the UE perform CP-OFDM based PUSCH transmission according to the eNB's configuration. On the contrary, if wide UL coverage is required, the UE may perform SC-OFDM based PUSCH transmission.

In addition, in the NR system to which the present invention is applicable, a certain service such as URLLC may have ultra-low latency requirements. Thus, in some cases, URLLC data may be transmitted by puncturing previously transmitted eMBB data. For example, if the UE is instructed to transmit PUSCH2 for a URLLC service after receiving instruction to transmit PUSCH1 for an eMBB service, the UE may transmit PUSCH2 by puncturing some PUSCH1 data in a corresponding slot.

Moreover, in the NR system to which the present invention is applicable, UCI piggyback for transmitting UCI in the PUSCH region can be applied. In this case, UCI may be differently mapped to the PUSCH according to whether PUSCH transmission is performed based on either the CP-OFDM scheme or SC-FDMA scheme. Further, the design of UCI mapping can be changed by considering puncturing due to other services such as URLLC and the like.

In the following description, dynamic control information (DCI) may mean a dynamic control signal.

In addition, in the following description, resource elements (REs) may be represented on a grid of OFDM resources corresponding to time resources and subcarrier resources corresponding to frequency resources. Accordingly, a RE may imply a resource corresponding to a specific subcarrier and a specific OFDM symbol.

Moreover, in the following description, a demodulation reference signal (DM-RS) may mean a reference signal that supports reception operation such as channel estimation and the like for data demodulation.

Further, in the following description, a slot may mean a basic time unit for data scheduling and be composed of a plurality of symbols. And, as a minimum time unit for data scheduling, a mini-slot may be defined to have a time period shorter than the slot. In this case, the symbol may be the OFDM symbol or SC-FDMA symbol.

Additionally, in the following description, time-first mapping (or frequency-first mapping) may mean a scheme of performing RE allocation for specific frequency resources (or time resources) in the time-axis (or frequency-axis) direction and then performing RE allocation for other frequency resources (or time resources) in the time-axis (or frequency-axis) direction again.

Additionally, in the drawings of the present invention, a number on each RE may mean mapping priority for allocating UCI to REs.

3.1. First UCI Transmission Method

When a UE performs UCI piggyback on a PUSCH, the UE can concatenate coded data bits and coded UCI bits before modulating coded bits, which will be transmitted on the PUSCH, map signals obtained by modulating the concatenated coded bits to REs, and then transmit the signals on the PUSCH.

In this case, assuming that the amount of coded bits that can be transmitted on the PUSCH are N bits and the amount of coded UCI bits are M bits, the UE may concatenate the coded data bits with the coded UCI bits using one of the following methods.

(1) The UE may create the coded data bits according to the N-bit length, puncture partial M bits among the coded data bits, and may then insert the coded UCI bits at the corresponding position.

(2) The UE may create the coded data bits according to the (N−M)-bit length and then concatenate the coded data bits with the coded UCI bits.

In this case, among the coded data bits, M-bit information may be sequentially punctured from the least significant bit to the most significant bit.

In addition, assuming that the modulation order supports K bits, the length of the coded UCI bits may be restricted to have a multiple of K. By doing so, data and UCI can be separated from each other, and additional power can be allocated for UCI transmission REs.

Moreover, during the process for concatenating the coded data bits and coded UCI bits, bit-level interleaving may be applied, and then symbol-level interleaving may be additionally applied when RE mapping is performed for modulated symbols.

Figure 11:
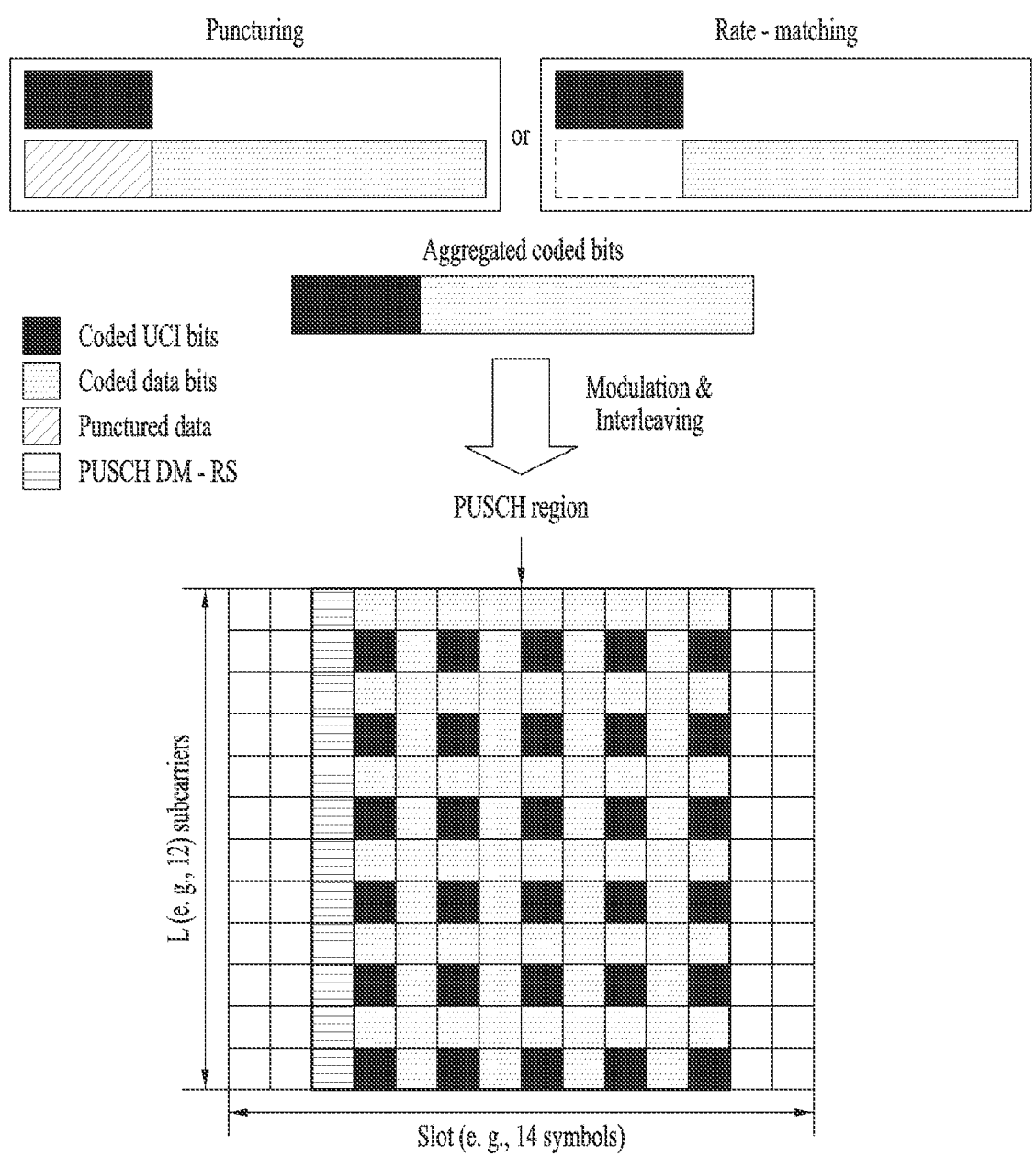
FIG. 11 is a diagram schematically illustrating a first UCI transmission method according to the present invention.

FIG. 11 is a diagram schematically illustrating the first UCI transmission method according to the present invention.

In FIG. 11, it is assumed that coded bits that can be transmitted on the PUSCH are N bits and coded UCI bits are M bits. In this case, the UE may puncture partial M bits among coded data bits before the modulation step (i.e., before the modulator block), modulate the entire coded bits, which is obtained by concatenating the coded UCI bits and coded data bits, and then transmit the modulated signal on the PUSCH as shown in the left side of FIG. 11. Alternatively, the UE may perform rate-matching such that the length of the coded data bits becomes (N−M) bits and then concatenate the coded UCI bits and coded data bits as shown in the right side of FIG. 11.

When data is mixed with UCI before performing RE mapping on the PUSCH as described above, it is possible to not only achieve interleaving of coded bits during the RE mapping process but also apply it to UCI in the same way. Thus, it has an advantage of obtaining the time/frequency diversity in UCI transmission.

Additionally, when data is transmitted using a plurality of code blocks (codeblocks (CBs)) or a code block group (CBG), coded UCI bits may be transmitted by being distributed over the CBs or CBG. For example, assuming that the coded bits that can be transmitted on the PUSCH are N bits, the coded UCI bits are M bits, and the number of CBGs is L, the UE can concatenate the coded data bits and coded UCI bits as follows.

1) First, the UE configures $\{N_1, N_2, \ldots, N_L\}$ satisfying the condition of $N_1+N_2+ \ldots +N_L=N$ bits and $\{M_1, M_2, \ldots, M_L\}$ satisfying the condition of $M_1+M_2+ \ldots +M_L=M$ bits. Thereafter, the UE allocates $N_1$ coded data bits to the $l^{th}$ CBG among the L CBGs (where $l=1, 2, \ldots, L$), punctures partial M bits among the coded data bits, and inserts the coded UCI bits at the corresponding position.

2) The UE configures $\{N_1, N_2, \ldots, N_L\}$ satisfying the condition of $N_1+N_2++N_L=(N-M)$ bits and $\{M_1, M_2, \ldots, M_L\}$ satisfying the condition of $M_1+M_2+ \ldots +M_L=M$ bits. Thereafter, the UE allocates $N_1$ coded data bits to the $l^{th}$ CBG among the L CBGs (where $l=1, 2, \ldots, L$) and then additionally concatenate $M_1$ coded UCI bits therewith.

In the following description, it is assumed that a resource element (RE) means a resource corresponding to one subcarrier in the OFDM symbol, and a resource block (RB) or physical resource block (PRB) means a resource allocation unit composed of $M_1$ symbols (e.g., 7 or 14) in the time domain and $M_2$ subcarriers (e.g., 12) in the frequency domain.

In the NR system to which the present invention is applicable, the channel coding chain can be defined as the following series of processes.

[Channel Coding Chain]

[1] TB (transport block): generating a TB according to TBS (transport block size)

[2] TB CRC (cyclic redundancy check) attachment: applying CRC to the TB

[3] CB (code block) segmentation: diving the TB into a plurality of CBs (when the TB has a size equal to or greater than a predetermined value)

[4] CB CRC attachment: applying CRC to the CBs.

[5] Channel coding: performing channel coding for each CB

In this case, if coded bits are divided into a systematic bit group and nah parity bit group (where $n=1, 2, 3, \ldots$) according to channel coding schemes, a sub-block interleaver may be applied to mix the bit order in each bit group. Thereafter, additional interleaving may also be applied to each bit group.

[6] Rate matching: inputting code bits of each CB into a (circular) buffer according to specific order (e.g., systematic bit→parity bit) and selecting a series of coded bits corresponding to the amount of bits (per CB) that can be transmitted on a data transmission channel from a specific start point in the (circular) buffer In this case, the specific start point in the (circular) buffer can be indicated through DL scheduling DCI or RV (redundancy version) in the DL scheduling DCI.

In addition, when the buffer is a circular buffer, if L bits are selected for a specific CB, the L selected bits may correspond to index $(k_0)$ mod K, index $(k_0+1)$ mod K, . . . , index ($(k_0+L) \mod K$), where index $k_0$ is the point indicated by the DCI or RV and K is the total size of the circular buffer.

[7] CB concatenation: concatenating coded bits in each CB

[8] Channel interleaving: performing data RE mapping

Additionally, when data is composed of a plurality of CBs (or CBG), coded UCI bits can be distributed over the CBs (or CBG). In this case, while performing rate-matching of the channel coding chain in each CB (or CBG), the UE may insert all (or some) of the coded UCI bits by puncturing the rear part of a bit stream outputted from the (circular) buffer.

As a particular example, if the RV is 0, the front portion of the stream outputted from the circular buffer is composed of systematic bits, and the rear portion is composed of parity bits. That is, the parity bits may be punctured to insert the (partial) coded UCI bit.

Alternatively, while performing rate-matching of the channel coding chain in each CB (or CBG), the UE may insert the UCI by puncturing data from the last bit (with reference to order of bits in the bit stream inputted to the (circular) buffer) of the parity bits (in reverse order of the bits in the bit stream inputted to the (circular) buffer). In other words, the UE may replace the UCI from the last bit of the parity bits outputted from the (circular) buffer.

Figure 12:
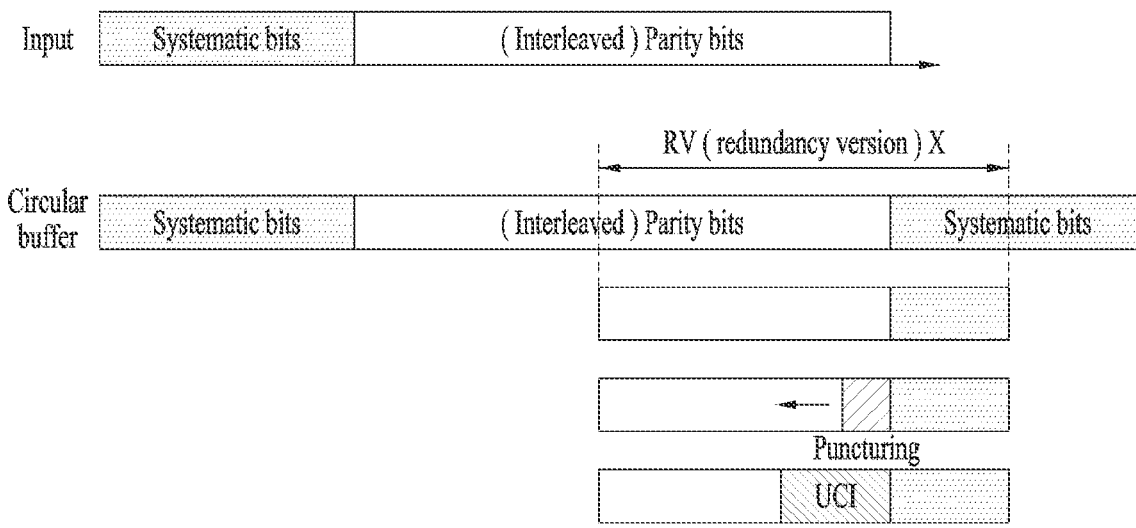
FIG. 12 is a diagram schematically illustrating operation of inserting UCI by performing data puncturing on parity bits in a bit stream outputted from a (circular) buffer starting from the last bit (with reference to order of bits in a bit stream inputted to the (circular) buffer) according to a specific RV value.

FIG. 12 is a diagram schematically illustrating operation of inserting UCI by performing data puncturing on parity bits in a bit stream outputted from a (circular) buffer starting from the last bit (with reference to order of bits in a bit stream inputted to the (circular) buffer) according to a specific RV value.

In addition, after configuring a coded CB (with or without interleaving), the UE may distribute UCI over the entirety of the coded CB. In this case, if the UE intends to perform rate-matching or puncturing on data bits in the coded CB, the UE may operate as follow.

1] When it is assumed that the number of bits in the coded CB is N and the number of coded UCI bits is M, if the UE performs rate-matching, the UE can insert one UCI bit every N/M CB bits.

2] When it is assumed that the number of bits in the coded CB is N and the number of coded UCI bits is M, if the UE performs puncturing, the UE may replace bit information with one UCI bit every (N−M)/M CB bits.

3] In this case, after modulation of the coded bits where the CB is combined with the UCI, the UE may perform RE mapping on PUSCH resources where the modulated symbols are allocated in a frequency-first (or time-first) manner. In this case, the frequency-first (or time-first) RE mapping may mean that RE mapping is performed first on a certain frequency-domain (or time-domain) resources and then performed on the next frequency-domain (or time-domain) resource. In this case, the RE mapping order on frequency-domain (or time-domain) resources may comply with frequency-domain indices or a specific pattern.

4] In addition, the value of N and M may be determined per modulation symbol rather than bit.

5] Moreover, the data bits in the coded CB, which will be rate-matched or punctured for UCI piggyback, may include both systematic and parity parts, or they may include only the parity part except the systematic part.

Figure 13:
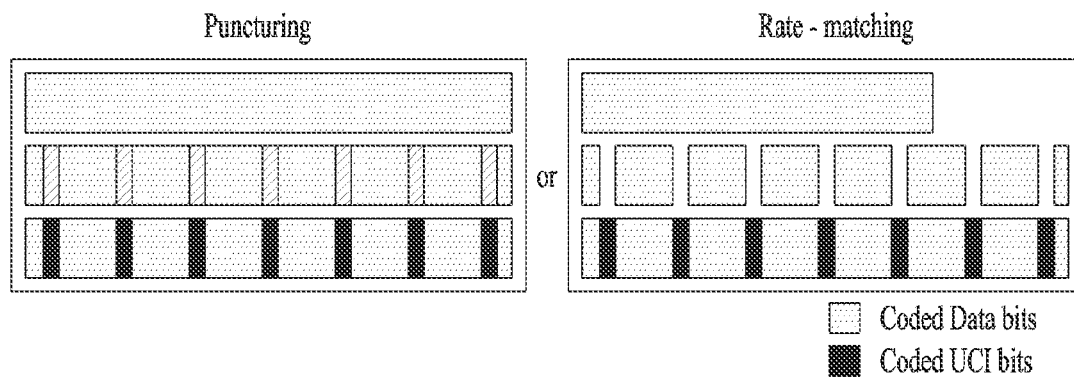
FIG. 13 is a diagram schematically illustrating a method for distributing UCI over the entirety of a coded CB by performing puncturing or rate-matching (on data bits in the coded CB)

FIG. 13 is a diagram schematically illustrating a method for distributing UCI over the entirety of a coded CB by performing puncturing or rate-matching (on data bits in the coded CB).

Additionally, when a bit interleaver is applied (per CB) (that is, interleaving of bits in each CB) to the CBs generated after the channel coding process, the UE may perform UCI piggyback as follows.

<1> when the UE performs UCI piggyback, the UE uniformly distributes coded UCI bits (per CB) over all CBs.

<2> The UE performs rate-matching on each CB for the coded UCI bits (per CB).

<3> After concatenating the (rate-matched) CBs and coded UCI bits (per CB), the UE applies the bit interleaver (per CB) to the concatenated coded bits.

<4> After modulating the (interleaved) coded bits, the UE maps the coded bits to REs in the PUSCH. In this case, the RE mapping may be performed in the same way as the data (e.g., UL-SCH) RE mapping process on the PUSCH.

Additionally, to distribute UCI mapping REs over the time and frequency domains, the following UCI mapping methods can be considered.

1> Method #1: A method of mapping 4M REs to the first symbol (according to the symbol order) and then perform mapping on the next symbol A> The 4M REs may have indices of $\{0+m, 3M+m, 6M+m, 9M+m\}$ (where m=0, . . . , M−1). In addition, a (different) specific offset (e.g., symbol index) may be added per symbol.

i> Example: RE index in symbol #A=$\{0+m+A, 3M+m+A, 6M+m+A, 9M+m+A\}$ or $\{0+m+A*M, 3M+m+A*M, 6M+m+A*M, 9M+m+A*M\}$ ii> Example: RE index in symbol #A=$\{(0+m+A) \mod 12M, (3M+m+A) \mod 12M, (6M+m+A) \mod 12M, (9M+m+A) \mod 12M\}$ or $\{(0+m+A*M) \mod 12M, (3M+m+A*M) \mod 12M, (6M+m+A*M) \mod 12M, (9M+m+A*M) \mod 12M\}$ B> The mapping of first 4 REs (0M, 3M, 6M, 9M) (from the perspective of UCI RE mapping) among the 4M RE indices may be performed as follows.

i> 0M→3M→6M→9M
ii> 0M→6M→3M→9M
iii> 0M→9M→3M→6M
iv> 3M→9M→0M→6M
v> 0M→9M→6M→3M

C> The mapping of 4 REs, i.e., $4+m^{th}$, $5+m^{th}$, $6+m^{th}$, and $7+m^{th}$ REs (where, m=0, 1, . . . , M−1) (from the perspective of UCI RE mapping) may be performed as follows.

i> 0M+m→3M+m→6M+m→9M+m
ii> 0M+m→6M+m→3M+m→9M+m
iii> 0M+m→9M+m→3M+m→6M+m
iv> 3M+m→9M+m→0M+m→6M+m
v> 0M+m→9M+m→6M+m→3M+m D> After performing the mapping until the last symbol, the above-described mapping processes are performed on different 4M REs with indices of $\{0+m, 3M+m, 6M+m, 9M+m\}$ (where m=M, . . . , 2M−1) in the first symbol again.

E> In this configuration, the value of M may be determined according to the number of RBs allocated to the PUSCH and/or the number of symbols allocated to the PUSCH (except the DMRS) and/or the MCS (Modulation and Coding Scheme) indicated by the PUSCH and/or the number of coded UCI bits and/or the number of UCI coding modulation symbols (REs). For example, the value of M may be set equal to the number of RBs allocated to the PUSCH.

2> Method #2: A method of mapping 12M REs to the first symbol (according to the symbol order) and then perform mapping on the next symbol
  A> The 12M REs may have indices of {0+m, 3M+m, 6M+m, 9M+m}(where m=0, . . . , 3M−1). In addition, a (different) specific offset (e.g., symbol index) may be added per symbol.
    i> RE index in symbol #A={(O+m+A) mod 12M, (3M+m+A) mod 12M, (6M+m+A) mod 12M, (9M+m+A) mod 12M} or {(O+m+A*M) mod 12M, (3M+m+A*M) mod 12M, (6M+m+A*M) mod 12M, (9M+m+A*M) mod 12M}
  B> The mapping of first 4 REs (0M, 3M, 6M, 9M) (from the perspective of UCI RE mapping) among the 4M RE indices may be performed as follows.
    i> 0M→3M→6M→9M
    ii> 0M→6M→3M→9M
    iii> 0M→9M→3M→6M
    iv> 3M→9M→0M→6M
    v> 0M→9M→6M→3M
  C> The mapping of 4 REs, i.e., $4+m^{th}$, $5+m^{th}$, $6+m^{th}$, and $7+m^{th}$ REs (where, m=0, 1, . . . , 3M−1) (from the perspective of UCI RE mapping) may be performed as follows.
    i> 0M+m→3M+m→6M+m→9M+m
    ii> 0M+m→6M+m→3M+m→9M+m
    iii> 0M+m→9M+m→3M+m→6M+m
    iv> 3M+m→9M+m→0M+m→6M+m
    v> 0M+m→9M+m→6M+m→3M+m
  D> In this configuration, the value of M may be determined according to the number of RBs allocated to the PUSCH and/or the number of symbols allocated to the PUSCH (except the DMRS) and/or the MCS indicated by the PUSCH and/or the number of coded UCI bits and/or the number of UCI coding modulation symbols (REs). For example, the value of M may be set equal to the number of RBs allocated to the PUSCH.
3> Method #3: A method of defining P clusters (C_0, C_1, C_2, . . . , C_(P−1)) and then mapping UCI to the P clusters
  A> The (local) subcarrier index (in the PUSCH) corresponding to frequency-domain cluster C_L (where L=0, 1, 2, . . . , P−1) can be defined as follows.
    i> C_L={L*M+0, L*M+1, . . . , L*M+M−1}, L=0, 1, 2, . . . , P−1
  In this case, assuming that the total number of REs (per symbol) in the PUSCH is $M_0$, M can be given as M=$M_0$/P. In addition, the number P of clusters may be configured by the eNB.
  B> RE mapping on the $(Q*P+k)^{th}$ modulation symbol (where k=0, 1, . . . , P−1 and Q=0, 1, 2, 3, . . . ) for UCI may be defined as follows.
    i> In the case of P=4
  For array A, RE mapping is applied to the RE with the (local) index (in the PUSCH) of A[k]*M+(Q mod M) (or (A[k]+1)*M−(Q mod M)−1)) in cluster C_A[k].
  Here, array A may be one of the following arrays.
    A=[0 1 2 3]
    A=[0 2 1 3]
    A=[0 3 1 2]
    A=[1 3 0 2]
    A=[0 3 2 1]
  In this case, A[k] means the value corresponding to index k of array A.
    ii> In the case of P=$2^N$
  For array A, RE mapping is applied to the RE with the (local) index (in the PUSCH) of A[k]*M+(Q mod M) (or (A[k]+1)*M−(Q mod M)−1) in cluster C_A[k].
  Here, array A may be a bit reversal permutation sequence for $2^N$.
  In addition, A[k] means the value corresponding to index k of array A.
    c> After performing UCI mapping on all REs in one symbol (in the PUSCH), RE mapping is performed on the next symbol.
4> Method #4: The method of defining P clusters (C_0, C_1, C_2, . . . , C_(P−1)) and then mapping UCI to the P clusters
  A> The (local) subcarrier index (in the PUSCH) corresponding to frequency-domain cluster C_L (where L=0, 1, 2, . . . , P−1) can be defined as follows.
    i> C_L={L*M+0, L*M+1, . . . , L*M+M−1}, L=0, 1, 2, . . . , P−1
  In this case, assuming that the total number of REs (per symbol) in the PUSCH is $M_0$, M can be given as M=$M_0$/P. In addition, the number P of clusters may be configured by the eNB.
  B> RE mapping on the $(Q*P+k)^{th}$ modulation symbol (where k=0, 1, . . . , P−1 and Q=0, 1, 2, 3, . . . ) for UCI may be defined as follows.
    i> In the case of P=4
  For the symbol with the index of V=Q mod N_SYMBOL, the following UCI mapping method is applied. In this case, for array A, RE mapping is applied to the RE with the (local) index (in the PUSCH) of A[k]*M+W (or A[k]*M−W+M−1) in cluster C_A[k].
  Here, N_SYMBOL indicates the total number of symbols on which UCI mapping is performed, and W is defined as W=floor(Q/N_SYMBOL).
  In addition, array A may be one of the following arrays.
    A=[0 1 2 3]
    A=[0 2 1 3]
    A=[0 3 1 2]
    A=[1 3 0 2]
    A=[0 3 2 1]
  In this case, A[k] means the value corresponding to index k of array A.
    ii> In the case of P=$2^N$
  For the symbol with the index of V=Q mod N_SYMBOL, the following UCI mapping method is applied. In this case, for array A, RE mapping is applied to the RE with the (local) index (in the PUSCH) of A[k]*M+W (or A[k]*M−W+M−1) in cluster C_A[k].
  Here, N_SYMBOL indicates the total number of symbols on which UCI mapping is performed, and W is defined as W=floor(Q/N_SYMBOL).
  In addition, array A may be a bit reversal permutation sequence for $2^N$.
  Moreover, A[k] means the value corresponding to index k of array A.
5> Method #5: The method of defining P clusters (C_0, C_1, C_2, . . . , C_(P−1)) and then mapping UCI to the P clusters
  A> Subcarriers included in each cluster can be defined according to one of the following options
    i> Option 1: Determination according to a predetermined rule For example, the (local) subcarrier index (in the PUSCH) corresponding to frequency-domain cluster C_L (where L=0, 1, 2, . . . , P−1) can be defined as follows.

C_L={L*M+0, L*M+1, . . . , L*M+M−1}, L=0, 1, 2, . . . , P−1

Here, assuming that the total number of REs (per symbol) in the PUSCH is $M_0$, M can be given as M=$M_0$/P. Alternatively, the values of M and P may be configured by the eNB and/or determined according to the number of UCI REs.

ii> Option 2: The eNB configures subcarriers included in each cluster (through a higher layer signal and the like). In this case, the number P of clusters may be configured by the eNB.

B> The UCI mapping order between clusters can be determined according one of the following options.

i> Option 1: Determination according to specific array A

For example, for array A, the UCI mapping order between the clusters may be defined as follows: Cluster C_A[0], Cluster C_A[1], . . . , Cluster C_A[P−1].

Here, A[k] means the value corresponding to index k of array A.

In addition, array A may be given as follows.

A> In the case of P=4
    A=[0 1 2 3]
    A=[0 2 1 3]
    A=[0 3 1 2]
    A=[1 3 0 2]
    A=[0 3 2 1]
    B> In the case of P=2N Array A may be a bit reversal permutation sequence for $2^N$.

ii> Option 2: The UCI mapping order between the clusters is determined by the eNB.

C> The UCI mapping order between subcarriers in the cluster can be determined according to one of the following options.

i> Option 1: Ascending order of frequency indices
    ii> Option 2: Descending order of frequency indices
    iii> Option 3: The UCI mapping order between the subcarriers is determined by the eNB.

For example, option 1 or option 2 may be applied depending on the frequency-domain resource location of a cluster. Specifically, if a cluster is included in the frequency region corresponding to the left half of PUSCH resources, option 1 is applied. Otherwise, option 2 may be applied.

In addition, the UCI mapping order between the subcarriers in the cluster may mean the order of arranging the subcarriers in the cluster when (UCI mapping target) modulated UCI symbols sequentially occur in the corresponding cluster.

D> Thereafter, the UE can perform (cluster-based) UCI mapping as follows.

i> The UE perform the UCI mapping on the modulated UCI symbols with respect to the total P clusters according to the UCI mapping order between clusters (in a specific symbol). In this case, the UE may perform the UCI mapping by allocating one modulated UCI symbol per cluster in each order.

ii> When the UE needs to perform the UCI mapping on P*S modulated UCI symbols (where S is a natural number), the UE may operate according one of the following options.

1>> Option 1: If S has a specific value (in terms of the UCI mapping), the UE moves to the next symbol and then performs the (cluster-based) UCI mapping on the corresponding symbol. Alternatively, the UE performs the UCI mapping on the UCI symbols, which are re-modulated for the current symbol, with respect to the total P clusters according to the UCI mapping order between the clusters. In this case, if the UE performs the UCI mapping on all the symbols, the UE goes back to the first symbol and then performs the (cluster-based) UCI mapping on the corresponding symbol.

2>> Option 2: Until completing the UCI mapping on all (frequency) resources in the current symbol, the UE performs the UCI mapping on the re-modulated UCI symbols with respect to the total P clusters according to the UCI mapping order between the clusters.

iii> When performing the UCI mapping on (specific) modulated UCI symbols in each cluster, the UE determines the locations of the subcarriers for the modulated UCI symbols according to UCI mapping order between subcarriers in a corresponding cluster.

Figure 14:
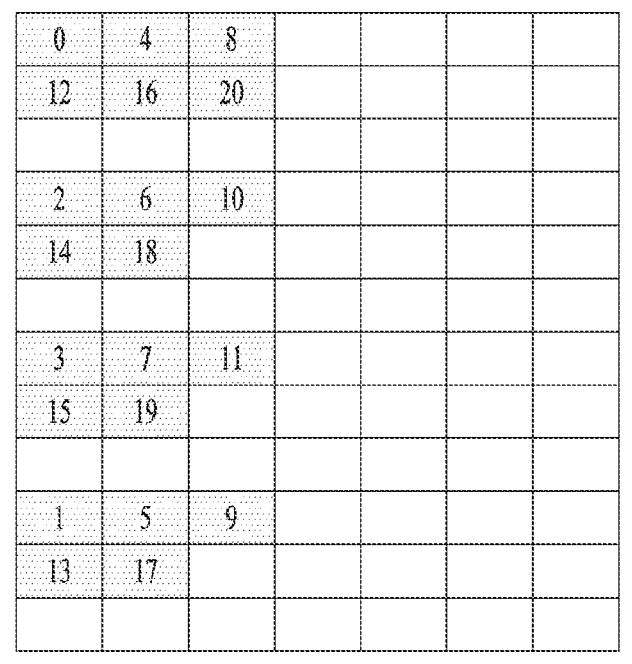

FIG. 14 is a diagram schematically illustrating UCI mapping on first three symbols according to method #1. In FIG. 14, it is assumed that the order of 0→9M→3M→6M is applied to first four REs.

In FIG. 14, the number indicates UCI-to-RE mapping priority, shadow areas correspond to UCI, and non-shadow areas correspond to data. In addition, the subcarrier (or frequency) index increases from the top to the bottom, and the symbol (or time) index increases from the left to the right.

Figure 15:
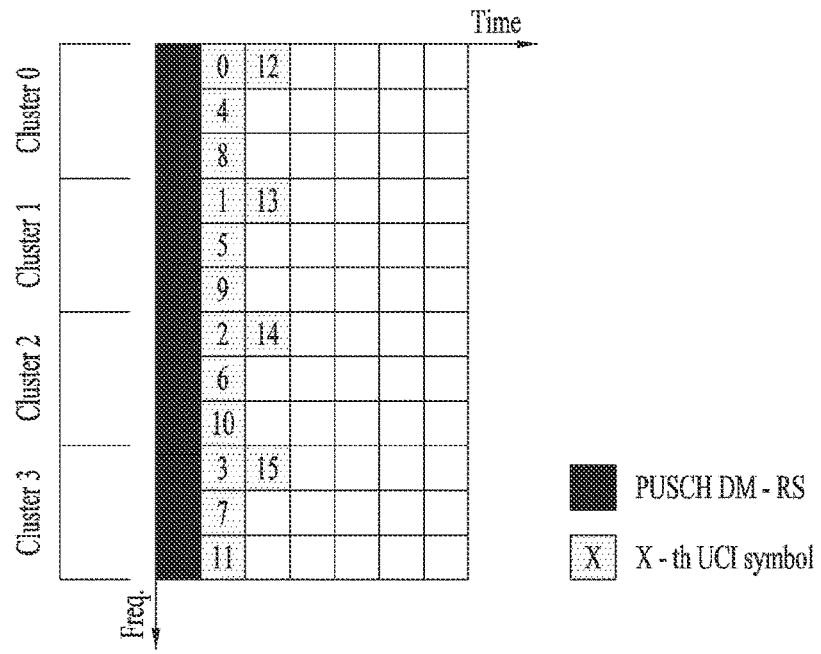
FIGS. 15 to 17 are diagrams schematically illustrating examples of UCI mapping according to method #5 proposed in the present invention.

FIG. 15 is a diagram schematically illustrating an example of UCI mapping according to method #5.

As shown in FIG. 15, when there are four clusters, the UE may perform UCI mapping between the clusters in the following order: [Cluster 0→Cluster 1→Cluster 2→Cluster 3] and perform the UCI mapping between subcarriers in each cluster in ascending order of frequency indices. In addition, after completing the UCI mapping on all (available) frequency resources in one symbol, the UE may perform the UCI mapping on the next symbol.

Figure 16:
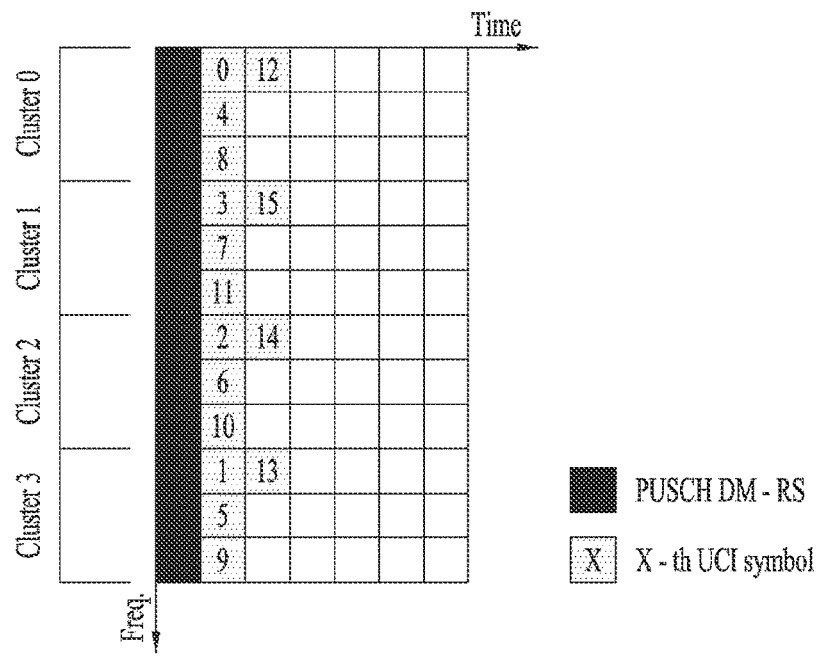

FIG. 16 is a diagram schematically illustrating another example of UCI mapping according to method #5.

As shown in FIG. 15, when there are four clusters, the UE may perform UCI mapping between the clusters in the following order: [Cluster 0→Cluster 3→Cluster 2→Cluster 1] and perform the UCI mapping between subcarriers in each cluster in ascending order of frequency indices. In addition, after completing the UCI mapping on all (available) frequency resources in one symbol, the UE may perform the UCI mapping on the next symbol.

Figure 17:
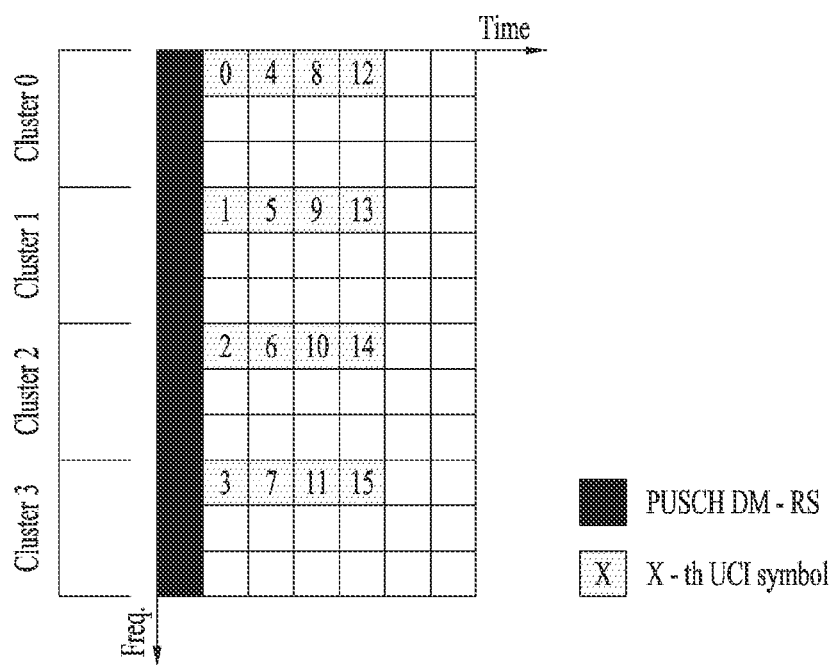

FIG. 17 is a diagram schematically illustrating still another example of UCI mapping according to method #5.

As shown in FIG. 17, when there are four clusters, the UE may perform UCI mapping between the clusters in the following order: [Cluster 0→Cluster 1→Cluster 2→Cluster 3] and perform the UCI mapping between subcarriers in each cluster in ascending order of frequency indices. In addition, after performing the UCI mapping (on four UCI REs) with respect to all clusters in one symbol, the UE may perform the UCI mapping on the next symbol.

In the following description, a RE mapping rule related to specific UCI may mean the positions of REs to which coded bits (or coded symbols) of the corresponding UCI are allocated and the allocation order thereof. Regarding the UCI-to-RE mapping rule, if the kith RE(s) is not available, the UE may skip the corresponding RE(s) and then reinitiate the UCI coded bits (or coding symbols) to RE mapping process at the next RE (e.g., $k_1$+1).

In this specification, a (frequency-domain) cluster means a set composed of (neighboring) specific subcarriers. In addition, a resource element (RE) means a physical (time/ frequency) resource corresponding to one (OFDM) symbol and one subcarrier in the OFDM structure.

According to the present invention, when the UE transmits (specific) UCI on the PUSCH (e.g., UCI piggyback or UCI transmission on PUSCH), the UE can apply the (frequency-domain) cluster based RE mapping rule (for UCI) as follows (hereinafter referred to as UCI mapping method #6).

1]] P clusters (which are distinguished from each other in the frequency domain) are configured for the UE.
  A]] In this case, subcarriers included in each cluster may be determined according to one of the following options.
    i]] Option 1: A predetermined rule (between the eNB and UE)
  For example, the indices of subcarriers included in the $L^{th}$ cluster (where $L \in \{0, 1, 2, \ldots, P-1\}$) among the P clusters may be defined as follows, with reference to the local subcarrier index in the PUSCH.

$C\_L = \{L*M+0, L*M+1, \ldots, L*M+M-1\}, L=0,1, 2, \ldots, P-1$

Here, assuming that the total number of REs (per symbol) in the PUSCH is $M_0$, M can be give as $M=M_0/P$. Alternatively, the values of M and P may be configured by the eNB and/or determined according to the number of UCI REs.
    ii]] Option 2: The eNB configures at least one piece of the following information (through a higher layer signal), and the UE recognizes the configured clusters based on the (plurality of pieces of) information.
      1. The number of clusters
      2. The start point (or subcarrier index) of each cluster (in the frequency domain)
      3. The end point (or subcarrier index) of each cluster (in the frequency domain)
      4. The (frequency-domain) resources (or subcarrier indices) included in each cluster
      5. Information on REs (or subcarriers) excluded (from UCI mapping) in each cluster
  B]] When configuring the indices of subcarriers constituting the cluster per (UCI mapping target) symbol, the UE may calculate the cluster per symbol by applying different frequency-domain offset to each (UCI mapping target) symbol in addition to the reference cluster (configuration).
  For example, assuming that option 1 is applied in the above-described example,
  The indices of subcarriers included in the $L^{th}$ cluster (e.g., C_L) (where $L \in \{0, 1, 2, \ldots, P-1\}$) among P clusters in a $k^{th}$ symbol may be defined as follows, with reference to the local subcarrier index in the PUSCH.
    A. $C\_L = \{(L*M+0+k) \mod M_0, (L*M+1+k) \mod M_0, \ldots, (L*M+M-1+k) \mod M_0\}, L=0, 1, 2, \ldots, P-1$
    B. $C\_L = \{(L*M+0-k) \mod M_0, (L*M+1-k) \mod M_0, \ldots, (L*M+M-1-k) \mod M_0\}, L=0, 1, 2, \ldots, P-1$
  Here, assuming that the total number of REs (per symbol) in the PUSCH is $M_0$, M can be give as $M=M_0/P$. Alternatively, the values of M and P may be configured by the eNB and/or determined according to the number of UCI REs.

2]] The UCI mapping order between configured P cluster(s) is defined.
  A]] The UCI mapping order between the clusters can be determined according to one of the following methods.
    i]] The P cluster(s) may be indexed in ascending (or descending) order in the frequency domain. That is, a random subcarrier in an $L_1^{th}$ cluster may be always in front (or back) of a random subcarrier in an $L_2^{th}$ cluster (where $L_2 > L_1$) in the frequency domain.
    ii]] Option 1: The UCI mapping order between the clusters is determined according to specific array A.
  For array A, the UCI mapping order between the clusters may be defined as follows: $A[0]^{th}$ Cluster, $A[1]^{th}$ Cluster, ..., $A[P-1]^{th}$ Cluster.
  In the case, array A may be one of the following arrays.
  A]] In the case of P=4
    1. A=[0 1 2 3]
    2. A=[0 2 1 3]
    3. A=[0 3 1 2]
    4. A=[1 3 0 2]
    5. A=[0 3 2 1]
  B]] In the case of $P=2^N$
  Array A is a bit reversal permutation sequence for $2^N$.
  C]] In the case of P=2Q
    1. A=[0 P-1 1 P-2 2 P-3 ... k P-(k+1) ... Q-1 P-Q]
    2. A=[P-1 0 P-2 1 P-3 2 ... P-(k+1) k ... P-Q Q-1]
    iii] Option 2: The UCI mapping order between the clusters may be configured by the eNB (through a higher layer signal).

3]] The UCI mapping order (between subcarriers) in the cluster is defined.
  A]] The UCI mapping order between the subcarriers in the cluster may mean the order of allocating coded UCI bits (or coded UCI symbols) to the subcarriers in the cluster when the coded UCI bits (or coded UCI symbols) occur in the corresponding cluster.
  B]] In this case, the frequency index of the first subcarrier in the cluster at which UCI mapping starts may differ in each symbol. For example, as the time index of the symbol increases, the index of the first subcarrier in the cluster at which UCI mapping starts may proportionally increase (or decrease) (however, the final subcarrier index may be calculated through modulo operation for the total number of subcarriers in the cluster.
  C]] The UCI mapping order between the subcarriers in the cluster may be determined according to one of the following options.
    i]] Option 1: Ascending order of frequency indices
  For example, when the cluster is composed of M subcarriers, the UCI mapping is performed first with respect to a $k^{th}$ frequency index and then performed with respect to the $((k+1) \mod M)^{th}$ frequency index.
    ii]] Option 2: Descending order of frequency indices
  For example, when the cluster is composed of M subcarriers, the UCI mapping is performed first with respect to a $k^{th}$ frequency index and then performed with respect to the $((k-1) \mod M)^{th}$ frequency index.
    iii] Option 3: The UCI mapping order between the subcarriers in the cluster is determined by the eNB (through a higher layer signal).
    iv] The UCI mapping order between the subcarriers in the cluster may differ according to the type of UCI. For example, in the case of HARQ-ACK, the UCI mapping order between the subcarriers in the cluster may comply with the ascending (or descending) order of the frequency indices, and in the case of CSI, the UCI mapping order between the subcarriers in the cluster may comply with the descending (or ascending) order of the frequency indices (for example, this is to prevent CSI from being punctured due to HARQ-ACK).

4]] The cluster-based UCI mapping is performed on a plurality of symbol(s).
  A]] The UE may perform the (cluster-based) UCI mapping from the first symbol (from the perspective of UCI mapping) according to the following steps.

i]] Step 1: The UE performs UCI mapping of coded UCI bits (or coded UCI symbol) (in the symbol) with respect to the total P clusters according to the UCI mapping order between the clusters.

In this case, the UE may perform the UCI mapping on X RE(s) (e.g., X=1) per cluster in each order.

In addition, when the (UCI mapping target) coded UCI bits (or coded UCI symbols) occurs (sequentially) in each cluster, the UCI mapping of the coded UCI bits (or coded UCI symbols) is performed according to the UCI mapping order between the subcarriers (in the cluster). For example, from the perspective of a specific cluster, the $n^{th}$ allocated coded UCI bit (or coded UCI symbol) may be allocated to the subcarrier with the $n^{th}$ allocation priority in the UCI mapping order between the subcarriers in the corresponding cluster.

If there is no subcarrier to which the UCI will be allocated in a specific cluster, the UE may move to the next cluster and then perform the UCI mapping thereon.

In addition, if a phase tracking reference signal is configured in a specific UCI mapping target RE (or subcarrier), the UE may skip the UCI mapping in the corresponding RE and then allocated the UCI to the next UCI mapping target RE.

ii] Step 2: If the UE performs step 1 S times (in one symbol), the UE moves to the next symbol (in terms of the UCI mapping) and then performs step 1.

In this case, the value of S may be one or set to the number of times that step 1 is performed until the UCI mapping is performed on all available frequency resources (in one symbol).

Alternatively, when the UE performs step 1 (the same number of times) on all (UCI mapping target) symbols, the UE may apply one of the following options.

1. Option 1: The UE may perform step 1 again from the first symbol (in terms of the UCI mapping) (that is, the order between UCI mapping target symbols is maintained).
2. Option 2: The UE may perform step 1 from the last symbol (in terms of the UCI mapping) in reverse order.

Figure 18:
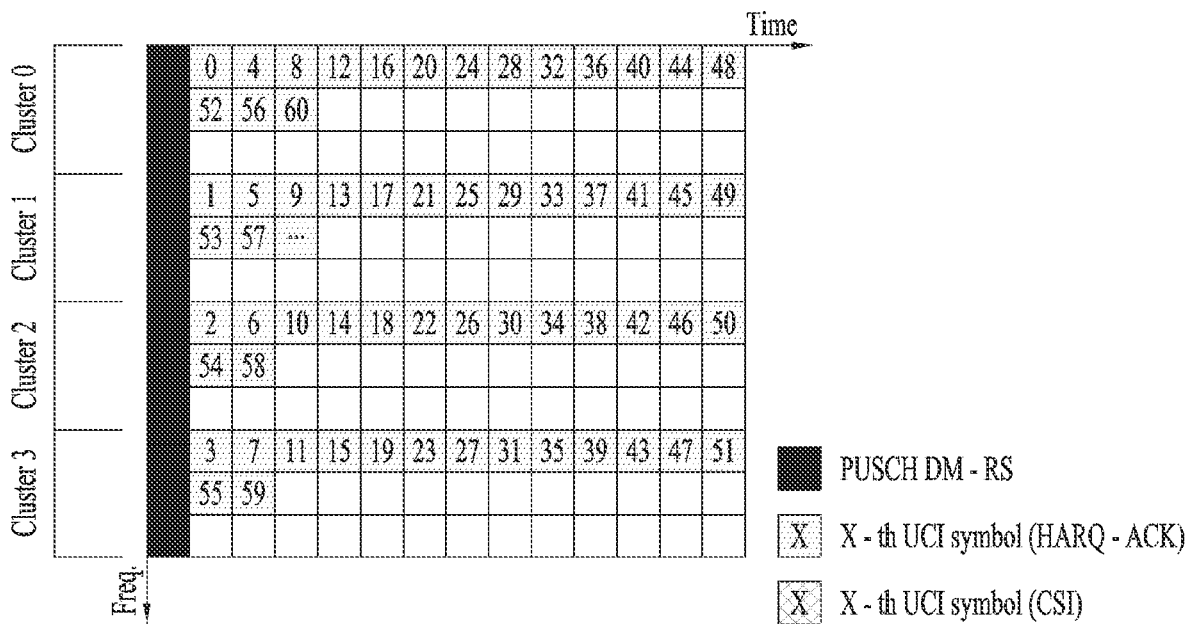
FIGS. 18 to 23 are diagrams schematically illustrating examples of UCI mapping according to method #6 proposed in the present invention.
Figure 18:
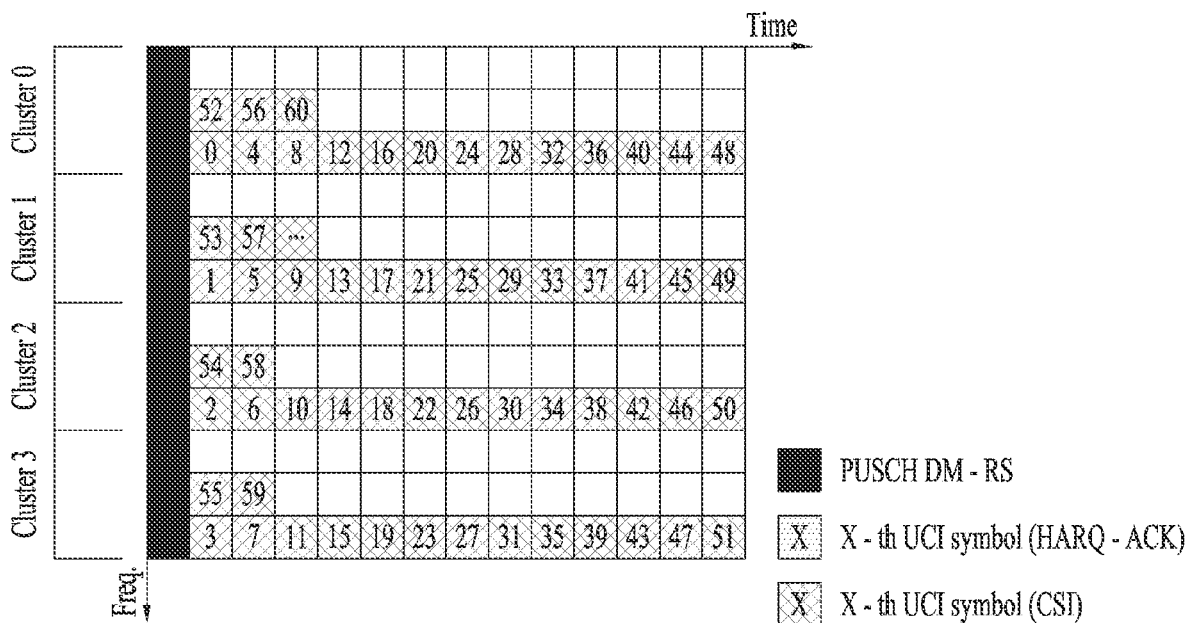

FIG. 18 is a diagram schematically illustrating an example of UCI mapping according to method #6.

As shown in FIG. 18, when there are four clusters, the UE may perform UCI mapping on the clusters in the following order: [Cluster 0→Cluster 1→Cluster 2→Cluster 3], perform UCI mapping on subcarriers for HARQ-ACK (in each cluster) in ascending order of frequency indices, and perform UCI mapping on subcarriers for CSI (in each cluster) in descending order of frequency indices. In this case, the number of UCI REs allocated at one time to each cluster may be set to 1 (e.g., X=1), and the number of times that cluster-based UCI mapping is performed (in one symbol) may be set to 1 (e.g., S=1). In addition, all the symbols in the PUSCH may be set to UCI mapping targets, and the UCI mapping order between symbols may be set equal to ascending (or descending) order of time indices. According to this configuration, when the UE punctures some REs in the PUSCH due to HARQ-ACK, if HARQ-ACK mapping REs overlap with CSI mapping REs, the UE may puncture CSI at the corresponding position and then map the REs for the HARQ-ACK.

Figure 19:
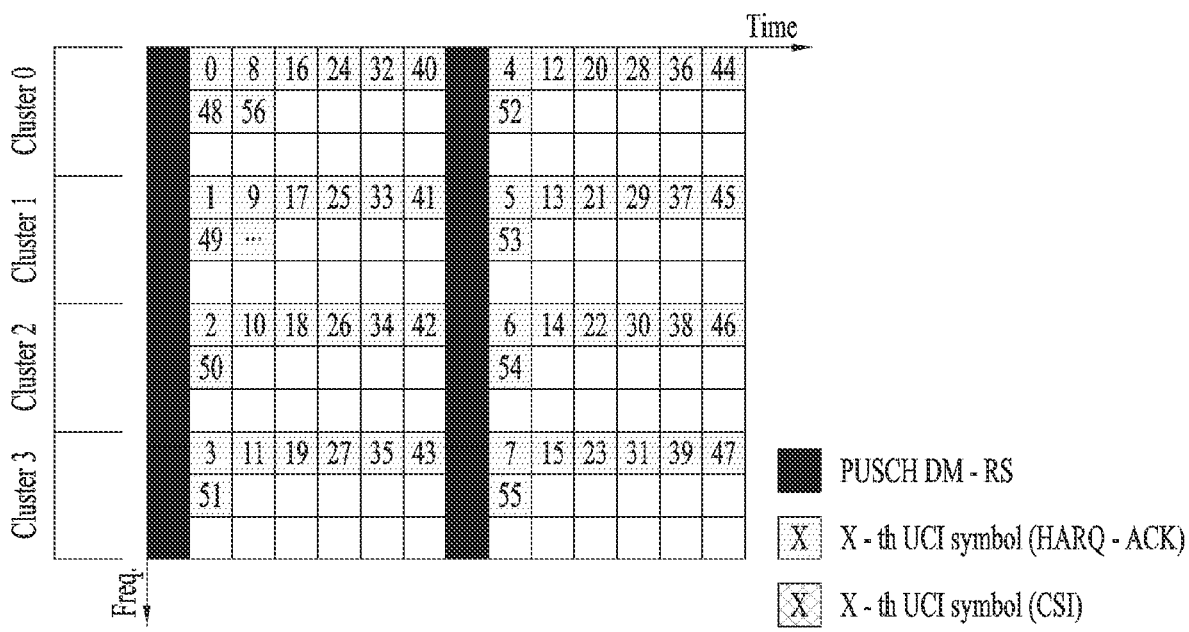
Figure 19:
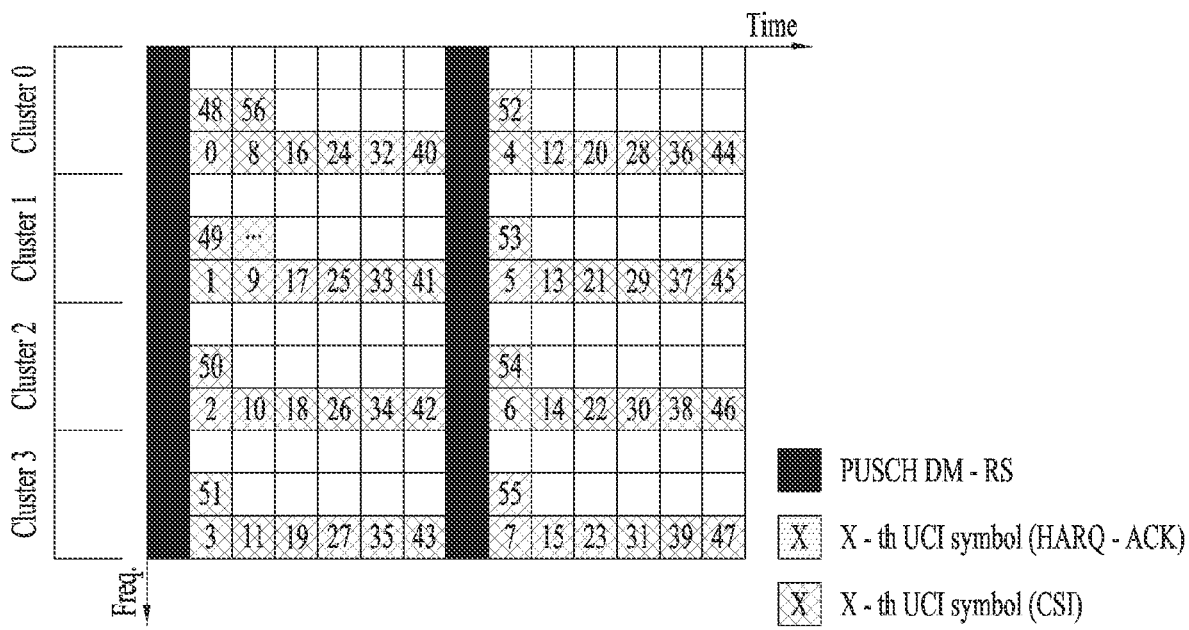

FIG. 19 is a diagram schematically illustrating another example of UCI mapping according to method #6.

Specifically, FIG. 19 shows a modification example of FIG. 18. Referring to FIG. 19, the UE may perform UCI mapping including HARQ-ACK and CSI alternately in each hop with respect to the frequency hopping boundary of the PUSCH. The method of performing UCI mapping alternately in each hop with respect to the frequency hopping boundary can be applied when frequency hopping is applied to the PUSCH or when an additional DM-RS exists in the PUSCH.

Figure 20:
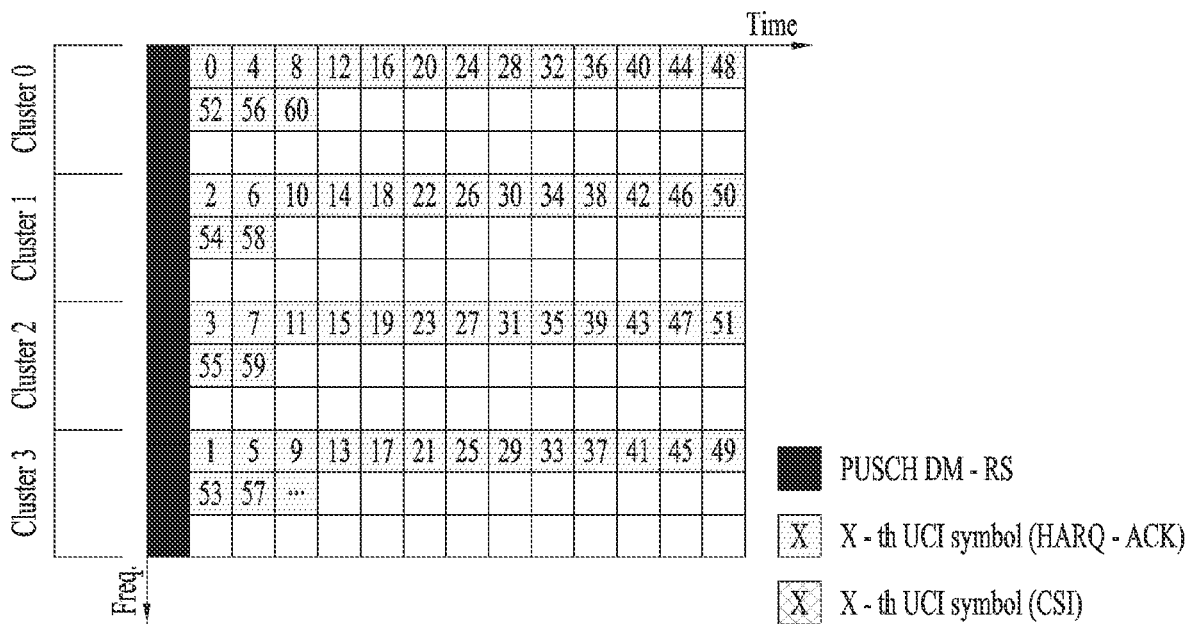
Figure 20:
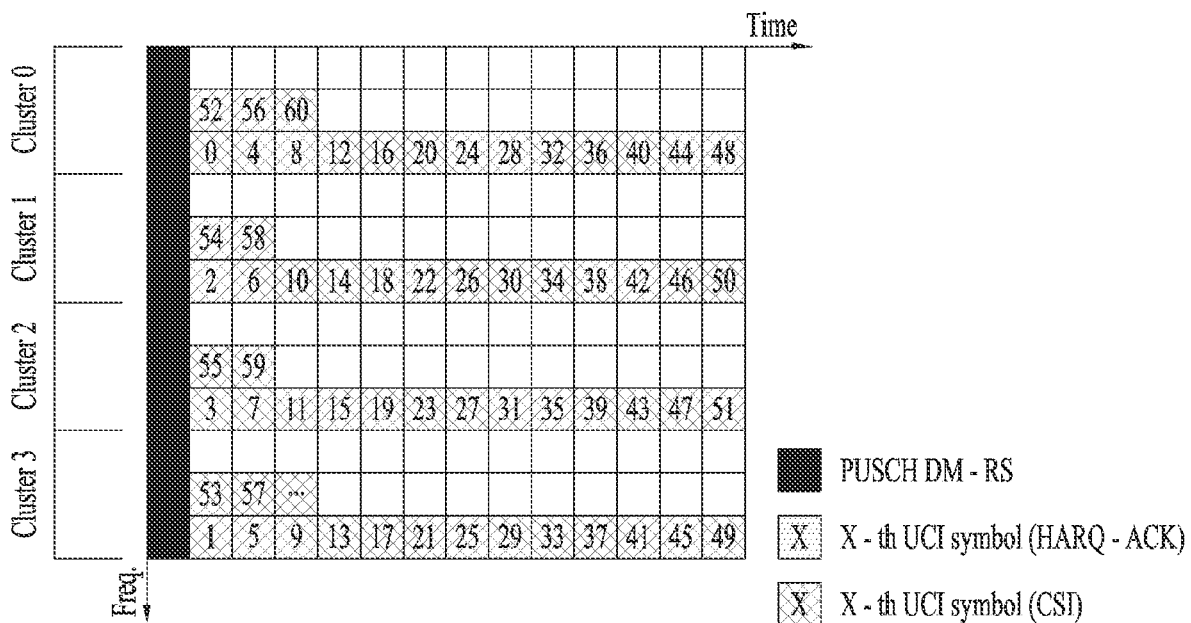

FIG. 20 is a diagram schematically illustrating still another example of UCI mapping according to method #6.

As shown in FIG. 20, when there are four clusters, the UE may perform UCI mapping on the clusters in the following order: [Cluster 0→Cluster 3→Cluster 1→Cluster 2], perform UCI mapping on subcarriers for HARQ-ACK (in each cluster) in ascending order of frequency indices, and perform UCI mapping on subcarriers for CSI (in each cluster) in descending order of frequency indices. In this case, the number of UCI REs allocated at one time to each cluster may be set to 1 (e.g., X=1), and the number of times that cluster-based UCI mapping is performed (in one symbol) may be set to 1 (e.g., S=1). In addition, all the symbols in the PUSCH may be set to UCI mapping targets, and the UCI mapping order between symbols may be set equal to ascending (or descending) order of time indices. According to this configuration, when the UE punctures some REs in the PUSCH due to HARQ-ACK, if HARQ-ACK mapping REs overlap with CSI mapping REs, the UE may puncture CSI at the corresponding position and then map the REs for the HARQ-ACK.

Figure 21:
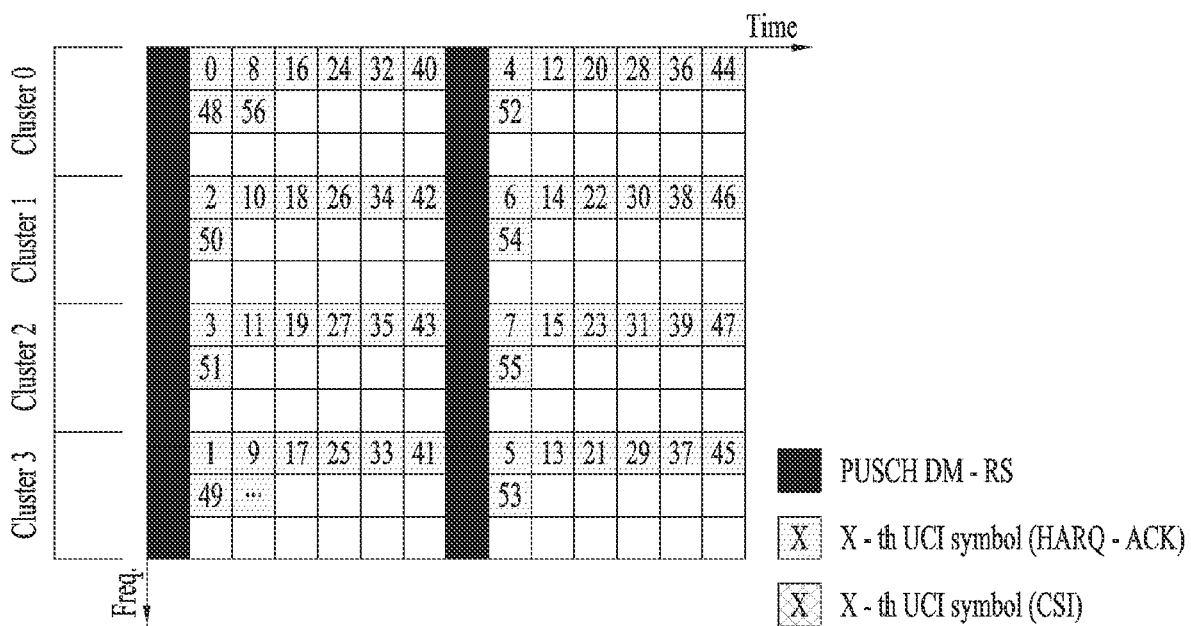
Figure 21:
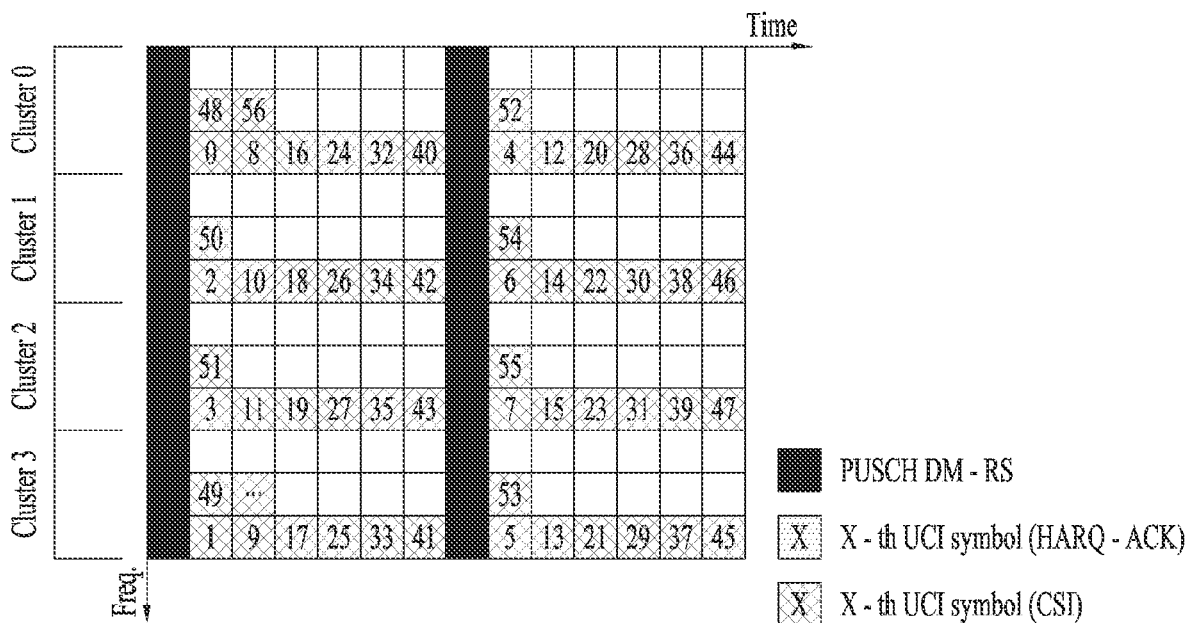

FIG. 21 is a diagram schematically illustrating a further example of UCI mapping according to method #6.

Specifically, FIG. 21 shows a modification example of FIG. 20. Referring to FIG. 21, the UE may perform UCI mapping including HARQ-ACK and CSI alternately in each hop with respect to the frequency hopping boundary of the PUSCH. The method of performing UCI mapping alternately in each hop with respect to the frequency hopping boundary can be applied when frequency hopping is applied to the PUSCH or when an additional DM-RS exists in the PUSCH.

Figure 22:
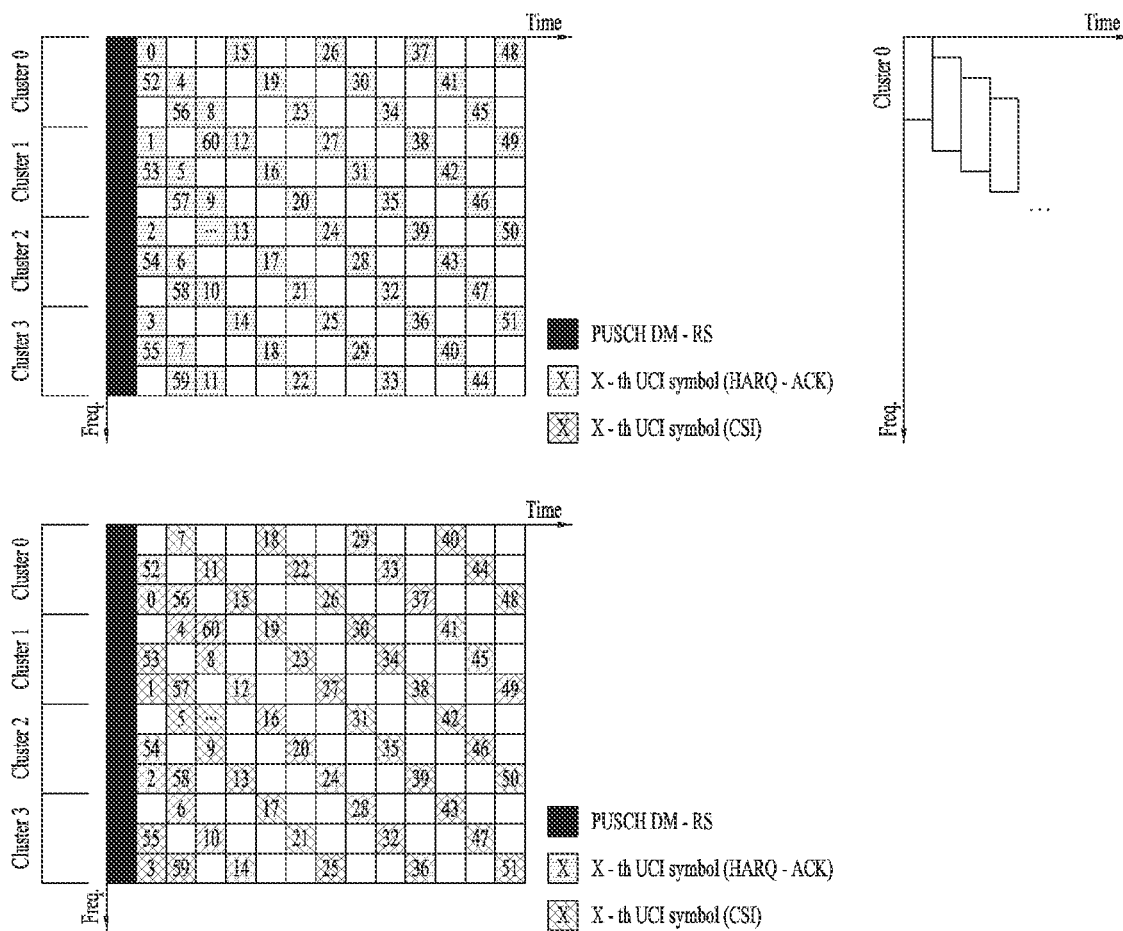

FIG. 22 is a diagram schematically illustrating still further example of UCI mapping according to method #6.

As shown in FIG. 22, when there are four clusters, the UE may perform UCI mapping on the clusters in the following order: [Cluster 0→Cluster 1→Cluster 2→Cluster 3], perform UCI mapping on subcarriers for HARQ-ACK (in each cluster) in ascending order of frequency indices, and perform UCI mapping on subcarriers for CSI (in each cluster) in descending order of frequency indices. In this case, the number of UCI REs allocated at one time to each cluster may be set to 1 (e.g., X=1), and the number of times that cluster-based UCI mapping is performed (in one symbol) may be set to 1 (e.g., S=1). In addition, all the symbols in the PUSCH may be set to UCI mapping targets, and the UCI mapping order between symbols may be set equal to ascending (or descending) order of time indices. Moreover, the cluster(s) (per symbol) for UCI mapping may be configured by applying frequency-domain offset, which is proportion to time index of the (UCI mapping target) symbol, to the reference cluster (configuration). According to this configuration, when the UE punctures some REs in the PUSCH due to HARQ-ACK, if HARQ-ACK mapping REs overlap with CSI mapping REs, the UE may puncture CSI at the corresponding position and then map the REs for the HARQ-ACK. In this case, each (symbol) cluster for UCI mapping is shifted by one subcarrier as the symbol increases (at this time, modulo operation for the total number of subcarriers in the PUSCH is applied).

Figure 23:
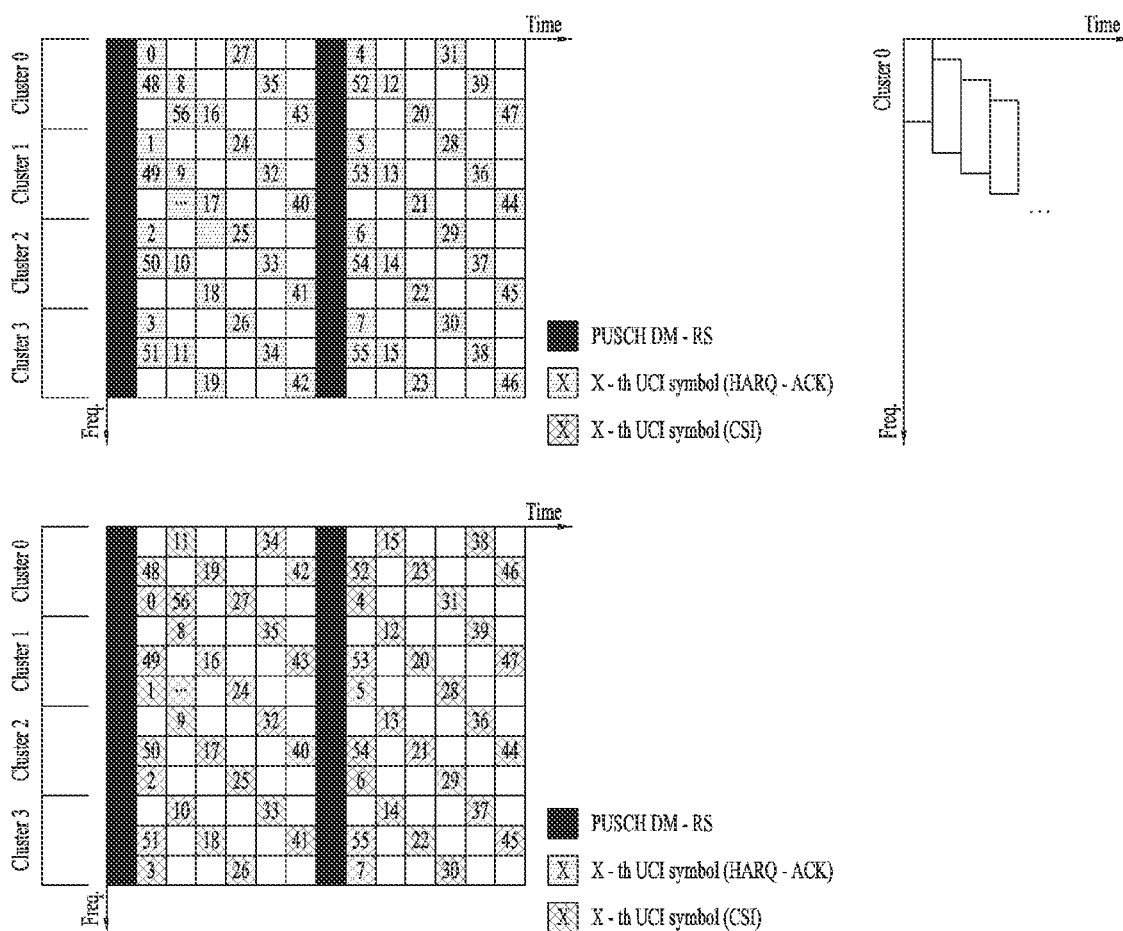

FIG. 23 is a diagram schematically illustrating yet still another example of UCI mapping according to method #6.

Specifically, FIG. 23 shows a modification example of FIG. 22. Referring to FIG. 23, the UE may perform UCI mapping including HARQ-ACK and CSI alternately in each hop with respect to the frequency hopping boundary of the PUSCH. The method of performing UCI mapping alternately in each hop with respect to the frequency hopping boundary can be applied when frequency hopping is applied to the PUSCH or when an additional DM-RS exists in the PUSCH.

Additionally, according to the present invention, the following UCI mapping methods can be applied.

{1} First Alternative (Alt 1)
A. Step 0: Generating a coded CB (CB 1) with systematic bits and parity bits.
B. Step 1: Generating a coded CB (CB 2) by adding coded UCI bits after performing rate-matching or puncturing on the parity bits in the coded CB (CB 1). In this case, the UE may perform the rate-matching or puncturing on consecutive bits from the last parity bit, and the rate-matching or puncturing may be performed uniformly (evenly) on a plurality of parity bits.
C. Step 2: Generating a coded CB (CB 3) by performing intra-CB interleaving per/across branch on the coded CB (CB 2). In this case, if a plurality of parity bit groups exist in the CB, the UE may perform (bit-level) interleaving between the parity bit groups after performing (bit-level) interleaving on each of the parity bit group.
D. Step 3: Performing frequency-first (or time-first) RE mapping (on CB 3) (according to the CB index).

{2} Second Alternative (Alt 2)
A. Step 0: Generating a coded CB (CB 1) with systematic bits and parity bits.
B. Step 1: Generating a bit-level interleaved coded CB (CB 2) by performing intra-CB interleaving per/across branch on the coded CB (CB 1). In this case, if a plurality of parity bit groups exist in the CB, the UE may perform (bit-level) interleaving between the parity bit groups after performing (bit-level) interleaving on each of the parity bit group.
C. Step 2: Generating a coded CB (CB 3) by adding coded UCI bits after performing rate-matching or puncturing on parity bits in the coded CB (CB 2). In this case, the UE may perform the rate-matching or puncturing on consecutive bits from the last parity bit, and the rate-matching or puncturing may be performed uniformly (evenly) on a plurality of parity bits.
D. Step 3: Performing frequency-first (or time-first) RE mapping (on CB 3) (according to the CB index).

{3} Third Alternative (Alt 3)
A. Step 0: Generating a coded CB (CB 1) with systematic bits and parity bits.
B. Step 1: Generating a bit-level interleaved coded CB (CB 2) by performing intra-CB interleaving per/across branch on the coded CB (CB 1). In this case, if a plurality of parity bit groups exist in the CB, the UE may perform (bit-level) interleaving between the parity bit groups after performing (bit-level) interleaving on each of the parity bit group.
C. Step 2: Generating a coded CB (CB 3) by adding coded UCI bits after performing rate-matching or puncturing on parity bits in the coded CB (CB 2). In this case, the UE may perform the rate-matching or puncturing on consecutive bits from the last parity bit, and the rate-matching or puncturing may be performed uniformly (evenly) on a plurality of parity bits.
D. Step 3: Generating a bit-level interleaved coded CB (CB 4) by performing the intra-CB interleaving per/across branch on the coded CB (CB 3). In this case, if a plurality of parity bit groups exist in the CB, the UE may perform (bit-level) interleaving between the parity bit groups after performing (bit-level) interleaving on each of the parity bit group.
E. Step 4: Performing frequency-first (or time-first) RE mapping (on CB 4) (according to the CB index).

Additionally, the UE may perform the UCI mapping as follows.

1} First, rate-matching or puncturing is performed (with respect to data) before RE mapping. Thereafter, data and UCI is concatenated, and then the RE mapping is performed on the (concatenated) entire coded bits in a frequency-first (or time-first) manner.
A. In this process, the (data) rate-matching or puncturing may be performed before or after interleaving.
B. In addition, the process may be performed in each CB. Assuming that the total number of CBs is M and the total number of UCI bits is N, the UE may add N/M UCI bits after performing the (data) rate-matching or puncturing in each CB.

2} The (data) rate-matching or puncturing is performed after the RE mapping. Thereafter, for UCI, the RE mapping is applied in a different way from the data.
A. The UE performs the above-described process in a frequency-first manner. However, in performing the process, the UE may perform the RE mapping on the symbol (or CB) in a distributed manner instead of using simple RE index order.
B. In addition, in this configuration, assuming that the total number of CBs is M and the total number of UCI bits is N, the (data) rate matching or puncturing corresponding to the N/M UCI bits may be applied per CB through the RE mapping.

Additionally, if the UE applies rate matching (or puncturing) where coded bits of UCI (hereinafter referred to as coded UCI bits) are considered while generating coded bits for data (hereinafter referred to as coded data bits), the UE may concatenates the coded UCI bits and coded data bits and then apply (single) RE mapping to the concatenated coded bits. In this case, the RE mapping may be performed in the following order: coded UCI bits→coded data bits.

In this case, if the modulation order supports k bits, the length of the coded UCI bits and/or coded data bits may be limited to a multiple of k. According to this configuration, data and UCI can be distinguished per RE, and additional power may be allocated to UCI transmission REs.

According to the present invention, the (single) RE mapping method may be changed as follows according to waveforms for PUSCH transmission (alternatively, the following RE mapping method may be applied only to coded UCI bit).

1}} A case in which the PUSCH waveform is DFT-s-OFDM
A. Frequency-first mapping
For example, coded bit-to-RE mapping is performed such that it starts at the minimum symbol (or time) index and the minimum subcarrier (or frequency) index and continues by increasing the subcarrier (or frequency) index. If the subcarrier (frequency) index related to a specific symbol (or time) index reaches the maximum value, the symbol (or time) index increases by one. Thereafter, the coded bit-to-RE mapping is performed again, starting at the minimum subcarrier (or frequency) index and continuing by increasing the subcarrier (or frequency) index.

B. Time-first mapping

For example, coded bit-to-RE mapping is performed such that it starts at the minimum symbol (or time) index and the minimum subcarrier (or frequency) index and continues by increasing the symbol (or time) index. If the symbol (or time) index related to a subcarrier (or frequency) index reaches the maximum value, the subcarrier (or frequency) index increases by one. Thereafter, the coded bit-to-RE mapping is performed again, starting at the minimum symbol (or time) index and continuing by increasing the symbol (or time) index.

C. When the PUSCH waveform is the DFT-s-OFDM, either the frequency-first mapping scheme or time-first mapping scheme may be determined in advance or configured by the eNB through a higher layer signal.

2}} A case in which the PUSCH waveform is CP-OFDM

A. Frequency-first mapping

After allocation of coded bits to all frequency resources (allocated as the PUSCH resources) in one symbol in symbol order, the remaining coded bits are allocated to frequency resources (allocated as the PUSCH resources) in the next symbol.

B. Interleaving per symbol

According to this method, the allocation (of coded bits) is performed in the order in which local subcarrier indices are interleaved in a specific manner, instead of subcarrier (or frequency) order in each symbol (or time) index.

For example, assuming that the total number of subcarriers allocated in the symbol is N, the interleaving per symbol may be performed as follows by applying a block interleaver (where column-wise permutation is applied) to subcarriers per symbol.

1. The values in the range of 0 to (N−1) are inputted row by row to a P×Q (P by Q) matrix.
   A. Interleaving may be applied to each row in ascending order of column indices.
   B. The values of P and Q may be determined in advance, configured by the eNB, or determined by according to the number of PRBs allocated as PUSCH resource. In this case, the condition of P*Q=N can be satisfied.
2. The column-wise permutation is applied to the matrix.
   A. In the case of Q=4, the column-wise permutation may be defined as [1 2 3 4]→[1 3 2 4]. In this case, the number k in the parenthesis means the $k^{th}$ column.
   B. In the case of Q=6, the column-wise permutation may be defined as [1 2 3 4]→[1 3 5 2 4 6]. In this case, the number k in the parenthesis means the $k^{th}$ column.
   C. In the case of Q=$2^k$, the column-wise permutation may be the bit reversal permutation.
3. The individual elements in the matrix are red and outputted column by column.
   A. Interleaving may be applied to each column in ascending order of row indices.
   B. Coded bits to RE mapping is performed in local subcarrier index order (within the symbol) corresponding to the output.

For example, assuming that the PUSCH has one RB (e.g., N=12) and Q=4, the equation of P=12/Q=3 may be met. In this case, the UE may input the number from 1 to 12 to a 3 by 4 matrix row by row.

TABLE 5

| 0 | 1 | 2  | 3  |
|---|---|----|----|
| 4 | 5 | 6  | 7  |
| 8 | 9 | 10 | 11 |

By applying the column-wise permutation defined as [1 2 3 4]→[1 3 2 4] thereto, the UE can obtain the following matrix.

TABLE 6

| 0 | 2  | 1 | 3  |
|---|----|---|----|
| 4 | 6  | 5 | 7  |
| 8 | 10 | 9 | 11 |

Thereafter, if the UE creates output values by reading the individual elements column by column, the UE may obtain the following result: {Output=1, 5, 9, 3, 7, 11, 2, 6, 10, 4, 8, 12}. In this case, assuming that each number k indicates the $k^{th}$ subcarrier (among the subcarriers allocated in the symbol), the output values can be interpreted to mean the following RE mapping order. In Table 7, it is assumed that the number mean RE mapping priority, the subcarrier (or frequency) index increases from the top to the bottom, and the symbol (or time) index increases from the right to the left.

TABLE 7

| 0  |
|----|
| 4  |
| 8  |
| 2  |
| 6  |
| 10 |
| 1  |
| 5  |
| 9  |
| 3  |
| 11 |

The RE mapping order indicates the order in one symbol. Accordingly, to perform the RE mapping on a plurality of symbols, the UE may perform the frequency-first mapping (i.e., coded bit-to-RE mapping is performed on frequency resources in one symbol, and then the mapping performed again on the next symbol). For example, when there are ten symbols, the UE's RE mapping order may be defined as shown in Table 8 below. In Table 8, the number indicates RE mapping priority, the subcarrier (or frequency) index increases from the top to the bottom, and the symbol (or time) index increases from the right to the left.

TABLE 8

| 1  | 13 | 25 | 37 | 49 | 61 | 73 |
| 5  | 17 | 29 | 41 | 53 | 65 | 77 |
| 9  | 21 | 33 | 45 | 57 | 69 | 81 |
| 3  | 15 | 27 | 39 | 51 | 63 | 75 |
| 7  | 19 | 31 | 43 | 55 | 67 | 79 |
| 11 | 23 | 35 | 47 | 59 | 71 | 83 |
| 2  | 14 | 26 | 38 | 50 | 62 | 74 |
| 6  | 18 | 30 | 42 | 54 | 66 | 78 |
| 10 | 22 | 34 | 46 | 58 | 70 | 82 |
| 4  | 16 | 28 | 40 | 52 | 64 | 76 |
| 8  | 20 | 32 | 44 | 56 | 68 | 80 |
| 12 | 24 | 36 | 48 | 60 | 72 | 84 |

Figure 24:
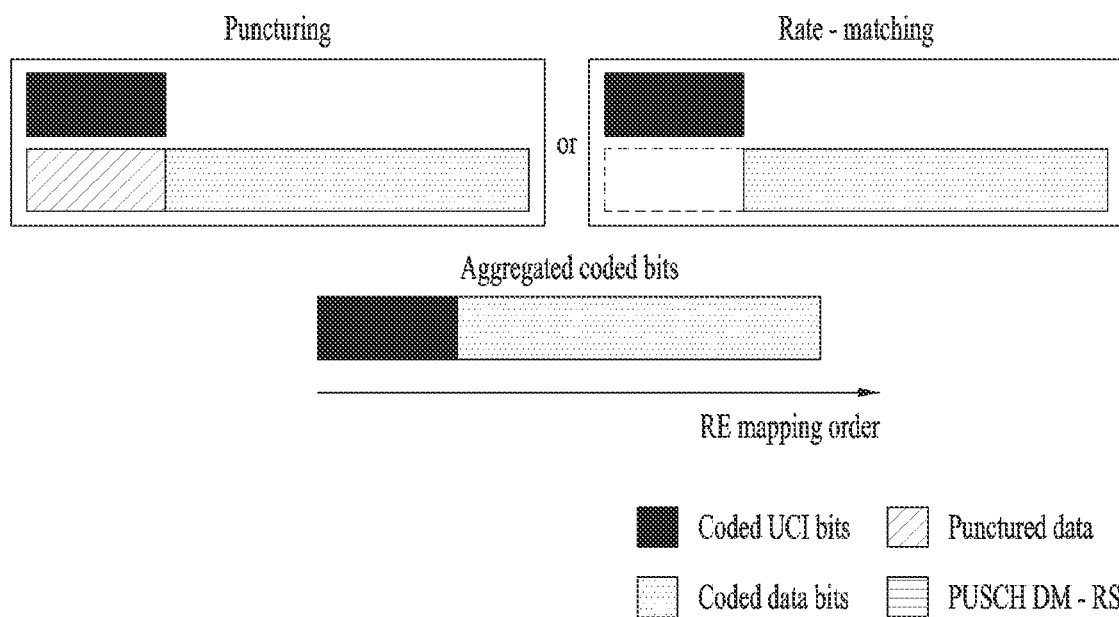
FIGS. 24 and 25 are diagrams schematically illustrating examples where coded UCI bits are ahead of coded data bits in RE mapping order.

FIG. 24 is a diagram schematically illustrating an example where coded UCI bits are ahead of coded data bits in RE mapping order.

In FIG. 24, it is assumed that UCI has coded bits corresponding to 20 REs and coded UCI bits are ahead of coded data bits in RE mapping order.

In this case, UCI-to-RE mapping can be naturally distributed in the frequency domain as shown in Table 9 below. In Table 9, the number indicates RE mapping priority, the subcarrier (or frequency) index increases from the top to the bottom, and the symbol (or time) index increases from the right to the left. In addition, bolded and underlined areas correspond to UCI, and non-bolded and non-underlined areas correspond to data.

TABLE 9

| 1 | 13 | 25 | 37 | 49 | 61 | 73 |
|---|---|---|---|---|---|---|
| 5 | 17 | 29 | 41 | 53 | 65 | 77 |
| 9 | 21 | 33 | 45 | 57 | 69 | 81 |
| 3 | 15 | 27 | 39 | 51 | 63 | 75 |
| 7 | 19 | 31 | 43 | 55 | 67 | 79 |
| 11 | 23 | 35 | 47 | 59 | 71 | 83 |
| 2 | 14 | 26 | 38 | 50 | 62 | 74 |
| 6 | 18 | 30 | 42 | 54 | 66 | 78 |
| 10 | 22 | 34 | 46 | 58 | 70 | 82 |
| 4 | 16 | 28 | 40 | 52 | 64 | 76 |
| 8 | 20 | 32 | 44 | 56 | 68 | 80 |
| 12 | 24 | 36 | 48 | 60 | 72 | 84 |

Figure 25:
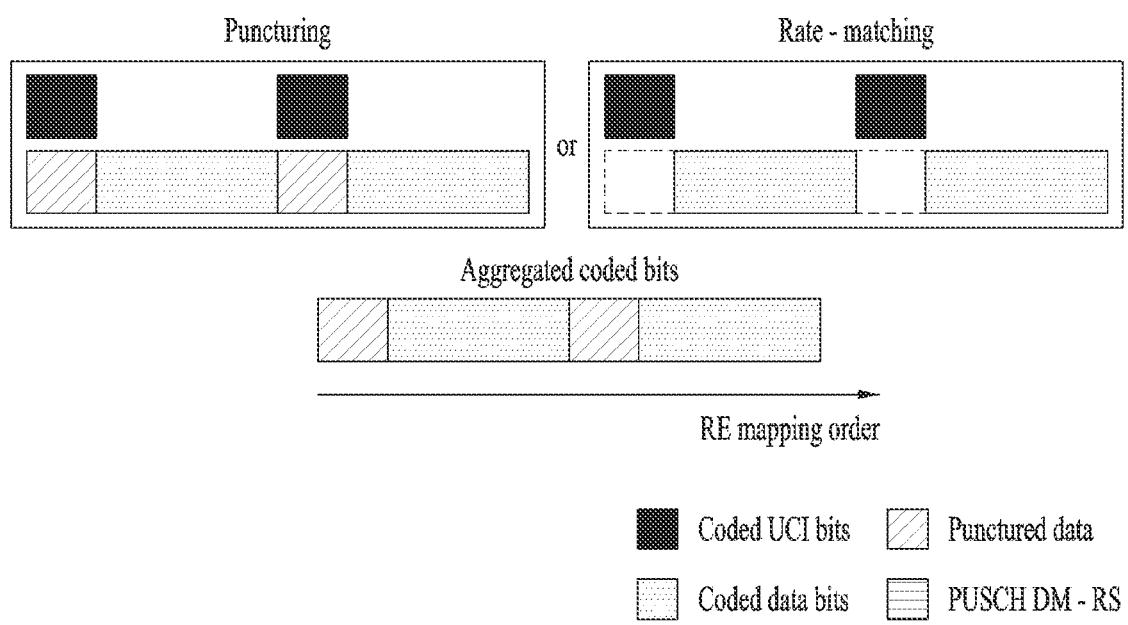

FIG. 25 is a diagram schematically illustrating another example where coded UCI bits are ahead of coded data bits in RE mapping order.

In FIG. 25, it is assumed that UCI has coded bits corresponding to 20 REs and coded bits corresponding to 10 REs are distributed over two CBs, respectively.

In this case, UCI-to-RE mapping can be naturally distributed in the frequency domain as shown in Table 10 below. In Table 11, the number indicates RE mapping priority, the subcarrier (or frequency) index increases from the top to the bottom, and the symbol (or time) index increases from the right to the left. In addition, bolded and underlined areas correspond to UCI, and non-bolded and non-underlined areas correspond to data. Moreover, it is assumed that UCI 1+CB 1 is mapped to first to forty-second REs and UCI 2+CB 2 is mapped to forty-third to eighty-fourth REs.

TABLE 10

| 1 | 13 | 25 | 37 | 49 | 61 | 73 |
|---|---|---|---|---|---|---|
| 5 | 17 | 29 | 41 | 53 | 65 | 77 |
| 9 | 21 | 33 | 45 | 57 | 69 | 81 |
| 3 | 15 | 27 | 39 | 51 | 63 | 75 |
| 7 | 19 | 31 | 43 | 55 | 67 | 79 |
| 11 | 23 | 35 | 47 | 59 | 71 | 83 |
| 2 | 14 | 26 | 38 | 50 | 62 | 74 |
| 6 | 18 | 30 | 42 | 54 | 66 | 78 |
| 10 | 22 | 34 | 46 | 58 | 70 | 82 |
| 4 | 16 | 28 | 40 | 52 | 64 | 76 |
| 8 | 20 | 32 | 44 | 56 | 68 | 80 |
| 12 | 24 | 36 | 48 | 60 | 72 | 84 |

Additionally, it is assumed that the UE performs mapping of coded UCI bits to REs (that is, coded UCI bits to RE mapping) in a specific symbol. In this case, if the total number of subcarriers allocated in the corresponding symbol is N and if local indices in the range of 0 to N−1 are allocated to the subcarriers (in ascending (or descending) order of frequency indices), the UE may perform the coded UCI bits to RE mapping in the local index order corresponding to the following permutation, $a_n$(where n=0, 1, . . . , N−1) ($a_n$ indicates the local index of the $n^{th}$ RE among REs to which the UCI is mapped).

$$a_n = (N/M) * b_n + \text{floor}(n/M), n=0,1,2,\ldots,N-1$$

$b_n = (n \bmod M)$ when $(n \bmod M) \bmod 2=0$ and $0 \le (n \bmod M) \le (M/2-1) = (n \bmod M)+(M/2-1)$ when $(n \bmod M) \bmod 2=1$ and $0 \le (n \bmod M) \le (M/2-1) = (n \bmod M)$ when $(n \bmod M) \bmod 2=1$ and $M/2 \le (n \bmod M) \le (M-1) = (n \bmod M) - (M/2-1)$ when $(n \bmod M) \bmod 2=0$ and $M/2 \le (n \bmod M) \le (M-1)$  [Equation 1]

In Equation 1, M may be a factor of N and at the same time, have any value of $2^n$ (or the maximum value of $2^n$). In addition, M may be determined by the number of PRBs allocated for the PUSCH or configured by the eNB. In this case, based on the order of symbols, the UE may perform the coded UCI bits to RE mapping on all frequency resources (allocated as the PUSCH resources) in one symbol as described above (that is, the RE mapping according to permutation $a_n$) and then performs the coded UCI bits to RE mapping on frequency resources (allocated as the PUSCH resources) in the next symbol.

For example, assuming that M and N are 4 and 12, respectively, $b_1$ and an can be calculated as follows.

$$b_n = 0,2,1,3,0,2,1,3,0,2,1,3$$

$$a_n = 0,6,3,9,1,7,4,10,2,8,5,11 \quad [\text{Equation 2}]$$

In this case, UCI-to-RE mapping order in one symbol may be defined based on the local index order corresponding to permutation $a_n$ as show in Table 11. In the following example, it is assumed that the subcarrier (or frequency) index increases from the top to the bottom and the symbol (or time) index increases from the right to the left. In addition, the number in the left underlined area indicates the local index of a subcarrier, and the number in the right non-underlined area indicates UCI-to-RE mapping priority.

TABLE 11

| 0 | 0 |
|---|---|
| 1 | 4 |
| 2 | 8 |
| 3 | 2 |
| 4 | 6 |
| 5 | 10 |
| 6 | 1 |
| 7 | 5 |
| 8 | 9 |
| 9 | 3 |
| 10 | 7 |
| 11 | 11 |

Additionally, it is assumed that the UE performs mapping of coded UCI bits to REs (that is, coded UCI bits to RE mapping) in a specific symbol. In this case, if the total number of subcarriers allocated in the corresponding symbol is N and if local indices in the range of 0 to N−1 are allocated to the subcarriers (in ascending (or descending) order of frequency indices), the UE may define a mapping pattern according to the number of REs (in the corresponding symbol) where the UCI mapping will be performed (hereinafter, such a RE is referred to as a UCI RE).

For example, the UE may configure the number M of frequency-domain clusters, where the UCI mapping will be applied, according to the number of UCI REs (in the corresponding symbol) (In this case, M may be a factor of N). In addition, the UE may perform the coded UCI bits to RE mapping in the local index order corresponding to the following permutation, $c_n$ (where n=0, 1, . . . , N−1) (that is, $c_n$ indicates the local index of the $n^{th}$ RE among REs to which the UCI is mapped).

$$C_n = (N/M) * (n \bmod M) + \text{floor}(n/M), n=0,1,2,\ldots,N-1 \quad [\text{Equation 3}]$$

The coded UCI bits to RE mapping may be performed in the local index order corresponding to permutation $a_n$(where n=0, 1, . . . , N−1) ($a_n$ indicates the local index of the $n^{th}$ RE among REs to which the UCI is mapped).

For example, assuming that the number of UCI REs in the corresponding symbol is R, M can be defined as shown in Equation 4 below. In Equation 4, the value of K may be predetermined or configured by the eNB, and the value of M may be configured by the eNB or determined according to a specific variable, which is configured by the eNB, and the number of UCI REs.

$$M=\min(\mathrm{floor}(N/R),K) \quad \text{[Equation 4]}$$

In this case, based on the order of symbols, the UE may perform the coded UCI bits to RE mapping on all frequency resources (allocated as the PUSCH resources) in one symbol as described above (that is, the RE mapping according to permutation $c_n$) and then performs the coded UCI bits to RE mapping on frequency resources (allocated as the PUSCH resources) in the next symbol.

For example, assuming that M and N are 4 and 12, respectively, $c_n$ can be calculated as follows.

$$c_n=0,3,6,9,1,4,7,10,2,5,8,11 \quad \text{[Equation 5]}$$

In this case, UCI-to-RE mapping order in one symbol may be defined based on the local index order corresponding to permutation $C_n$ as show in Table 12. In the following example, it is assumed that the subcarrier (or frequency) index increases from the top to the bottom and the symbol (or time) index increases from the right to the left. In addition, the number in the left underlined area indicates the local index of a subcarrier, and the number in the right non-underlined area indicates UCI-to-RE mapping priority.

TABLE 12

| | |
|---|---|
| 0  | 0 |
| 1  | 4 |
| 2  | 8 |
| 3  | 1 |
| 4  | 5 |
| 5  | 9 |
| 6  | 2 |
| 7  | 6 |
| 8  | 10 |
| 9  | 3 |
| 10 | 7 |
| 11 | 11 |

Figure 26:
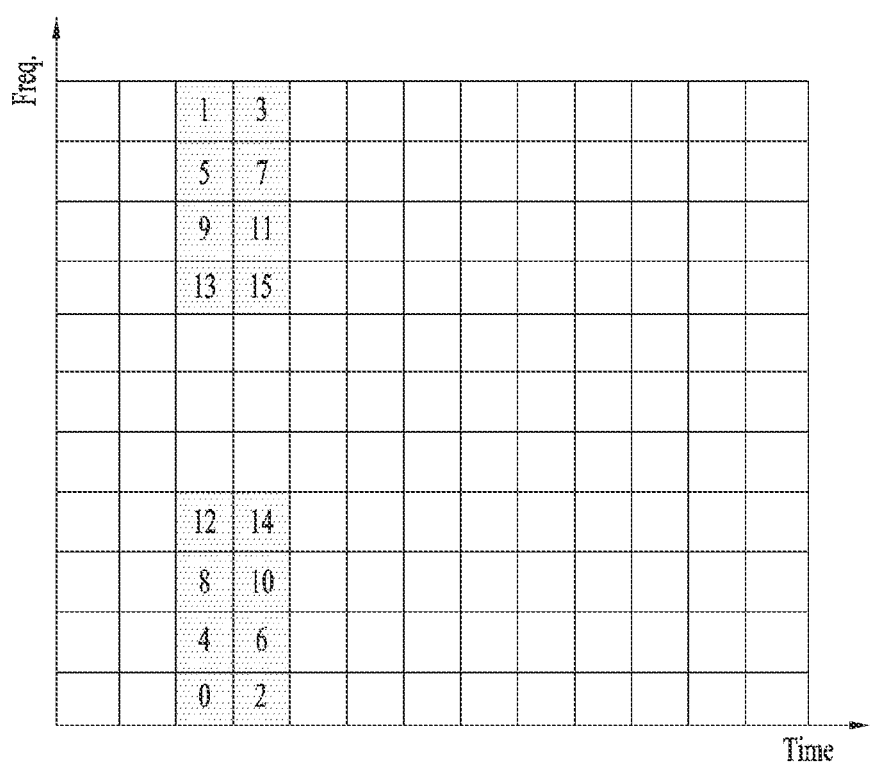
FIG. 26 is a diagram illustrating an example of UCI RE mapping according to the present invention.

FIG. 26 is a diagram illustrating an example of UCI RE mapping according to the present invention.

As shown in FIG. 26, as the UCI RE mapping method, it may be considered that the UE sequentially uses REs at the both ends among (available) frequency resources of the first symbol, moves to the next symbol, and sequentially uses REs at the both ends among (available) frequency resources of the next symbol again. When the UE performs the above-described operation until the last symbol, the UE moves back to the first symbol and then sequentially uses REs at the both ends among (available) frequency resources of the first symbol. Thereafter, the UE moves to the next symbol in order to continue the UCI mapping.

FIG. 26 shows that how the UE performs the UCI mapping operation when the UE intends to perform the UCI mapping on two (consecutive) symbols. In FIG. 26, the black area corresponds to an RE where UCI is mapped (UCI mapped RE), and the number indicates RE mapping priority. In this case, the positions of the symbols corresponding to UCI RE mapping (UCI-to-RE mapping) targets and the positions of subcarriers in each symbol where the UCI RE mapping will be performed can be predetermined or configured by the eNB. In addition, in FIG. 26, it is assumed that the UCI mapping can be performed on all subcarriers in the two (consecutive) symbols.

While the UE performs the above-described UCI mapping, if the $k^{th}$ UCI mapping RE collides with transmission of a specific RS (e.g., a phase-tracking reference signal (PT-RS), that is, a signal for phase shift adjustment), the UE can skip the corresponding RE and then reinitiate the UCI mapping at the $(k+1)^{th}$ UCI mapping RE.

The first UCI transmission method can be applied together with other proposed methods of the present invention unless they collide with each other.

3.2. Second UCI Transmission Method

When the UE performs UCI piggyback on the PUSCH, the UE can perform resource mapping for coded UCI symbols (e.g., modulated symbols) as follows after completing resource mapping for data.

(1) The eNB configures, for the UE, a plurality of symbols (or a symbol group) for UCI mapping (per subcarrier or subcarrier group) and UCI mapping order between symbols (or symbol groups) according to one of the following methods.
  A. Predetermined rule
  B. Configuration through higher layer signal (e.g., RRC signaling)
  C. Configuration through dynamic control signal (e.g., DCI)
  D. Configuration of candidate values through higher layer signal and configuration through dynamic control signal (e.g., DCI)

(2) The eNB configures, for the UE, a plurality of subcarriers (or subcarrier groups) for UCI mapping (per symbol or symbol group) and UCI mapping order between subcarriers (or subcarrier groups) according to one of the following methods.
  A. Predetermined rule
  B. Configuration through higher layer signal (e.g., RRC signaling)
  C. Configuration through dynamic control signal (e.g., DCI)
  D. Configuration of candidate values through higher layer signal and configuration through dynamic control signal (e.g., DCI)

(3) The UE performs UCI mapping in the PUSCH resource region using one of the following methods.
  A. Frequency-first mapping scheme
  The UE performs frequency-first UCI mapping in each symbol (or symbol group) in UCI mapping order between the symbols (or symbol groups). In this case, the UE sequentially allocated coded UCI symbols to REs corresponding to the plurality of subcarriers (or subcarrier groups) for the UCI mapping (in a specific symbol or symbol group) in UCI mapping order between the subcarriers (or subcarrier groups).
  B. Time-first mapping scheme
  The UE performs time-first UCI mapping in each subcarrier (or subcarrier group) in UCI mapping order between the subcarriers (or subcarrier groups). In this case, the UE sequentially allocated coded UCI symbols to REs corresponding to the plurality of subcarriers (or subcarrier groups) for the UCI mapping (in a specific subcarrier or subcarrier group) in UCI mapping order between the symbols (or symbol groups).

In this case, when the eNB configures the symbols (or symbol groups), subcarriers (or subcarrier groups), UCI mapping order between the symbols (or symbol groups), and UCI mapping order between the subcarrier (or subcarrier groups) for the UCI mapping, a specific symbol resource or subcarrier resource may be defined in terms of indices.

In addition, the UE may puncture some of data REs and then perform the UCI mapping on the corresponding REs. Alternatively, the UE may apply rate matching some of the data REs and then perform the UCI mapping on the remaining REs in the PUSCH.

Moreover, if the waveform for PUSCH transmission is SC-FDMA, the UE may perform the UCI mapping in virtual time and frequency domains before DFT precoding.

Further, whether either the frequency-first mapping scheme or time-first mapping scheme will be applied can be determined according to one of the following methods.

1) Predetermined rule
2) It is configured by the eNB through a higher layer signal.
3) It is determined based on the waveform applied to the PUSCH (e.g., in the case of OFDM, frequency-first mapping is applied, and in the case of Sc-FDMA, time-first mapping is applied (in the virtual time domain).

In this case, if the frequency-first mapping (or time-first mapping) is performed per symbol group (or subcarrier group), the UCI mapping may be performed on subcarriers corresponding to the UCI mapping targets in each symbol group (or subcarrier group) according to the time-first mapping (or frequency-first mapping) scheme. For example, if the UCI mapping is performed per symbol group according to the frequency-first mapping scheme, the UE may apply the time-first mapping scheme in the symbol group. Similarly, if the UCI mapping is performed per subcarrier group according to the time-first mapping scheme, the UE may apply the frequency-first mapping scheme in the subcarrier group.

For example, after completing modulation and resource mapping for data, the UE may punctures some data REs in the PUSCH and map coded UCI symbols (e.g., modulated symbols) to the corresponding REs. Alternatively, the UE may save some REs in the PUSCH by performing data rate-matching and then map coded UCI symbols to the corresponding REs.

In this case, if the PUSCH transmission waveform is CP-OFDM, the UE may perform the UCI mapping based on the frequency-first mapping scheme where UCI is allocated first in the frequency-domain in order to obtain the frequency diversity gain.

For example, in the state that an REG is composed of M distributed REs in the same symbol, the UE may map UCI in the following order: REG index 1 in the first symbol (close to a DMRS), REG index 1 in the second symbol, ..., REG index 1 in the last symbol, REG index 2 in the first symbol, .... In this case, REGs in the same symbol may be located adjacent to each other or distributed (in the frequency domain).

Figure 27:
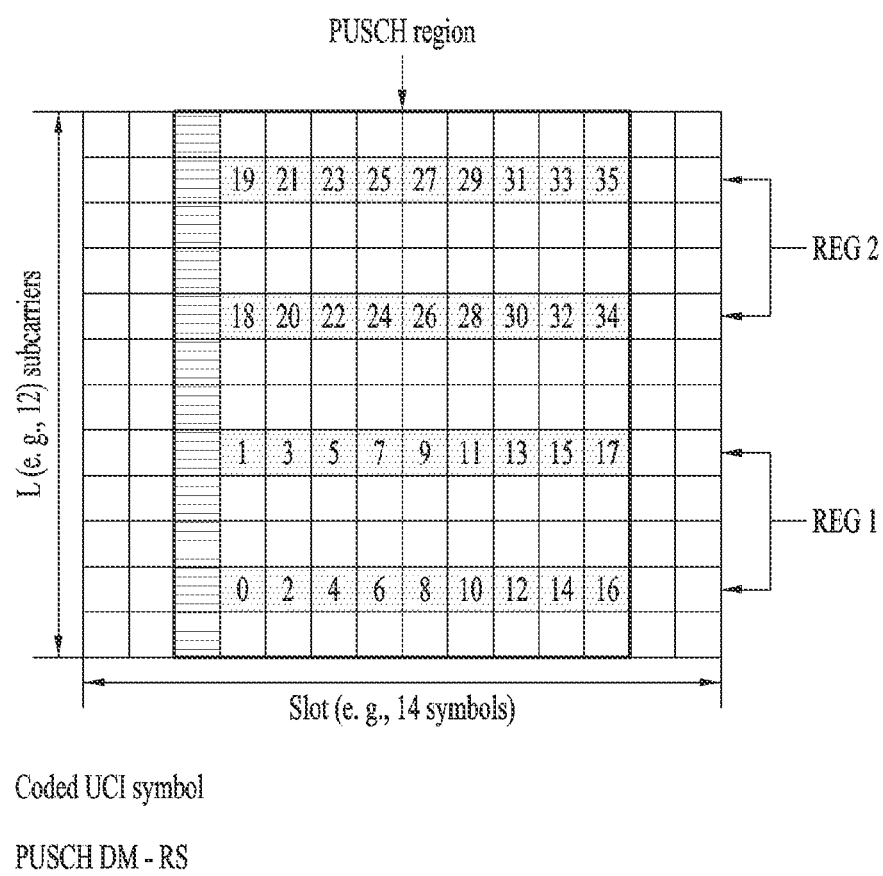
FIGS. 27 and 28 are diagrams schematically illustrating UCI mapping when one REG is composed of two REs having an interval of two subcarriers.

FIG. 27 is a diagram schematically illustrating UCI mapping when one REG is composed of two REs having an interval of two subcarriers. In particular, in FIG. 27, it is assumed that the interval between the REs in the REG (or interval between the first and last REs in the REG) is smaller than the interval between REG start points.

Figure 28:
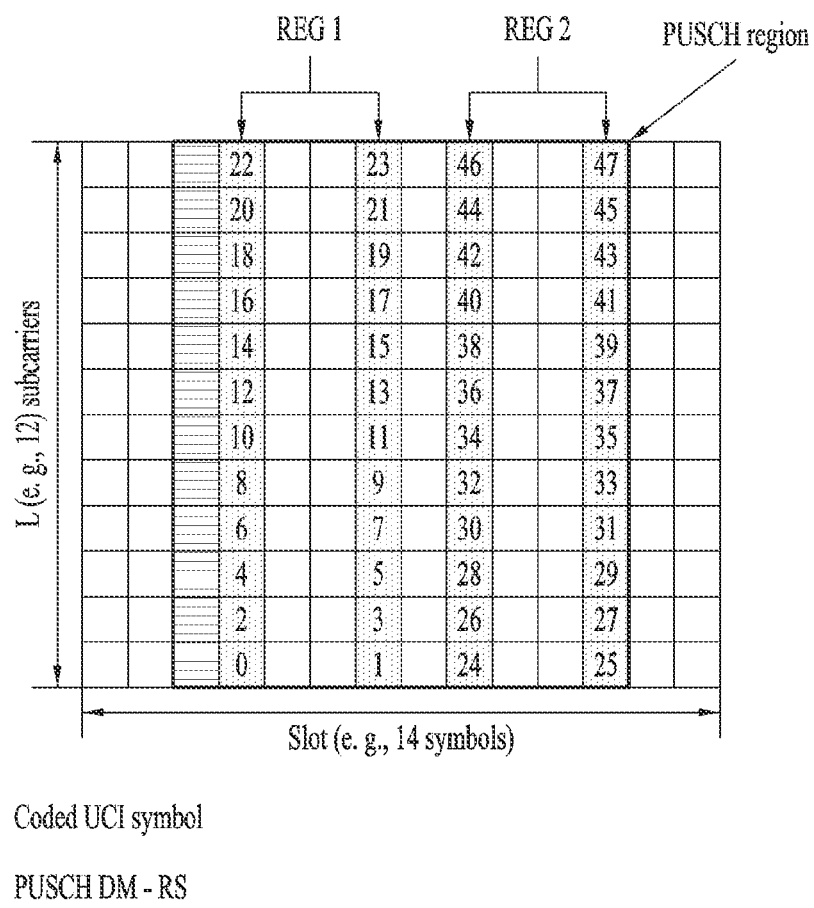

FIG. 28 is a diagram schematically illustrating UCI mapping when one REG is composed of two REs having an interval of two symbols. As a modification example of FIG. 27, FIG. 28 shows an example where the REG is defined in the time domain.

In this case, the UE may map UCI in the following order: REG index 1 in the first subcarrier (close to a DMRS), REG index 1 in the second subcarrier, ..., REG index 1 in the last subcarrier, REG index 2 in the first subcarrier, .... In this case, REGs in the same subcarrier may be located adjacent to each other or distributed (in the time domain).

Figure 29:
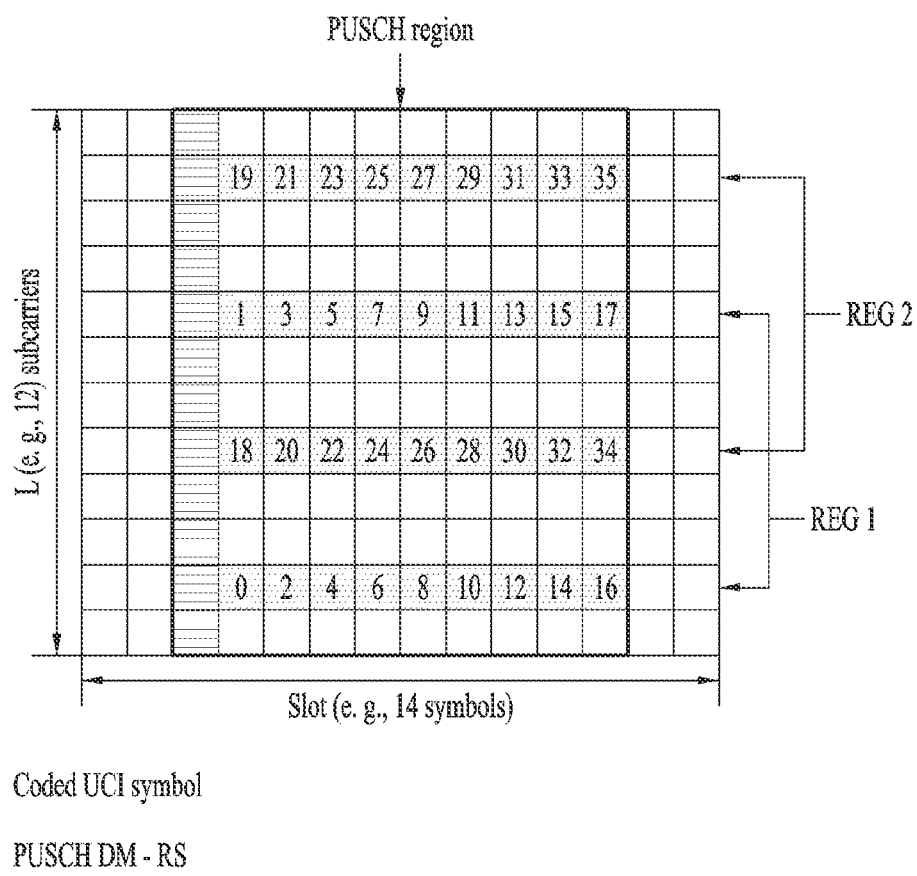
FIG. 29 is a diagram schematically illustrating UCI mapping when one REG is composed of two REs having an interval of five subcarriers.

FIG. 29 is a diagram schematically illustrating UCI mapping when one REG is composed of two REs having an interval of five subcarriers.

As shown in FIG. 29, in the state that an REG is composed of M distributed REs in the same symbol, the UE may map UCI in the following order: REG index 1 in the first symbol (close to a DMRS), REG index 1 in the second symbol, ..., REG index 1 in the last symbol, REG index 2 in the first symbol, .... In this case, the interval between the REs in the REG (or interval between the first and last REs in the REG) may be set greater than the interval between REG start points.

In FIG. 29, the interval between the REs in the REG corresponds to five subcarriers, but the interval between the REG start points corresponds to two subcarriers. Accordingly, the UCI may be mapped to REs belonging to different REGs in the frequency domain.

As shown in FIG. 29, when the interval between the REs in the REG (or interval between the first and last REs in the REG) is set to be greater than the interval between the REG start points, it is possible to increase not only the distance between REGs but also the distance between the REs in the REG. Thus, it is able to obtain the effect of distributing information included in coded UCI bits during the UCI mapping process.

Figure 30:
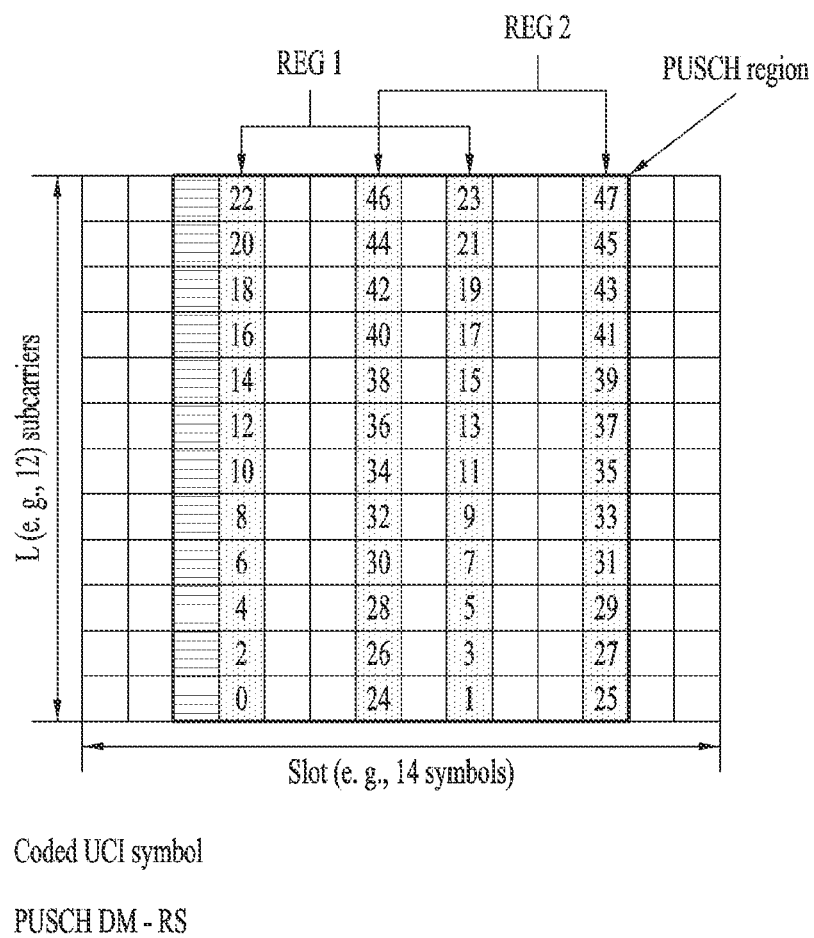
FIG. 30 is a diagram schematically illustrating UCI mapping when one REG is composed of two REs having an interval of four symbols.

FIG. 30 is a diagram schematically illustrating UCI mapping when one REG is composed of two REs having an interval of four symbols.

Similar to the example of FIG. 29, in the state that an REG is composed of M distributed REs in the same subcarrier, the UE may map UCI in the following order: REG index 1 in the first subcarrier (close to a DMRS), REG index 1 in the second subcarrier, ..., REG index 1 in the last subcarrier, REG index 2 in the first subcarrier, .... In this case, REGs in the same subcarrier may be located adjacent to each other or distributed (in the time domain). In this case, the interval between the REs in the REG (or interval between the first and last REs in the REG) may be set greater than the interval between REG start points.

In FIG. 30, the interval between the REs in the REG corresponds to four subcarriers, but the interval between the REG start points corresponds to two subcarriers. Accordingly, the UCI may be mapped to REs belonging to different REGs in the time domain.

Additionally, when the REG is composed of M distributed REs in the same symbol (or subcarrier), the UE may alternately map the UCI on N REGs as the symbol (or subcarrier) index increases.

As a particular example, when mapping is alternately performed on two REGs, the UE may map the UCI in the following order: REG index 1 in the first symbol (or subcarrier), REG index 2 in the second symbol (or subcarrier), REG index 1 in the third symbol (or subcarrier), ..., REG index 2 in the last symbol (or subcarrier), REG index 2 in the first symbol (or subcarrier), REG index 1 in the second symbol (or subcarrier), ....

Figure 31:
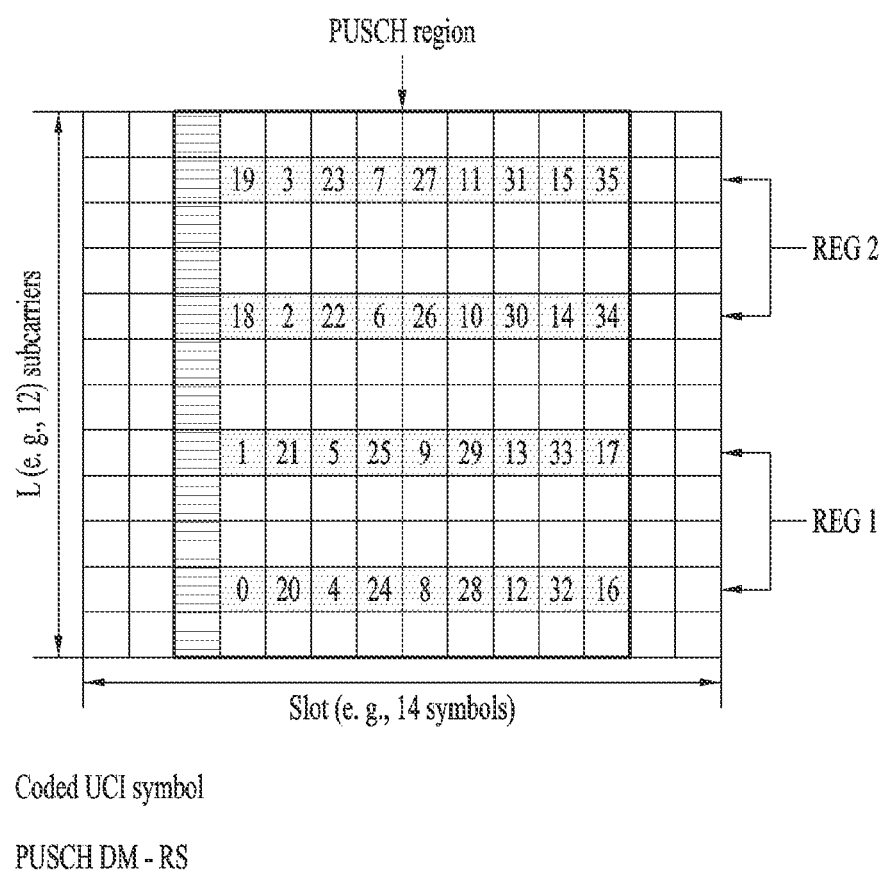
FIGS. 31 and 32 are diagrams schematically illustrating how a UE performs UCI mapping alternately on REGs when each of the REGs is composed of M distributed REs within the same symbol.
Figure 32:
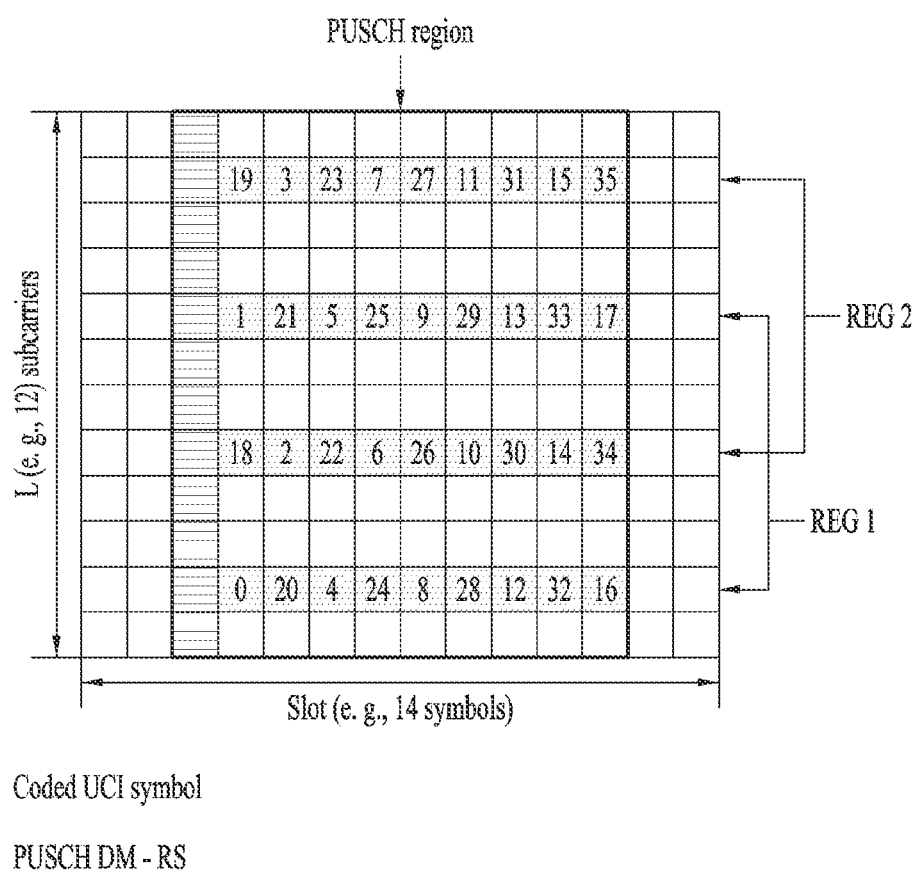

FIGS. 31 and 32 are diagrams schematically illustrating how a UE performs UCI mapping alternately on REGs when each of the REGs is composed of M distributed REs within the same symbol.

Figure 33:
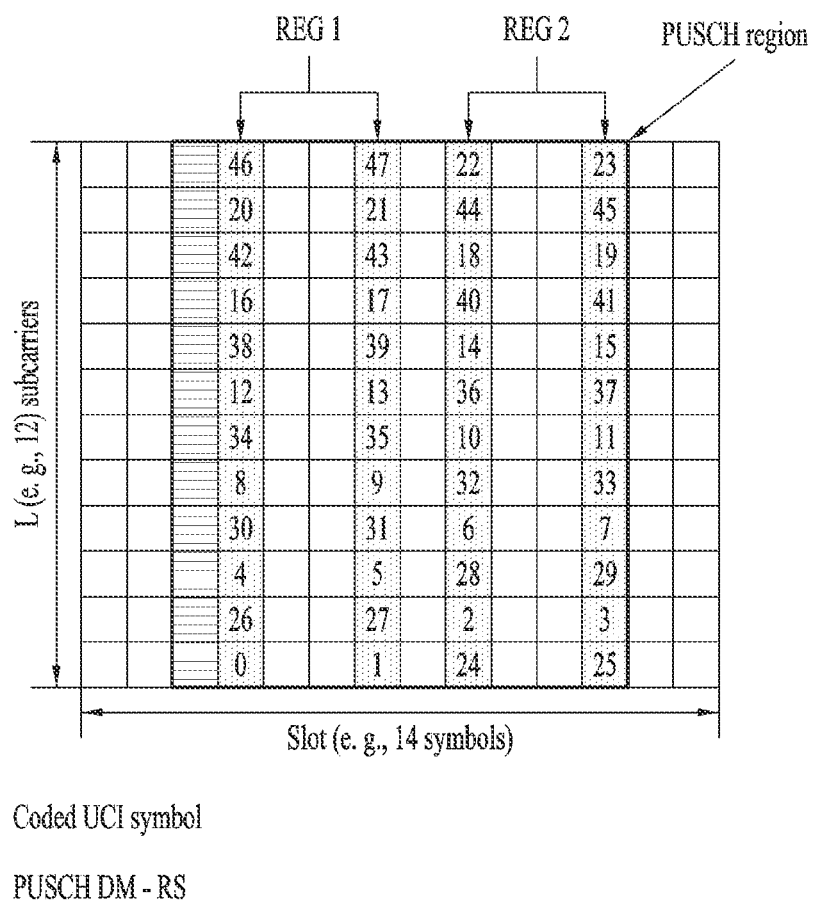
FIGS. 33 and 34 are diagrams schematically illustrating how a UE performs UCI mapping alternately on REGs when each of the REGs is composed of M distributed REs within the same subcarrier.
Figure 34:
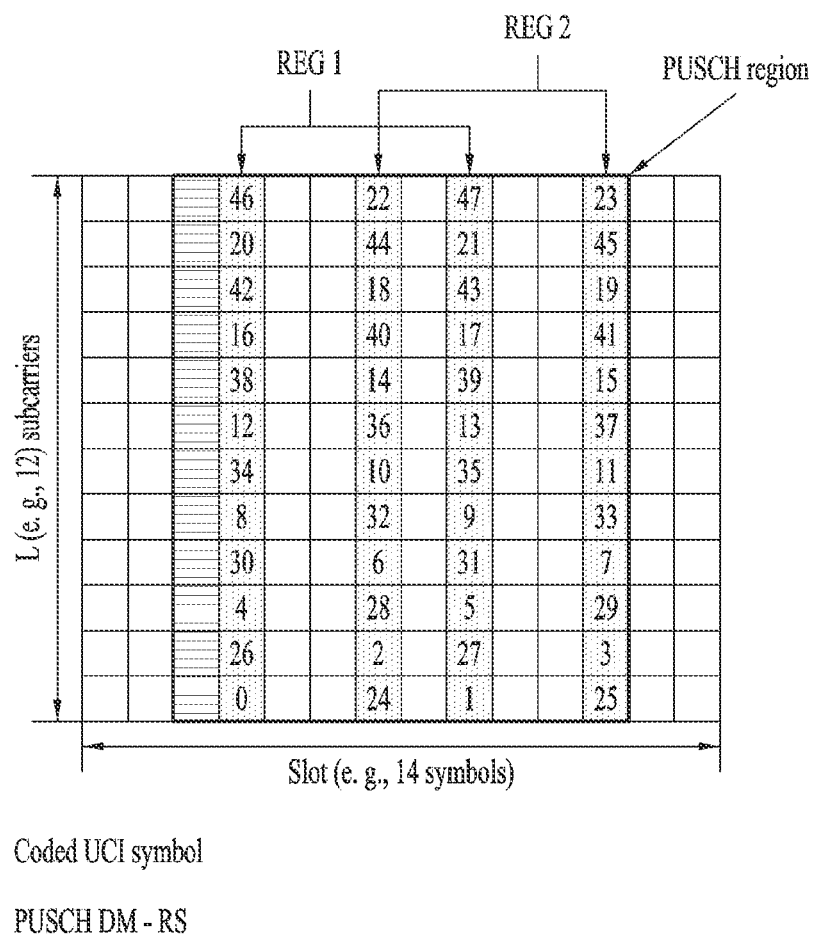

FIGS. 33 and 34 are diagrams schematically illustrating how a UE performs UCI mapping alternately on REGs when each of the REGs is composed of M distributed REs within the same subcarrier.

Figure 35:
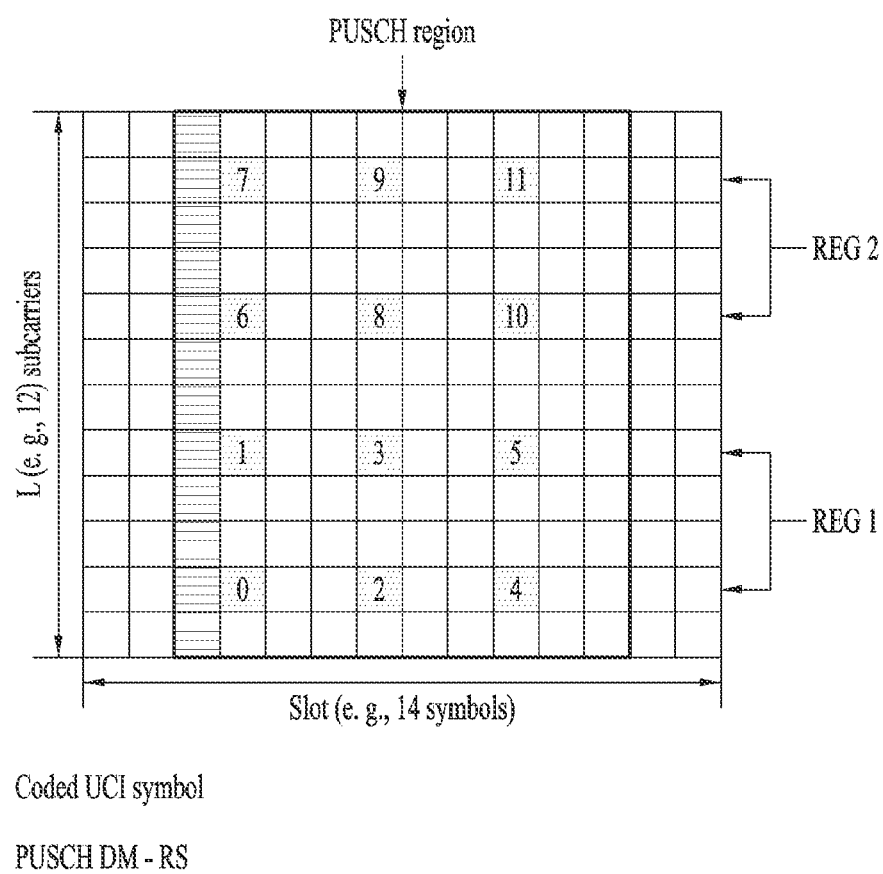
FIG. 35 is a diagram schematically illustrating UCI mapping operation performed by a UE when a BS allows the UE to perform UCI mapping on the first, fourth, seventh, tenth, and thirteenth symbols.

Additionally, when the eNB imposes a limitation on UCI mapping available symbols, the UE may perform the UCI mapping in a distributed manner as shown in FIG. 35. FIG. 35 is a diagram schematically illustrating UCI mapping operation performed by a UE when a BS allows the UE to perform UCI mapping on the first, fourth, seventh, tenth, and thirteenth symbols. In FIG. 35, it is assumed that UCI mapping order between symbols is determined based on ascending order of symbol indices.

The above-described second UCI transmission method can be applied together with other proposed methods of the present invention unless they collide with each other.

3.3. Third UCI Transmission Method

When the UE performs UCI piggyback for UCI 1 on PUSCH 1 and transmits PUSCH 2 using a mini-slot in the slot for PUSCH 1 transmission, symbols for transmitting UCI 1 (or REs to which UCI 1 is mapped) may collide with resources for PUSCH 2. In this case, the UE may perform one of the following operations.

(1) The UE drops UCI 1 transmission.
(2) The UE drops PUSCH 2 transmission.
(3) The UE performs puncturing of PUSCH 2 data allocated to the symbols for transmitting UCI 1 (or REs to which UCI 1 is mapped) or performs rate-matching such that the symbols for transmitting UCI 1 (or REs to which UCI 1 is mapped) are excluded from the resources for PUSCH 2.

As a particular example, it is assumed that the UE transmits a PUSCH for an eMBB service (PUSCH 1) in a slot with a length of 1 ms and the eNB instructs the UE to transmit PUSCH 2 for a URLLC service using a mini-slot, which is less than 1 ms, in the slot for the PUSCH 1 transmission.

When the UE performs UCI piggyback on PUSCH 1, if UCI collides with PUSCH 2, it is necessary to protect the UCI transmission, which is relatively more important. Ideally, the PUSCH 1 transmission region may be redefined such that the PUSCH 2 transmission region is excluded therefrom, and the UE may perform UCI mapping again in the redefined PUSCH 1 transmission resource region. However, considering the UE's processing time, this method may not be practical.

Accordingly, as a more practical method, it is possible to consider a method of prohibiting PUSCH 2 transmission in symbols (or mapped REs) for transmitting UCI on PUSCH 1.

Figure 36:
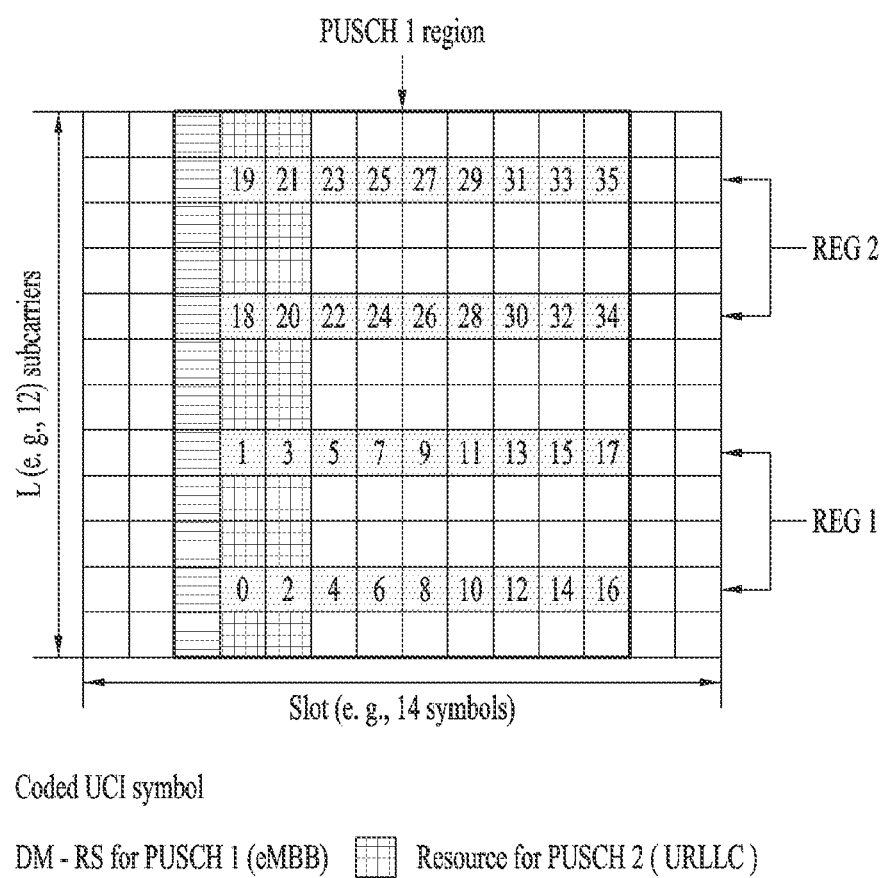
FIG. 36 is a diagram illustrating a case where PUSCH 2 is transmitted in a mini-slot composed of two symbols at the position of the fourth and fifth symbols when PUSCH 1 and UCI is transmitted.

FIG. 36 is a diagram illustrating a case where PUSCH 2 is transmitted in a mini-slot composed of two symbols at the position of the fourth and fifth symbols when PUSCH 1 and UCI is transmitted. In FIG. 36, the UE can perform puncturing or rate-matching on REs to which UCI to be transmitted on PUSCH 1 is mapped among resources for PUSCH 2 transmission.

In this configuration, the transmission priority can be determined as follows.

eMBB Data<ULRRC Data<eMBB UCI<ULRRC UCI

For example, if PUSCH 2 contains UCI, the UE may transmit whole PUSCH 2 without performing puncturing or rate-matching on REs to which UCI in the PUSCH 1 region is mapped.

The above-described third UCI transmission method can be applied together with other proposed methods of the present invention unless they collide with each other.

3.4. Fourth UCI Transmission Method

When the UE performs UCI piggyback on the PUSCH, the UE can apply a PUSCH DM-RS pattern (pattern B) different from the PUSCH DM-RS pattern (pattern A) used when the UCI piggyback is not performed.

In this case, the UE may perform UCI mapping on symbols adjacent to a PUSCH DM-RS according to pattern B.

For example, pattern B may have DM-RS density higher than pattern A.

Figure 37:
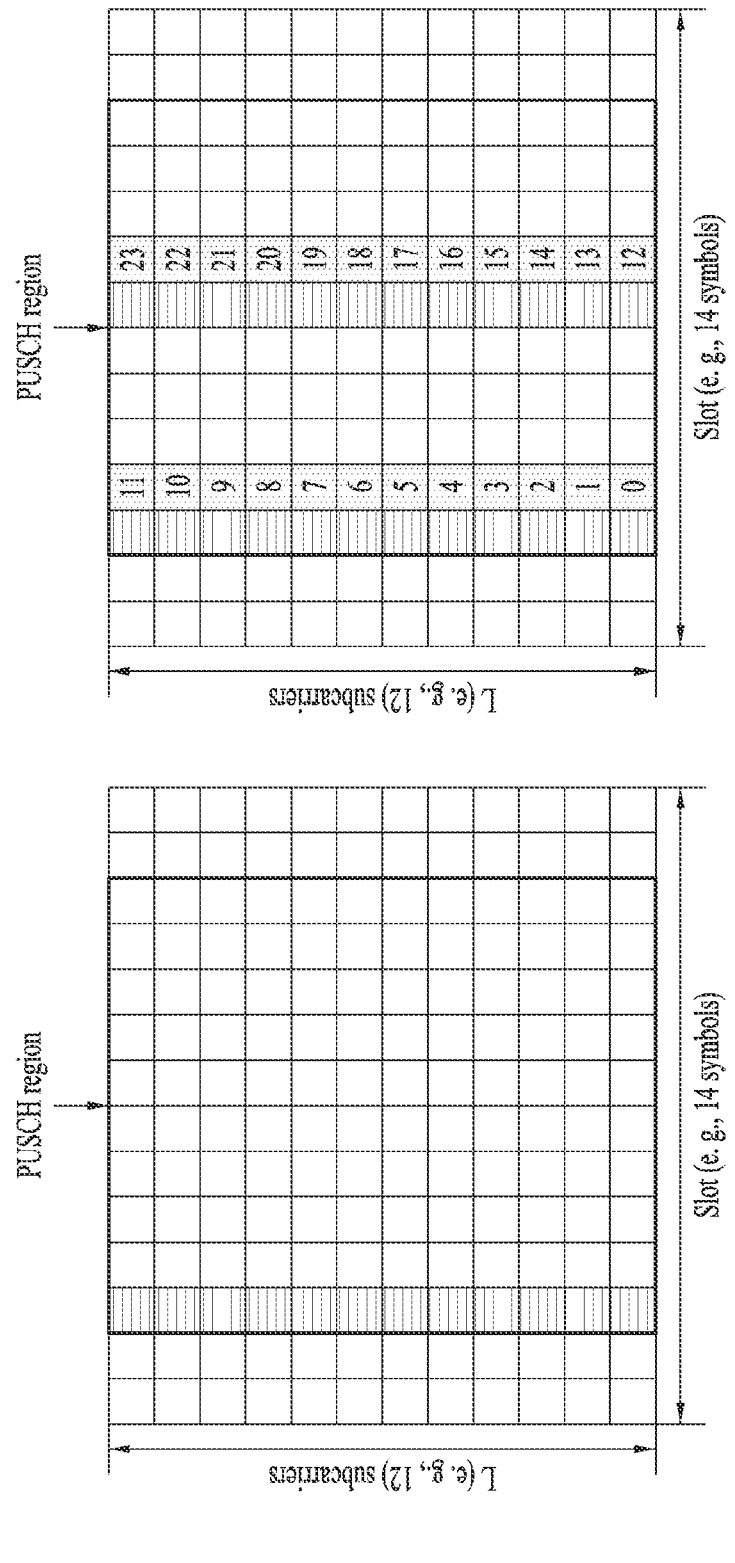
FIG. 37 is a diagram illustrating a DMRS mapping pattern when a PUSCH is transmitted without UCI piggyback and a DMRS mapping pattern when a PUSCH to which UCI piggyback is applied is transmitted.

FIG. 37 is a diagram illustrating a DMRS mapping pattern when a PUSCH is transmitted without UCI piggyback and a DMRS mapping pattern when a PUSCH to which UCI piggyback is applied is transmitted.

As a particular example, when the UE performs PUSCH transmission without UCI piggyback, the UE may transmits a DM-RS in one symbol as shown in the left drawing of FIG. 37. On the other hand, when the UE performs PUSCH transmission where UCI piggyback is applied, the UE may transmit a DM-RS in two symbols to obtain better channel estimation performance and perform UCI mapping on symbols adjacent to the two DM-RS symbols.

In addition, when an additional UL RS (e.g., additional DM-RS or PTRS) is added in the PUSCH, the UCI mapping method may be changed according to whether the additional UL RS is present or not.

The above-described fourth UCI transmission method can be applied together with other proposed methods of the present invention unless they collide with each other.

3.5. Fifth UCI Transmission Method

When the UE performs PUSCH (or PDSCH) data to RE mapping, the UE can perform time-first mapping in the resource region corresponding to some symbols in a PUSCH (or PDSCH) transmission slot and perform frequency-first mapping in the resource region corresponding to the remaining symbols.

If the UE uses the frequency-first mapping scheme in performing PUSCH data to RE mapping, it is advantageous in terms of early decoding but also has a disadvantage in that it is difficult to obtain the time diversity. On the contrary, the time-first mapping scheme is somewhat disadvantageous in terms of early decoding but has an advantage in that the time diversity can be easily obtained.

Considering mini-slot based transmission such as URLLC, distribution of data in the time domain may be more efficient to reduce the fast interference fluctuation or the impact of an instantaneous interference signal. Meanwhile, considering that early decoding is one of the major features of the NR system to which the present invention is applicable, it is desirable to allow the UE to start decoding rapidly in the NR system to which the present invention is applicable.

To solve this problem, the UE may be configured to perform time-first mapping in the resource region corresponding to front symbols in a slot and perform frequency-first mapping in the resource region corresponding to the remaining symbols. Since the UE increases its processing speed when processing data stored in the buffer in general, the UE may perform decoding at high speed after buffering data in front symbols and then perform decoding per symbol based on the frequency-first mapping scheme with respect to data in rear symbols. In this case, since time-first mapping is applied to the data in the front symbols, it is possible to obtain a time diversity gain.

The above-described fifth UCI transmission method can be applied together with other proposed methods of the present invention unless they collide with each other.

3.6. Sixth UCI Transmission Method

When the UE performs UCI piggyback on the PUSCH, the UE can perform UCI mapping according to one of the following methods.

(1) The UE punctures some data REs and performs the UCI mapping on the corresponding REs.
(2) The UE applies rate-matching to decrease some data REs and performs the UCI mapping on the remaining REs (in the PUSCH).

In this case, the UE may determine the data REs corresponding to the puncturing (or rate-matching) target such that the region (symbols) where systematic bits of coded data bits are transmitted are excluded.

As a particular example, if the systematic bits of the coded data bits are allocated from the last PUSCH symbol in reverse order, the UE may perform the UCI mapping by sequentially performing puncturing (or rate-matching) on several symbols, starting from the first symbol (adjacent to a PUSCH DM-RS). By doing so, it is possible to prevent the systematic bits from being punctured during the UCI mapping process.

Additionally, in the sixth UCI transmission method, PUSCH data to RE mapping order when the UCI piggyback is performed may be different from that when the UCI piggyback is not performed (for example, in the case of the PUSCH with no UCI piggyback, the RE mapping is performed in reverse order in the time domain.

The above-described sixth UCI transmission method can be applied together with other proposed methods of the present invention unless they collide with each other.

3.7. Seventh UCI Transmission Method

When the PUSCH DM-RS is transmitted on one of N interlace resources in a DM-RS symbol based on the IFDMA scheme, if a specific condition is satisfied (for example, a case in which the UE performs UCI piggyback on the PUSCH and/or a case in which multi user multiple input multiple output (MU-MIMO) is deactivated), the UE may use other interlace resource in the DM-RS symbol for UCI mapping.

In this case, the eNB may inform the UE of the DM-RS symbol where the UCI mapping can be performed and/or the interlace resource (in the symbol).

Particularly, in the NR system to which the present invention is applicable, orthogonality should be guaranteed between DM-RS resources to support MU-MIMO operation when the CP-OFDM based PUSCH is transmitted. In the legacy LTE system, the code division multiplexing (CDM) scheme such as a cyclic shift, orthogonal cover code (OCC), etc. has been applied to achieve orthogonality between PUSCH DM-RSs. However, since DM-RS (to) RE mapping is relatively free in the CP-OFDM based PUSCH according to the NR system to which the present invention is applicable, it is possible to distinguish DM-RSs for different UEs from each other using the FDM scheme.

Therefore, the PUSCH DM-RS can be transmitted using one of the N interlace resources (or one of N comb resources) based on the IFDMA scheme. In this case, if the UE performs UCI piggyback on the PUSCH, it is desirable that the UE maps UCI close to the resource where the DM-RS is transmitted in terms of channel estimation accuracy. In addition, if the remaining interlace resources (or comb resources) in the symbol where the DM-RS is transmission are available, it may be considered that the UE will perform the UCI mapping on the corresponding resources. However, this operation can be supported only when it is guaranteed that another UE's DM-RS is not present in the remaining interlace resources (or comb resources) in the DM-RS transmission symbol due to deactivation of the MU-MIMO operation.

The above-described seventh UCI transmission method can be applied together with other proposed methods of the present invention unless they collide with each other.

3.8. Eight UCI Transmission Method

When the UE performs UCI piggyback on the PUSCH, the UCI mapping method may be changed according to whether UCI has either a short PUCCH format or long PUCCH format.

Here, the short PUCCH format means the PUCCH format composed of one or two symbols in a slot, and the long PUCCH format means the PUCCH format composed of two or more symbols or configured with the entire symbol.

Both the short and long PUCCH formats are considered in the NR system to which the present invention is applicable. In this case, the short PUCCH format can be used when there is no coverage problem and low latency is required, and the long PUCCH format can be used when wide coverage needs to be supported.

In this case, the maximum UCI payload size that can be transmitted through the short PUCCH format may be different from the maximum UCI payload size that can be transmitted through the long PUCCH format. Thus, the amount of REs required for the UE to perform the UCI piggyback on the PUSCH may vary. In particular, when the UE performs the UCI piggyback using REs distributed in the frequency domain, if the maximum UCI payload size is relatively small, the UE can maximize the frequency diversity gain by increasing the frequency-domain interval between the REs used for the UCI piggyback on the PUSCH.

Accordingly, the present invention proposes a method of applying different UCI mapping by adjusting the time-domain interval and/or frequency-domain interval between REs, where the UCI mapping is performed, in accordance with the maximum UCI payload size in each of the cases where the UCI piggyback is performed using the short PUCCH format and long PUCCH format.

The above-described eight UCI transmission method can be applied together with other proposed methods of the present invention unless they collide with each other.

3.9. Ninth UCI Transmission Method

When the UE performs UCI piggyback on the PUSCH, the following resources may not be allowed to be used for the UCI piggyback.

(1) The symbols ahead of the (first) DM-RS transmission symbol in the PUSCH transmission region are not allowed. For example, if the DM-RS location is fixed regardless of the location of the PUSCH starting symbol, the UCI piggyback may not be allowed in PUSCH transmission symbols ahead of the (first) DM-RS.
(2) The symbols where DM-RS transmission can be performed for another UE in the cell are not allowed.
(3) The frequency resources (e.g., subcarriers) used as a direct current (DC) subcarrier(s) are not allowed.
  Operation (3) can be differently applied depending on the waveform applied to the PUSCH.
  For example, when the CP-OFDM waveform is applied, the UE may perform puncturing or rate-matching on the DC subcarrier(s) or DC subcarrier candidates and transmit UL data on the corresponding subcarrier(s) while performing the UCI piggyback.
  As another example, when the DFT-s-OFDM waveform is applied, the UE may transmit UCI even on the DC subcarrier(s) while performing the UCI piggyback. In this case, if the UCI is transmitted on the DC subcarrier(s), the code rate for the UCI may increase according to the number of DC subcarriers containing the UCI.

Here, the DC subcarrier(s) may mean the subcarrier(s) that can be used as for DC, which the BS (e.g., eNB or gNB) informs the UE or the UE informs the BS (e.g., eNB or gNB).

Figure 38:
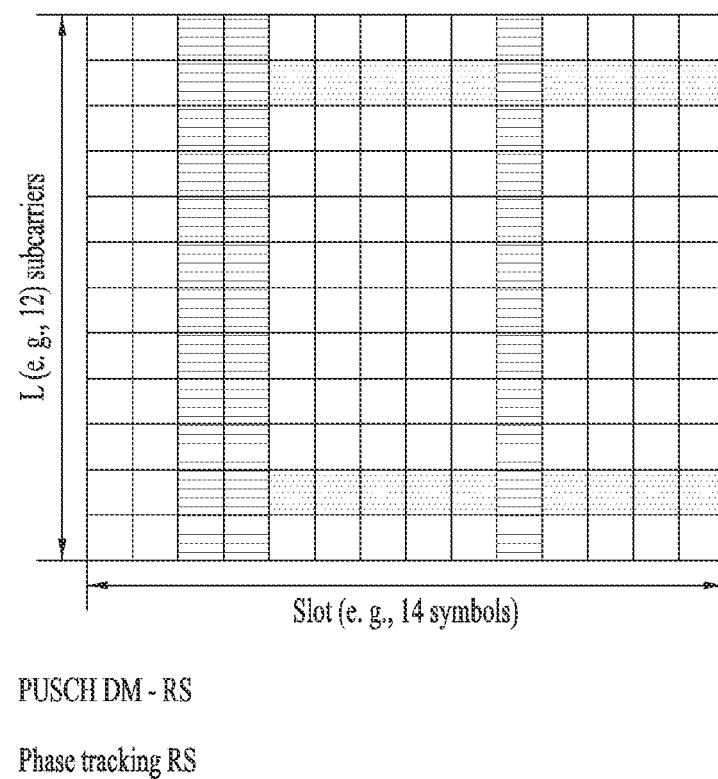
FIG. 38 is a diagram illustrating a PUSCH DM-RS and a phase tracking reference signal (PT-TR) existing in a slot.

FIG. 38 is a diagram illustrating a PUSCH DM-RS and a phase tracking reference signal (PT-TR) existing in a slot.

In FIG. 38, the PUSCH may be transmitted in symbols #0 and #1. However, the UCI piggyback may not be allowed in symbols #0 and #1 in order to commonly apply the UCI piggyback rule regardless of the location of the PUSCH starting symbol.

Alternatively, when the starting and ending symbols of the PUSCH are dynamically changed, the UCI piggyback may be defined only in the symbols where the PUSCH transmission is always guaranteed. For example, assuming that there are a total of 14 symbols in an entire slot, the PUSCH starting symbol includes symbols #0, #1, and #2, and the PUSCH ending symbol includes symbols #11, #12, and #14, the UE may apply the UCI piggyback only to symbols #3, #4, #5, . . . , #10 which always exist if the PUSCH is transmitted.

In addition, to support the MU-MIMO operation, the UCI piggyback may not be performed on potential symbols that can be used for transmitting a DM-RS for another UE. For example, in FIG. 38, assuming that UE 1 transmits the DM-RS only in symbol #2, UE 2 transmits the DM-RS in both symbols #2 and #3, and the MU-MIMO is applied between their PUSCHs, it is desirable from the perspective of UE 1 that the UCI piggyback is not performed on symbol #3. In particular, if power boosting is applied to the DM-RS unlike data, it is preferred not to perform the UCI piggyback because interference effects may increase in the corresponding symbol.

Moreover, when a specific subcarrier(s) is used as the DC subcarrier, the UCI piggyback may not be performed on the corresponding subcarrier(s).

Additionally, the UCI piggyback may be allowed only when the number of symbols in the scheduling unit where the PUSCH is transmitted is equal to or greater than a predetermined value. For example, the NR system to which the present invention is applicable can support the mini-slot, which is composed of symbols fewer than those of the slot.

In this case, if the number of symbols in the mini-slot is not sufficient, the ratio of rate-matched or punctured data is relatively increased due to the UCI piggyback, and thus the data error detection rate in the PUSCH transmission may be increased. Therefore, only when the mini-slot includes sufficient symbols, the UCI piggyback may be allowed.

Further, the parameters applied to the UCI piggyback (e.g., coding rate adjustment parameter) may vary according to the number of symbols in the scheduling unit where the PUSCH is transmitted in addition to the number of symbol in the mini-slot. For instance, when the mini-slot includes many symbols, the coding rate adjustment parameter for the UCI piggyback (hereinafter referred to as beta offset) may be set lower to reduce data resource loss. On the contrary, when the mini-slot includes a few symbols, the beta offset may be set to have a large value.

Additionally, the eNB may inform the UE of symbols where the UE can perform the UCI piggyback through DCI. For example, the eNB may inform the UE of the starting symbol index and/or ending symbol index capable of the UCI piggyback through UL scheduling DCI.

The above-described ninth UCI transmission method can be applied together with other proposed methods of the present invention unless they collide with each other.

3.10. Tenth UCI Transmission Method

When the UE performs UCI piggyback on the PUSCH, the UE may differently apply a method of mapping UCI (or UCI coded bits) to REs (hereinafter referred to as UCI-to-RE mapping) according to a method of mapping data (or data coded bits) to REs (hereinafter referred to as data-to-RE mapping).

Specifically, the aforementioned data-to-RE mapping and UCI-to-RE mapping can be performed as follows.

(1) A case where the data-to-RE mapping is frequency-first mapping

At this time, the UCI-to-RE mapping may be time-first mapping where (some or all of) time-domain resources are first occupied (prior to the frequency domain). In this case, some specific time-domain resources to which UCI is mapped may be set equal to or different from each other per frequency resource (e.g., subcarrier, PRB, etc.) index.

(2) A case where the data-to-RE mapping is time-first mapping

In this case, the UCI-to-RE mapping may be frequency-first mapping where (some or all of) frequency-domain resources are first occupied (prior to the time domain). In this case, some specific frequency-domain resources to which UCI is mapped may be set equal to or different from each other per time resource (e.g., symbol, sub-slot, etc.) index.

In this case, the UE may puncture some data REs and then perform the UCI-to-RE mapping on the corresponding REs. Alternatively, the UE may apply rate-matching to decrease some data REs and performs the UCI-to-RE mapping on the remaining REs in the PUSCH.

More specifically, if PUSCH data-to-RE mapping is performed in a frequency-first manner (i.e., frequency-first mapping), a data code block (CB) is also allocated to a series of REs in accordance with the frequency-first mapping. At this time, if the frequency-first mapping is applied even to the UCI-to-RE mapping, the data REs, which are punctured due to the UCI, are concentrated on a data transmission RE group to which a specific CB is allocated, and thus data decoding performance for the corresponding CB may be degraded.

To solve this problem, when the data-to-RE mapping is the frequency-first mapping, the UCI-to-RE mapping may be configured to be the time-first mapping. In this case, since only some REs corresponding to some coded bits are punctured from the perspective of one CB, it is possible to reduce the effect of the UCI piggyback on the data decoding performance. Similarly, when the PUSCH data-to-RE mapping is the time-first mapping, the UCI-to-RE mapping may be configured to be the frequency-first mapping.

The above-described tenth UCI transmission method can be applied together with other proposed methods of the present invention unless they collide with each other.

3.11. Eleventh UCI Transmission Method

In this specification, a counter DAI (downlink assignment index) (hereinafter abbreviated as a c-DAI) means a specific index value included in DCI (e.g., DL scheduling DCI) for informing order between (scheduled) PDSCHs (or transport blocks (TBs) or code block groups (CBGs)), and a total DAI (hereinafter abbreviated as a t-DAI) means a specific index value included in DCI (e.g., DL scheduling DCI) for informing the total number of PDSCHs corresponding to HARQ- ACK reporting targets (or the total number of TBs or CBGs). In this case, when configuring HARQ-ACK payload, the UE may configure input bits in c-DAI order.

According to the above configuration, when the UE performs UCI piggyback on the PUSCH, the eNB may inform the UE of the total number of PDSCHs corresponding to the HARQ-ACK reporting targets (TBs or CBGs) through the t-DAI and UL DAI (in UL grant). In this case, the UE may determine the HARQ-ACK payload size using the UL DAI value only.

In this case, when performing the UCI piggyback, the UE may perform rate-matching (or puncturing) for UCI transmission resources (in terms of PUSCH transmission).

More specifically, when the UE performs the UCI piggyback on the PUSCH, if the eNB is able to inform the total number of PDSCHs corresponding to the HARQ-ACK reporting targets (TBs or CBGs) through the t-DAI in DL assignment (=DL scheduling DCI), the eNB may expect HARQ-ACK reporting with respect to $N_1$ PDSCHs (TBs or CBGs) during a predetermined time and then instruct to report HARQ-ACK with respect to $N_2$ ($\neq N1$) PDSCHs (TBs or CBGs) after elapse of the predetermined time. In this case, if the UE fails to detect the DL assignment containing the t-DAI, which indicates the value of $N_2$, the HARQ-ACK payload size considered (for the UCI piggyback) may be mismatched between the eNB and UE.

Thus, when the UE performs the UCI piggyback, the eNB may inform the total number of PDSCHs corresponding to the HARQ-ACK reporting targets (TBs or CBGs) through the UL DAI in UL grant, and the UE may ignore the t-DAI in the DL assignment (at least in the case of the UCI piggyback) and then determine the UCI payload size for HARQ-ACK reporting using only the UL DAI in the UL grant. Meanwhile, the t-DAI may be used when the UE reports HARQ-ACK via the PUCCH.

In the following description, a control resource set (CORESET) may mean a physical resource region composed of a plurality of resource element groups (REGs) and include at least one search space (SS). The SS may be configured cell-specifically, UE-specifically, or UE-group-specifically. The UE may detect the PDCCH (or downlink control information (DCI)) that schedules DL data transmission from the SS.

Meanwhile, in the NR system to which the present invention is applicable, a CORESET for transmitting RMSI (remaining system information), which is configured through a physical broadcast channel (PBCH), (hereinafter referred to as CORESET A), a CORESET for transmitting OSI (other system information), which is configured through RMSI, (hereinafter referred to as CORESET B), and a CORESET of which the main purpose is unicast data transmission, which is configured through UE-specific RRC signaling, (hereinafter referred to as CORESET C) may exist.

In this case, the DAI field may be configured to be always nonexistent for the PDCCH (or fallback DCI) transmitted in CORESET A/B and be added/excluded for the PDCCH transmitted in CORESET C.

Alternatively, the DAI field may be configured to be always nonexistent for the PDCCH (or fallback DCI) transmitted in CORESET A and be added/excluded for the PDCCH transmitted in CORESET B/C.

The configuration for allowing the DAI field to be non-existent for the CORESET configured though the PBCH and/or RMSI is to secure stable fallback DCI formats at all times by eliminating ambiguity caused by re-configuration in advance. If the DAI field is configured to be added/excluded for all CORESETs, there may be no fallback DCI format capable of supporting the UE while the eNB reconfigures the DAI field.

More specifically, the DAI may be configured to be always nonexistent in DCI in the CORESET configured through the PBCH (and/or CORESET configured through the RMSI), and the DAI field may be configured to be added/excluded to/from DCI in the CORESET configured through RRC signaling (and/or CORESET configured through the RMSI) (that is, the DAI field may be configured to be nonexistent or added/excluded in the CORESET configured through the RMSI).

The above-described configuration can be equally applied to an HARQ timing indicator, HARQ-ACK PUCCH resource indicator, dynamic beta offset indicator, etc. That is, the HARQ timing indicator, HARQ-ACK PUCCH resource indicator, dynamic beta offset indicator, etc. may be configured to be always nonexistent in the DCI in the CORESET configured through the PBCH (and/or CORESET configured through the RMSI) and be added/excluded to/from the DCI in the CORESET configured through RRC signaling (and/or CORESET configured through the RMSI).

Moreover, the DAI is not configured in the DCI in the CORESET configured through the PBCH or RMSI at all time, but the DAI may be configured or not in the DCI in the CORESET configured through RRC signaling.

Further, this configuration can be equally applied to the HARQ timing indicator, HARQ-ACK PUCCH resource indicator, dynamic beta offset indicator, and the like.

The above-described eleventh UCI transmission method can be applied together with other proposed methods of the present invention unless they collide with each other.

3.12. Twelfth UCI Transmission Method

When the UE performs UCI piggyback on the PUSCH, candidates for the PDSCH set (or TB or CBG set) corresponding to HARQ-ACK reporting targets for the UCI piggyback can be configured according to one of the following methods.

(1) Configuration according to the predetermined rule
(2) Configuration through a higher layer signal (e.g., RRC signaling)

In this case, the eNB may indicate one of a plurality of candidates through a specific bit field in UL grant, and the UE may perform the UCI piggyback by configuring HARQ-ACK information on the indicated PDSCH set (or TB or CBG set) corresponding to the HARQ-ACK reporting targets.

At this time, a specific PDSCH (or TB or CBG) in the PDSCH set (or TB or CBG set) can be represented by a combination of at least one of a carrier index, slot index (time offset associated with the UCI piggyback transmission time), HARQ process ID, TB index, CBG index, and PUCCH resource index.

As a particular example, the eNB may configure, for the UE, four PDSCH (TB or CBG) sets composed of 20, 15, 10, 5 PDSCHs (TBs or CBGs), respectively, each of which corresponds to the HARQ-ACK reporting target, through a higher layer signal and the like, select one from among the four PDSCH (or TB or CBG) sets, and then instruct to perform the UCI piggyback with respect to the corresponding PDSCH (TB or CBG), which is set by UL grant. A specific PDSCH (TB or CBG) in the PDSCH (TB or CBG) set corresponding to the HARQ-ACK reporting target may be represented by the carrier index and time offset associated with the UCI piggyback transmission.

The above-described twelfth UCI transmission method can be applied together with other proposed methods of the present invention unless they collide with each other.

3.13. Thirteenth UCI Transmission Method

When the UE performs UCI piggyback, the UE may perform rate-matching on some UCI transmission resources for UCI corresponding to the UCI piggyback target (e.g., HARQ-ACK or CSI) (in terms of PUSCH transmission) and puncturing on the remaining UCI transmission resources (in terms of the PUSCH transmission).

At this time, in the case of a semi-persistent CSI report, the UE may perform puncturing (with respect to the PUSCH) in spite of CSI by considering the missing possibility of activation/release DCI.

In the legacy LTE system, when the UE transmits HARQ-ACK through UCI piggyback, the UE performs puncturing on HARQ-ACK transmission resources (in terms of the PUSCH transmission). However, in the NR system to which the present invention is applicable, since it is expected that the UCI payload size for HARQ-ACK transmission increases due to code block-level HARQ-ACK transmission and the like, if the UE performs puncturing on the HARQ-ACK transmission resources (in terms of the PUSCH transmission) for the UCI piggyback, it may degrade PUSCH performance (compared to rate-matching).

Therefore, it is desirable that the UE performs rate-matching on the HARQ-ACK transmission resources (in terms of the PUSCH transmission). In this case, if the eNB sets the UCI payload size to a specific fixed value (e.g., semi-static codebook) for the HARQ-ACK corresponding to the UCI piggyback target instead of informing the UE of the UCI payload size based on the actually scheduled PDSCH, the UE should perform rate-matching on the PUSCH by assuming the fixed UCI payload size. In this case, resources more than the necessary amount may be allocated for the HARQ-ACK transmission due to such rate-matching so that the amount of resources for data transmission in the PUSCH may be relatively decreased.

Therefore, the present invention proposes that a UE performs rate-matching on some HARQ-ACK (or CSI) transmission resources for HARQ-ACK (or CSI) (in terms of PUSCH transmission) and performs puncturing on the remaining HARQ-ACK (or CSI) transmission resources (in terms of the PUSCH transmission) when the UE performs UCI piggyback. Specifically, the UE may perform rate-matching on the corresponding HARQ-ACK transmission resources (in terms of the PUSCH transmission) by estimating the HARQ-ACK payload size based on a value preconfigured by the eNB. However, if the HARQ-ACK payload size is greater than a predetermined value, the UE may apply rate-matching to some HARQ-ACK resources (in terms of the PUSCH transmission) and then perform transmission using generated transmission resources. In addition, the UE may perform puncturing on the remaining HARQ-ACK resources (in terms of the PUSCH transmission) and then perform transmission using additionally created transmission resources.

In this case, whether the UE should perform rate-matching or puncturing on the corresponding UCI transmission resources (in terms of the PUSCH transmission) when transmitting specific HARQ-ACK (or CSI) information may be determined according to the latency required for the corresponding HARQ-ACK (or CSI). For example, if the latency required for the HARQ-ACK (or CSI) is equal to or lower than a certain level, the UE may perform puncturing on the corresponding transmission resources (in terms of the PUSCH transmission). On the contrary, if the required latency is higher than the certain level, the UE may perform rate-matching on the corresponding transmission resources (in terms of the PUSCH transmission).

The above-described thirteenth UCI transmission method can be applied together with other proposed methods of the present invention unless they collide with each other.

3.14. Fourteenth UCI Transmission Method

When the UE intends to perform UCI piggyback on the PUSCH, the UE can perform the UCI piggyback according to one of the following methods.

(1) Method 1: The UE performs rate-matching on all UCI transmission resources (in terms of PUSCH transmission).

(2) Method 2: The UE performs rate-matching on some UCI transmission resource (in terms of the PUSCH transmission) and performs puncturing on the remaining UCI transmission resources (in terms of the PUSCH transmission).

In this case, the eNB may determine whether the UE use either method 1 or method 2 according to one of the following methods.

1) Indication through DCI (e.g., UL grant)
2) Configuration through a higher layer signal (e.g., RRC signaling)
3) Selection of either method 1 or method 2 according to the UCI payload size (or t-DAI (or UL DAI) in DL DCI (or UL grant)). For example, if the UCI payload size (or t-DAI (or UL DAI) in the DL DCI (or UL grant)) is small, method 2 can be applied. If the corresponding value is large, method 1 can be applied.
4) In the case of a semi-static A/N codebook, method 1 can be applied, and in the case of a dynamic A/N codebook, method 2 can be applied.

In this case, when rate-matching is performed (in terms of the PUSCH transmission) according to method 1 and/or method 2, RE mapping may be performed such that the region to which rate-matching is applied is maximally distributed per CB or CBG of PUSCH data.

As a particular example, when the UCI payload size corresponding to the UCI piggyback target is large, if the UE performs rate-matching on the UCI transmission resources (in terms of the PUSCH transmission) and then transmit the UCI, it may be advantageous in terms of PUSCH performance. On the contrary, when the UCI payload size corresponding to the UCI piggyback target is small, if the UE performs puncturing on the UCI transmission resources (in terms of the PUSCH transmission) and then transmit the UCI, it may be advantageous in terms of UE complexity.

In this case, since the UE can be always aware of the accurate UCI payload size for the CSI, the UE may apply rate-matching to CSI transmission resources (in terms of the PUSCH transmission) when performing the UCI piggyback. In this case, only when the UE performs the UCI piggyback for HARQ-ACK, the UE may perform either rate-matching or puncturing on HARQ-ACK transmission resources (in terms of the PUSCH transmission). Consequently, in this case, the UE may perform the UCI piggyback according to either method 1 or method 2.

In this configuration, whether rate-matching or puncturing will be performed on HARQ-ACK transmission resources (in terms of the PUSCH transmission) may be configured by the eNB through DCI and/or RRC signaling or implicitly determined by the UE according to the HARQ-ACK payload size.

Additionally, a method (method 3) of instructing a UE to perform puncturing on all UCI transmission resources (in terms of the PUSCH transmission) according to UL grantto-PUSCH delay while the UE performs UCI piggyback may be considered. For example, if the UL grant-to-PUSCH delay is equal to lower than a predetermined value, the UE may apply method 3 when performing the UCI piggyback. On the other hand, if the UL grant-to-PUSCH delay is higher than the predetermined value, the UE may apply method 1. At this time, the reference value for determining whether the UL grant-to-PUSCH delay is high or low may be predetermined or configured by the eNB through a higher layer signal. According to method 3, the UE can process PUSCH generation and UCI piggyback in parallel, and thus, the UE can perform the UCI piggyback even when the PUSCH is rapidly transmitted.

Additionally, the UE may use one of the following options in performing the UCI piggyback according to the maximum payload size (for HARQ-ACK or entire UCI).

[1] Opt 1: When performing the UCI piggyback (transmitting the UCI on PUSCH resources), the UE performs UCI mapping based on rate-matching (in terms of the PUSCH transmission) with respect to all UCI.

[2] Opt 2: When performing the UCI piggyback (transmitting the UCI on PUSCH resources), the UE performs UCI mapping based on puncturing (in terms of the PUSCH transmission) with respect to HARQ-ACK and performs UCI mapping based on rate-matching (in terms of the PUSCH transmission) with respect to remaining types of UCI.

For example, if the maximum payload size is equal to or greater than X [bits], Opt 1 is applied. On the contrary, if the maximum payload size is less than X [bits], Opt 2 may be applied.

The maximum payload size may be determined based on a combination of at least one of the number of CCs (component carriers) CA-configured (carrier aggregation) for the UE, the maximum number of TBs or CWs (codewords) configured per CC, the number of CB groups in each TB configured per CC (HARQ-ACK feedback is configured per CB group), the number of HARQ-ACK transmission timing candidates (on a slot or TTI basis) configured for the UE or per CC, and the maximum number of HARQ processes configured for the UE or per CC. For example, the UE having such parameter configuration may determine the number of HARQ-ACK feedback bits corresponding to DL data scheduled by using all of the maximum CCs, CCs, TBs/CWs, CBGs, slots/TTIs, and HARQ processes as the maximum payload size.

For example, the maximum payload size can be defined as follows.

The maximum payload size is determined by a combination of the number of configured CC, number of CWs, number of configured CBGs (per carrier), number of HARQ timing candidates (or bundling window slots or minimum of HARQ timing candidates and configured maximum HARQ process number) (when semi-static codebook based HARQ-ACK payload is configured).

For example, it is assumed that if the HARQ-ACK payload size is equal to or greater than X bits, the UE performs rate-matching on UL data in the PUSCH when performing the UCI piggyback and, if the HARQ-ACK payload size is less than X bits, the UE performs puncturing on the UL data in the PUSCH when performing the UCI piggyback. In this case, the value of X may be determined according to one of the following methods.

1] The value of X is set to the maximum HARQ-ACK payload size possible when scheduling for a single PDSCH on a single carrier is received. For example, the value of X may be set to the HARQ-ACK payload size when the number of codewords is set to the maximum value, the number of CBGs (per codeword) is set to the maximum value, and it is indicated that HARQ-ACK is transmitted per CBG.

2] Regarding channel coding, when CRC bits are not added in the case of HARQ-ACK with Y bits or less and when CRC bits are added in the case of HARQ-ACK with Y bits or more, the value of X is set equal to the value of Y.

Alternatively, the eNB may instruct the UE to apply either rate-matching or puncturing on UL data in the PUSCH regardless of UCI payload size when the UE performs the UCI piggyback through a higher layer signal such as UE-dedicated RRC signaling and the like.

Additionally, if the UE is configured to perform rate-matching on UL data in the PUSCH when the HARQ-ACK payload size is equal to or greater than X bits and perform puncturing on the UL data in the PUSCH when the HARQ-ACK payload size is smaller than X bits in order to perform the UCI piggyback for HARQ-ACK, the UE can operate as follows.

<1> Default operation (for example, when the UE performs the UCI piggyback for the HARQ-ACK, if the HARQ-ACK payload size is smaller than X bits, the UE performs PUSCH puncturing)

Here, the default operation can be performed in the following cases:

A case in which any separate higher layer signal is not configured;

A case in which the PUSCH is scheduled through DCI for the fallback operation (in the CSS); and A case in which PUSCH puncturing (for the HARQ-ACK less than X bits) is indicated through a higher layer signal such as RRC signaling (and/or DCI).

<2> When PUSCH rate-matching (for the HARQ-ACK less than X bits) is indicated through a higher layer signal such as RRC signaling (and/or DCI), the UE may perform the PUSCH rate-matching when performing the UCI piggyback for the HARQ-ACK less than X bits.

The above-described fourteenth UCI transmission method can be applied together with other proposed methods of the present invention unless they collide with each other.

3.15. Fifteenth UCI Transmission Method

When the UE performs UCI piggyback on the PUSCH, the UE may differently apply UCI mapping in the time domain according to the (PUSCH) data-to-RE mapping scheme.

(1) A case in which frequency-first mapping is applied to data (e.g., in the case of a CBG based PUSCH where either CP-OFDM or DFT-s-OFDM is used)

A. UCI where puncturing is performed on transmission resources (in terms of PUSCH transmission). The UE performs distributed mapping (for the UCI) in the time domain.

B. UCI where rate-matching is performed on transmission resources (in terms of PUSCH transmission). The UE performs distributed mapping or localized mapping (for the UCI) in the time domain. In this case, the eNB may instruct to perform either the localized mapping or distributed mapping (for the UCI) in the time domain through a higher layer signal (e.g., RRC signaling).

(2) A case in which time-first mapping is applied to data (e.g., DFT-s-OFDM)
  A. Localized mapping is performed (for UCI) in the time domain (e.g., when a front-loaded RS exists, UCI mapping is performed on the symbol adjacent to the corresponding RS).

Specifically, when the frequency-first mapping is applied to data, it may be desirable to apply distributed mapping in the time domain in the case of UCI where puncturing is performed on transmission resources (in terms of PUSCH transmission). If the UCI is transmitted without being distributed in the time domain, since the whole CB (or CBG) is punctured (in terms of the PUSCH transmission), the eNB is highly likely to fail in decoding.

Accordingly, in the case of the UCI where the frequency-first mapping is applied to data and puncturing is performed on transmission resources (in terms of the PUSCH transmission), either localized mapping or distributed mapping may be applied in the time domain. If the localized mapping is applied in the time domain, since UCI mapping is performed on the symbol adjacent to an RS, it is advantageous in terms of channel estimation performance. In addition, if the distributed mapping is applied in the time domain, since preemption is applied to only partial UCI if the preemption is applied to a series of symbols in the time domain, it is advantageous in terms of UCI transmission performance.

Moreover, when the time-first mapping is applied to data, the localized mapping may be applied for the UCI in the time domain regardless of whether rate-matching or puncturing is performed.

The above-described fifteenth UCI transmission method can be applied together with other proposed methods of the present invention unless they collide with each other.

3.16. Sixteenth UCI Transmission Method

The UE can perform UCI piggyback on the PUSCH, which complies with the following transmission scheme.
  (1) PUSCH transmitted without UL grant. For example, there is a SPS (semi-persistent scheduling) PUSCH.
  (2) PUSCH based on UL grant without assistance information for UCI piggyback. For example, there is a PUSCH scheduled by UL grant in the CSS (common search space).

In this case, the UE may perform one of the following operations.
  1) After applying puncturing to UL data in the PUSCH, the UE performs the UCI piggyback.
    A. When the UE receives (and detects) a scheduled PDSCH, the UE transmits only X bits of UCI (or smaller UCI corresponding to the scheduled PDSCH). Alternatively, when the UE receives (and detects) no scheduled PDSCH, the UE does not perform the UCI piggyback.
    B. In this case, if the UCI payload size is greater than X bits, the UE may transmit only the X bits of UCI and drop transmission of the remaining UCI.
  2) After applying rate-matching to the UL data in the PUSCH, the UE performs the UCI piggyback.
    A. When the UE receives (and detects) a scheduled PDSCH, the UE transmits only X bits of UCI (or smaller UCI corresponding to the scheduled PDSCH). When the UE receives (and detects) no scheduled PDSCH, the UE does not perform the UCI piggyback.
    B. In this case, if the UCI payload size is greater than X bits, the UE may transmit only the X bits of UCI and drop transmission of the remaining UCI.
    C. In addition, the UE may transmit, to the eNB, information on whether the rate-matching (or UCI piggyback) is performed and/or information on the amount of UL data to which the rate-matching is applied (or the UCI payload size) according to one of the following methods.
      1> The UE transmits the information on the REs in the PUSCH, which are generated by applying the puncturing (or rate-matching) on the UL data in the PUSCH after performing separate coding thereon aside from the UCI.
      2> The UE transmits the information through a DM-RS by switching a DM-RS sequence depending on the information.
      3> The UE transmits the information through a CRC mask by switching the CRC mask depending on the information.

Specifically, when a UE performs UCI piggyback on a PUSCH, the UE may perform rate-matching on UL data in the PUSCH by considering UCI transmission. In this case, the amount of UL data in the PUSCH where the rate-matching is applied should be determined in advance between the eNB and UE in order to facilitate decoding of the PUSCH where the rate-matching is applied from the perspective of reception at the eNB.

As a method therefor, when the eNB schedules a PUSCH through UL grant, the eNB may inform the UE of whether rate-matching is allowed in the corresponding PUSCH and the amount of UL data to which rate-matching is applied (or information related to the UCI payload size capable of estimating the corresponding data amount).

However, in the case of a PUSCH transmitted without UL grant such as a SPS PUSCH, the eNB cannot transmit to the UE information on the amount of UL data in the PUSCH to which rate-matching will be applied. Thus, in this case, it may be desirable that the UE performs puncturing on the UL data (or REs for UCI transmission) when performing UCI piggyback.

Alternatively, to perform the UCI piggyback on the PUSCH without UL grant, the UE may apply rate-matching to the UL data in the PUSCH. Thereafter, the UE may additionally transmit to the eNB information on whether rate-matching is applied and/or information on the amount of UL data where the rate-matching is applied. In the case of a PUSCH scheduled by UL grant without assistance information for UCI piggyback (e.g., PUSCH scheduled by UL grant in the CSS), the UE may perform the UCI piggyback operation similar to that for the PUSCH without UL grant.

Meanwhile, when the UE performs UCI piggyback on the UL grant based PUSCH (or UL grant based PUSCH with assistance information for UCI piggyback), the UE may perform rate-matching (or puncturing) on UL data in the PUSCH based on the corresponding UL grant (or corresponding assistance information) and then perform the UCI piggyback.

Additionally, the UE can perform the UCI piggyback on the PUSCH, which complies with the following transmission scheme.
  [1] PUSCH transmitted without UL grant. For example, there is a SPS (semi-persistent scheduling) PUSCH.
  [2] PUSCH based on UL grant without assistance information for UCI piggyback. For example, there is a PUSCH scheduled by UL grant in the CSS (common search space).

In this case, the UE may operate as follows.

Specifically, the eNB may inform the UE of the (maximum) UCI (e.g., HARQ-ACK) payload/codebook (size) for rate-matching (or puncturing) of UL data in the PUSCH through a (UE-dedicated) higher layer signal (e.g., RRC signaling) in advance.
- A. In this case, if the UE receives (and detects) a scheduled PDSCH, the UE applies rate-matching (or puncturing) to the UL data in the PUSCH based on the (maximum) HARQ-ACK payload/codebook (size) indicated by the eNB and then performs the UCI piggyback.
- B. Alternatively, if the UE receives (and detects) no scheduled PDSCH, the UE does not perform the UCI piggyback.

In this case, the (maximum) UCI (e.g., HARQ-ACK) payload/codebook (size) configured for the UE by the eNB may be the maximum UCI payload/codebook (size) that can be transmitted on one PUCCH or PUSCH or the value configured for the PUSCH complying with the above-described transmission scheme (e.g., SPS PUSCH) (the value may be smaller than the (maximum) UCI payload/codebook (size)).

In summary, when the UE transmits HARQ-ACK on the SPS PUSCH, the UE may perform the UCI piggyback based on the codebook as follows.
- <1> When the semi-static HARQ-ACK codebook is used
  The UE may apply rate-matching (or puncturing) on UL data in the PUSCH based on the (maximum) HARQ-ACK payload/codebook (size) indicated by the eNB and then perform the UCI piggyback.
- <2> When the dynamic HARQ-ACK codebook is used and DL DCI includes the c-DAI and t-DAI
  The UE may calculate the HARQ-ACK payload size based on the c-DAI and t-DAI, apply rate-matching (or puncturing) on UL data in the PUSCH based on the calculated HARQ-ACK payload size, and then perform the UIC piggyback.
- <3> When the dynamic HARQ-ACK codebook is used and DL DCI includes only the c-DAI
  - 1> Opt. 1: The may calculate the HARQ-ACK payload size using UL DAI in SPS PUSCH activation DCI, apply rate-matching (or puncturing) on UL data in the PUSCH based on the calculated HARQ-ACK payload size, and then perform the UIC piggyback.
  - 2> Opt. 2: The UE may assume the HARQ-ACK payload size configured through a higher layer signal, apply rate-matching (or puncturing) on UL data in the PUSCH based on the assumed HARQ-ACK payload size, and then perform the UIC piggyback.

Additionally, the UE can perform the UCI piggyback on the PUSCH, which complies with the following transmission scheme.
- [1] PUSCH transmitted without UL grant. For example, there is a SPS (semi-persistent scheduling) PUSCH.
- [2] PUSCH based on UL grant without assistance information for UCI piggyback. For example, there is a PUSCH scheduled by UL grant in the CSS (common search space).

In this case, the UE may operate as follows.
Specifically, the eNB may inform the UE of the (maximum) UCI (e.g., HARQ-ACK) payload/codebook (size) for rate-matching of UL data in the PUSCH through a (UE-dedicated) higher layer signal (e.g., RRC signaling) in advance.
- A. When the UE receives (and detects) a scheduled PDSCH,
  - i. if the UCI payload size is equal to or smaller than X bits (e.g., X=2) (from the perspective of the UE), the UE performs the UCI piggyback after applying puncturing to the UL data in the PUSCH
  - ii. if the UCI payload size is greater than X bits (e.g., X=2) (from the perspective of the UE), the UE performs the UCI piggyback after applying rate-matching to the UL data in the PUSCH based on the (maximum) HARQ-ACK payload/codebook (size) indicated by the eNB.
- B. When the UE receives (and detects) no scheduled PDSCH, the UE does not perform the UCI piggyback.

In this case, the (maximum) UCI (e.g., HARQ-ACK) payload/codebook (size) configured for the UE by the eNB may be the maximum UCI payload/codebook (size) that can be transmitted on one PUCCH or PUSCH or the value configured for the PUSCH complying with the above-described transmission scheme (e.g., SPS PUSCH) (the value may be smaller than the (maximum) UCI payload/codebook (size)).

In this configuration, for the UCI piggyback operation on the PUSCH transmitted without UL grant (e.g., SPS PUSCH) or UL grant based PUSCH without assistance information for UCI piggyback (e.g., a PUSCH scheduled by DCI with no DAI field or PUSCH scheduled by UL grant in the CSS), the eNB may inform the UE of the (maximum) UCI (e.g., HARQ-ACK) payload/codebook (size) corresponding to the criteria of PUSCH rate-matching/puncturing through a higher layer signal (e.g., RRC signaling) and/or DCI. At this time, the (maximum) UCI (e.g., HARQ-ACK) payload/codebook (size) can be configured as follows.

Specifically, the (maximum) UCI (e.g., HARQ-ACK) payload/codebook (size) may be set to be proportional to the number of PRBs allocated as PUSCH resources and/or the number OFDM symbols (except OFDM symbols for DM-RS transmission) and/or the MCS (index).

For example, the eNB may configure the (maximum) UCI (e.g., HARQ-ACK) payload/codebook (size) for each combination of the number of PRBs number and/or the number of OFDM symbols (except DM-RS symbols) and/or the MCS (index).

As another example, the eNB may configure the rate Z representing the (maximum) (corresponding) UCI (e.g., HARQ-ACK) payload/codebook (size) in each of (K) REs and calculate the final (maximum) UCI (e.g., HARQ-ACK) payload/codebook (size) by applying the rate Z to the (total) REs in the PUSCH.

As a further example, the eNB may configure the rate Z representing the (maximum) (corresponding) UCI (e.g., HARQ-ACK) payload/codebook (size) in each of (K) code bits and calculate the final (maximum) UCI (e.g., HARQ-ACK) payload/codebook (size) by applying the rate Z to the (total) REs in the PUSCH.

Thereafter, when performing the UCI piggyback, the UE may apply rate-matching or puncturing to the UL data in the PUSCH based on the (maximum) HARQ-ACK payload/codebook (size) indicated by the eNB.

Additionally, when the UE performs UCI piggyback for HARQ-ACK on the SPS PUSCH, the UE may perform rate-matching or puncturing on UL data in the PUSCH by assuming the (maximum) HARQ-ACK payload size, which is preconfigured by the eNB through a higher layer signal, and then map UCI REs (according to the predetermined rule).

Meanwhile, when the UE intends to perform UCI piggyback on the UL grant based PUSCH (or UL grant based PUSCH with assistance information for UCI piggyback), the UE may perform the UCI piggyback after performing rate-matching (or puncturing) on UL data in the PUSCH based on the corresponding UL grant (or corresponding assistance information).

The above-described sixteenth UCI transmission method can be applied together with other proposed methods of the present invention unless they collide with each other.

3.17. Seventeenth UCI Transmission Method

When the eNB informs the UE of the UCI payload size (or the amount of UL data where rate-matching is applied) and the UE performs UCI piggyback after performing rate-matching on UL data in the PUSCH, if UCI bits (in a PUSCH transmission slot) are in excess of the UCI payload size indicated by the eNB (or the amount of UL data where the rate-matching is applied), the UE can transmit the UCI bits corresponding to the excess quantity (hereinafter referred to as $UCI_{new}$) according to one of the following methods.

(1) The UE performs puncturing of some symbol(s) in the PUSCH and transmits the UCINEW on the (short) PUCCH, which is time-division multiplexed with the PUSCH on the symbol(s).

(2) The UE performs HARQ-ACK bundling and performs UCI piggyback for (bundled) HARQ-ACK bits less than the UCI payload size indicated by the eNB (or the amount of UL data where the rate-matching is applied). In this case, the UE may include the amount that exceeds the UCI size among multiple pieces of HARQ-ACK feedback for the at least last received PDSCHs in HARQ-ACK bundling.

In this case, the UCINEW may be HARQ-ACK information on the PDSCH(s) scheduled after UL grant.

In addition, the UCI bits that occur after the time (e.g., slot #n–$k_{MIN}$) prior to the minimum value (e.g., $k_{MIN}$) of the UL grant-to-PUSCH time (or PUSCH processing time) with reference to the PUSCH transmission time (e.g., slot #n) may be excluded from UCI piggyback targets on the PUSCH.

Moreover, HARQ-ACK bundling may mean a process for reducing the total UCI payload size by combining (some) HARQ-ACK bits through the local AND operation.

Specifically, when the UE performs rate-matching on UL data in the PUSCH based on the amount of UCI to be transmitted through the UCI piggyback, the eNB may inform the UE of the payload size of the UCI to be transmitted through the UCI piggyback (or the amount of UL data where the rate-matching is applied) through DCI such as UL grant, etc.

However, in practice, depending on scheduling, there may occur UCI bits in excess of the payload size of the UCI (to be UCI-piggybacked) indicated by the eNB at the time when the UL grant is transmitted (or the amount of UL data where the rate-matching is applied) in the PUSCH transmission slot.

For example, when the NR system where the present invention is applicable supports flexible scheduling timing, it may be indicated that HARQ-ACK bits for the PDSCH(s) scheduled after the UL grant are reported through the PUSCH transmission slot. Accordingly, there may occur HARQ-ACK bits in exceed of the payload size of the UCI (to be UCI-piggybacked) indicate by the eNB through the UL grant in the PUSCH transmission slot.

In this case, the UE may perform puncturing of some symbol(s) in the PUSCH and transmit the excess quantity of the UCI in the punctured symbol(s) on the (short duration) PUCCH. Alternatively, the UE may apply HARQ-ACK bundling on some (or all) UCI bits among all UCI bits (including the excess quantity of the UCI) and performs the UCI piggyback on the PUSCH with respect to (bundled) HARQ-ACK less than the UCI payload size indicated by the eNB.

Additionally, when the UE performs the UCI piggyback on the PUSCH, there may occur UCI bits in excess of the UCI payload size indicated by the eNB (through UL grant) (or the amount of UL data where the rate-matching is applied). In this case, the UE may additionally report, to the eNB, information on whether the excess quantity of the UCI exists and/or information on the amount of the excess quantity of the UCI. For example, the UE may inform whether the HARQ-ACK payload size which the UE intends to transmit is greater or smaller than the HARQ-ACK payload size indicated by the eNB through UL grant (e.g., UL DAI) using 1-bit indicator at all time.

Additionally, when the UE performs the UCI piggyback on the PUSCH, there may occur UCI bits in excess of the UCI payload size indicated by the eNB (through UL grant) (or the amount of UL data where the rate-matching is applied). In this case, after performing ACK/NACK bundling on HARQ-ACK bits, the UE may report, to the eNB, the (bundled) HARQ-ACK bits together with information on whether bundling is performed (e.g., 1-bit indicator). At this time, if the number B of bundled HARQ-ACK bits is smaller than the UCI payload size indicated by the eNB, A, the UE may configure and transmit a total of A bits of the UCI payload size by adding the B bundled HARQ-ACK bits to (A-B) padding bits (e.g., "0" or "1").

The above-described seventeenth UCI transmission method can be applied together with other proposed methods of the present invention unless they collide with each other.

3.18. Eighteenth UCI Transmission Method

When the UE performs UCI piggyback after performing rate-matching on UL data in the PUSCH, the UE can apply scaling to transport block size (TBS) according to the amount of UL data where the rate-matching is performed (or the number of rate-matched REs).

In this case, the eNB may inform the UE of the presence of TBS scaling, which depends on the amount of UL data where the rate-matching is applied (or the number of rate-matched REs), through a specific bit field (e.g., 1-bit indicator) in DCI (e.g., UL grant) or higher layer signal (e.g., RRC signaling).

As a particular example, when the number of HARQ-ACK bits to be UCI-piggybacked significantly increases due to HARQ-ACK feedback per CBG, CA of more than five component carriers, etc., if the UE performs rate-matching on UL data in the PUSCH during the UCI piggyback process for HARQ-ACK, a number of data bits are rate-matched and the performance may be significantly degraded.

Thus, in this case, considering the decreased REs due to the rate-matching, the TBS needs to be set to be smaller. For example, when 1/N REs are rate-matched in the PUSCH, the TBS may be scaled by the ratio of 1-1/N=(N-1)/N. Whether TBS scaling is applied according the UCI piggyback may be indicated by the eNB through UL grant or higher layer signaling.

The above-described eighteenth UCI transmission method can be applied together with other proposed methods of the present invention unless they collide with each other.

3.19. Nineteenth UCI Transmission Method

When the UE performs UCI piggyback on the PUSCH, the eNB can inform the UE of the UCI payload size using one of the following methods.

(1) After configuring a set of UCI payload sizes through a (UE-specific) higher layer signal, the eNB indicates a specific UCI payload size in the set through DCI (e.g., UL grant).
(2) After configuring a (reference) UCI payload size through a (UE-specific) higher layer signal, the eNB indicates the ratio of the UCI payload size, which will be transmitted, to the (reference) UCI payload size through DCI (e.g., UL grant). In this case, the eNB may configure, for the UE, the ratio value through a (UE-specific) higher layer signal as well.

At this time, the eNB may enable a certain state of its indicator to mean the UCI payload size equal to or less than 2 bits (or puncturing on the PUSCH). In this case, the UE may perform UCI mapping after performing puncturing on the PUSCH (according to the UCI payload size recognized by the UE).

In addition, when the UCI payload size (A) recognized by the UE is smaller than the UCI payload size (B) indicated by the eNB, the UE may perform UCI encoding based on the UCI payload size (A) recognized by the UE according to the coding type applied to the UCI payload size (B). Alternatively, the UE may perform UCI encoding based on the UCI payload size (B) indicated by the eNB after filling the remaining bits with NACK information. For example, if the coding type is Reed-Muller (RM) coding, the UE may perform UCI encoding based on the UCI payload size (A). As another example, if the coding type is polar coding, the UE may perform UCI encoding based on the UCI payload size (B).

As a particular example, the eNB may indicate the UCI payload size using a two-bit field in UL grant, which has four states, as shown in Table 13.

TABLE 13

| Bits field | UCI payload size |
|---|---|
| 00 | 2 bits or less |
| 01 | 3 bits |
| 10 | 7 bits |
| 11 | 10 bits |

Alternatively, after setting the (reference) UCI payload size to 10 bits, the eNB may inform the UE of the ratio of the UCI payload, which will be used for UCI piggyback, and the (reference) UCI payload size using a two-bit field in UL grant, which has four states, as shown in Table 14.

TABLE 14

| Bits field | UCI payload size |
|---|---|
| 00 | 2 bits or less |
| 01 | 30% (=3 bits) |
| 10 | 70% (=6 bits) |
| 11 | 100% (=10 bits) |

By doing so, the eNB can indicate the UCI payload size in a more flexible manner, which the UE should consider in performing rate-matching/puncturing on the PUSCH.

The above-described nineteenth UCI transmission method can be applied together with other proposed methods of the present invention unless they collide with each other.

3.20. Twentieth UCI Transmission Method

It is assumed that when the UE performs UCI piggyback, the UE performs puncturing on the PUSCH if the UCI size is equal to or less than N bits, and performs rate-matching on the PUSCH if the UCI size is more than N bits. In this case, if at least one case in option A is satisfied, the UE may perform UCI piggyback with respect to UCI bits in excess of the UCI payload size indicated by the eNB according to option B.

[Option A]
(1) A case in which although the eNB instructs the UE to perform PUSCH puncturing with respect to N-bit UCI, the actual payload size of the UCI to be transmitted is more than N bits
(2) A case in which although the eNB instructs the UE to perform PUSCH rate-matching with respect to M-bit UCI (where M>N), the actual payload size of the UCI to be transmitted is more than N bits

[Option B]
1) The UE divides the excess UCI bits on an N-bit basis, performs separate coding regardless of the indicated UCI payload size, and performs RE mapping (based on PUSCH puncturing) such that coded bits corresponding to each segment portion are mapped to different REs.
2) If there are a plurality of pieces of N-bit UCI (for example, K pieces), the UE may perform piggyback on the PUSCH with respect to L pieces of N-bit UCI (e.g., L=1) among the K pieces of N-bit UCI and drop transmission with respect to the remaining (K-L) pieces of UCI.

Additionally, if the eNB does not provide to the UE any instruction related to PUSCH puncturing or rate-matching (or UCI payload size), the UE may divide UCI bits on an N-bit basis, perform separate coding, and perform RE mapping such that coded bits corresponding to each segment portion are mapped to different REs. In this case, if there are a plurality of pieces of N-bit UCI (for example, K pieces), the UE may perform piggyback on the PUSCH with respect to L pieces of N-bit UCI (e.g., L=2) among the K pieces of N-bit UCI and drop transmission with respect to the remaining (K-L) pieces of UCI.

For example, when the UCI size is equal to or less than 2 bits, the UE may perform UCI piggyback by performing puncturing on the data region in the PUSCH. When the UCI size is more than 3 bits, the UE may perform UCI piggyback by performing rate-matching on the data region in the PUSCH. If there are UCI bits in excess of the UCI payload size indicated by the eNB, the UE may totally exclude the excess UCI bits from performing UCI piggyback. Alternatively, the UE may perform UCI piggyback based on PUSCH puncturing, which can be performed without any instruction from the eNB.

However, considering that the UE can perform puncturing on the data region in the PUSCH only when UCI has a size less than 2 bits, if UCI has a size more than 2 bits, the UE may divide UCI bits in exceed of 2 bits on a 2-bit basis, performs separate coding on the divided UCI bits, and map coded bits corresponding to each segment portion to different REs.

As an extended example of the above operation, when the eNB does not provide to the UE any instruction related to PUSCH rate-matching/puncturing (e.g., fallback DCI), the UE may divide UCI bits on an N-bit basis, perform separate coding, and perform RE mapping such that coded bits corresponding to each segment portion are mapped to different REs.

In the following description, UCI piggyback based on PUSCH rate-matching (or puncturing) may mean that when the UE performs UCI mapping on the PUSCH, the UE applies rate-matching (or puncturing) to UL data in the PUSCH and then transmits UCI on the remaining resource (in the PUSCH).

Additionally, when the UE performs UCI piggyback (for HARQ-ACK), the UE may select either PUSCH rate-matching or PUSCH puncturing and then apply the selected one as follows.

[1] A case in which the eNB indicates PUSCH rate-matching operation (with respect to a specific UCI payload size) or the specific UCI payload size (for example, in excess of N bits) through DCI (e.g., UL grant)

A. The UE performs UCI piggyback based on PUSCH rate-matching according to the UCI payload size (regardless of whether scheduled DL data is present).

B. When the eNB indicate the PUSCH rate-matching operation, the specific UCI payload size (for PUSCH rate-matching) may be determined as the maximum HARQ-ACK payload size configured for the UE or preconfigured by the eNB through a higher layer signal (e.g., RRC signaling).

[2] A case in which the eNB does not indicate the PUSCH rate-matching operation (with respect to the specific payload size) or the specific UCI payload size (for example, in exceed of N bits) or indicates PUSCH puncturing operation A. If there is UCI to be transmitted (due to at least one pieces of scheduled DL data), the UE performs UCI piggyback based on PUSCH puncturing (on UCI bits up to maximum N bits).

B. If there is no UCI to be transmitted (due to no scheduled DL data), the UE does not perform UCI piggyback.

Specifically, the eNB may configure the semi-static codebook (or the HARQ-ACK payload size for UCI piggyback) for the UE through a higher layer signal and inform the UE of whether PUSCH rate-matching is required through a 1-bit indicator (e.g., ON/OFF indicator) in DCI such as UL grant. In this case, if the UE receives the indicator set to 'ON', the UE may perform UCI piggyback after performing PUSCH rate-matching based on the HARQ-ACK payload size preconfigured by the eNB. On the contrary, if the UE receives the indicator set to 'OFF', the UE may perform UCI piggyback by performing PUSCH puncturing (on up to maximum N bits) based on the HARQ-ACK payload size recognized by the UE. Alternatively, if the UE receives the indicator set to 'OFF', the UE may assume that there is no HARQ-ACK to be UCI-piggybacked).

Additionally, the eNB may dynamically inform the UE of the HARQ-ACK payload size (for UCI piggyback) through DCI (e.g., DL assignment, UL grant, etc.) based on the dynamic codebook. In this case, if the UE receives a specific HARQ-ACK payload size from the eNB, the UE may perform PUSCH rate-matching based on the corresponding payload size to perform UCI piggyback. On the other hand, when the eNB does not indicate any specific HARQ-ACK payload size or explicitly indicates PUSCH puncturing, if there are HARQ-ACK bits to be reported, the UE may perform PUSCH puncturing (on the HARQ-ACK bits up to maximum N bits) for UCI piggyback. Further, when the eNB does not indicate any specific HARQ-ACK payload size or explicitly indicates PUSCH puncturing, if there are no HARQ-ACK bits to be reported, the UE may not perform UCI piggyback.

The above-described twentieth UCI transmission method can be applied together with other proposed methods of the present invention unless they collide with each other.

3.21. Twenty-first UCI Transmission Method

When the UE performs UCI piggyback on the PUSCH, the eNB can configure the value of beta corresponding to a design parameter, and the UE can calculate the number of coded symbols for UCI transmission in the PUSCH by reflecting the value of beta. In this case, the eNB may configure the value of beta for the UE according to one of the following methods.

(1) A method in which the eNB configures a single beta value set through a higher layer signal (e.g., RRC signaling) and then indicates a specific beta value in the set through DCI (e.g., UL grant)

(2) A method in which the eNB configures a plurality of beta value sets through a higher layer signal (e.g., RRC signaling), selects a set based on specific conditions, and then indicates a specific beta value in the selected set through DCI (e.g., UL grant)

(3) A method in which the eNB configures a plurality of beta value sets through a higher layer signal (e.g., RRC signaling) and indicates a set through DCI (e.g., UL grant), and a specific beta value is selected from the set based on specific conditions Here, the specific conditions may include the following items.

1) Opt. 1: UCI-related information (e.g., UCI payload size (for example, information indicating whether the UCI payload size is less than, or equal to or more than X bits), coding scheme (for example, information indicating whether RM code (without CRC) or polar code (with CRC) is used), etc.)

2) Opt. 2: PUSCH-related information (e.g., MCS (for example, information indicating whether the MCS index is less than, or equal to or more than X), code rate (for example, information indication whether the code rate is less than, or equal to or more than X), RB allocation (for example, information indicating whether the number of RBs allocated to the PUSCH is less than, or equal to or more than X), duration (for example, information indicating whether the number of allocated OFDM symbols is less than, or equal to or more than X), etc.)

In this case, the value of beta may be configured in different ways according to UCI types. For example, in the case of UCI type 1, the value of beta may be configured through RRC signaling, and in the case of UCI type 2, the value of beta may be configured through DCI (and RRC signaling). In this case, UCI types 1 and 2 may be set to HARQ-ACK and CSI, respectively and vice versa.

In this case, the eNB may configure a single set including a beta value(s) as an element for two or more UCI types and indicate a specific beta value(s) in the set through DCI (e.g., UL grant).

Such a beta value may be independently configured according to the PUSCH waveform and/or whether rate-matching or puncturing is performed on the PUSCH.

Moreover, the beta offset value configured for a PUSCH scheduled by UL grant in the common search space (CSS) may be independent from that configured for a PUSCH scheduled by UL grant in the UE-specific search space (USS). In this case, the eNB may configure a semi-static beta offset value for the former PUSCH through RRC signaling and configure a dynamic beta offset value for the latter PUSCH through DCI signaling.

More specifically, when the UE calculates the number of UCI transmission REs in the PUSCH, the eNB may configure the value of betta corresponding to the design parameter in order of adjust the coding rate and the like. In addition, the UE may calculate the number of coded symbols for UCI transmission by reflecting the beta value. In this case, since every PUSCH transmission interval can be dynamically changed in the NR system to which the present invention is applicable, it is desirable to dynamically configure the value of beta based on the amount of actual PUSCH resources For example, the eNB may configure a single beta value set through a higher layer signal and then dynamically inform the UE of a specific beta value in the set through DCI.

In this case, the range of the beta value may differ according to the UCI payload size. That is, when the UCI payload size is small (for example, when the UCI payload size is equal to less than X bits), there are sufficient coded symbols for UCI transmission in UCI PUSCH resources. On the other hand, when the UCI payload size is large (for example, when the UCI payload size is more than X bits), the number of coded symbols for UCI transmission among UCI PUSCH resources may be minimized because in this case, UCI may have a great effect on data in the PUSCH. To this end, the eNB may configure a plurality of beta value sets, select a specific set based on the UCI payload size, and then indicate a specific beta value in the set through DCI (e.g., UL grant).

The above-described configuration can be generalized as follows. The eNB may configure a plurality of beta value sets. Thereafter, the eNB may select a specific beta value from among beta values included in the plurality of sets according to any combination of specific conditions and indications in DCI.

Additionally, in the present invention, the beta offset value may mean the value for calculating the number of resource elements (REs) (coded symbols or OFDM resources) used for transmitting (specific) UCI on a (specific) PUSCH. For example, when the eNB configures a large beta offset value, the number of UCI transmission REs in the PUSCH may be relatively increased. In contrast, when the eNB configures a small beta offset value, the number of UCI transmission REs in the PUSCH may be relatively decreased.

Additionally, the eNB may configure a plurality of beta offset sets (regarding a specific UCI type) (through a higher layer signal such as system information or RRC signaling), and the UE may select one beta offset set from among the plurality of beta offset sets based on at least one piece of the following (when performing UCI piggyback).

[1] The number of codewords (e.g., whether the number of codewords is one or two)

[2] UCI payload size (e.g., the range of the UCI payload size)

[3] PUSCH waveform (e.g., whether the PUSCH waveform is CP-OFDM or DFT-s-OFDM)

[4] The amount of resources allocated to the PUSCH (e.g., the amount of time/frequency resources)

[5] Whether rate-matching or puncturing is applied to the PUSCH

[6] Coding scheme (e.g., whether the RM code or polar code is applied)

[7] PUSCH modulation order (e.g., whether BPSK is applied)

Thereafter, the eNB may additionally inform the UE of a specific beta offset value in the selected beta offset set through DCI (e.g., UL grant).

As a modification example, the eNB may independently configure a plurality of beta offset sets in each combination of at least one of the following conditions (regarding a specific UCI type) (through a higher layer signal such as system information or RRC signaling), and the UE may select the beta offset set suitable for its condition(s) (when performing UCI piggyback).

1] The number of codewords (e.g., whether the number of codewords is one or two)

2] UCI payload size (e.g., the range of the UCI payload size)

3] PUSCH waveform (e.g., whether the PUSCH waveform is CP-OFDM or DFT-s-OFDM)

4] The amount of resources allocated to the PUSCH (e.g., the amount of time/frequency resources)

5] Whether rate-matching or puncturing is applied to the PUSCH

6] Coding scheme (e.g., whether the RM code or polar code is applied)

7] PUSCH modulation order (e.g., whether BPSK is applied)

Thereafter, the eNB may additionally inform the UE of a specific beta offset value in the selected beta offset set through DCI (e.g., UL grant).

According to the present invention, although the UE is configured to apply the CP-OFDM waveform (or waveform type A) to the normal PUSCH, the UE can assume that the DFS-s-OFDM waveform (or waveform type B #A) is applied to the PUSCH scheduled by specific DCI (or DCI type) (indicating the fallback operation) or other PUSCHs related to the fallback operation. In this case, the UE may differently select the beta offset value (or beta offset set) to be applied (when the UE performs UCI piggyback) (regarding a specific UCI type) according to the PUSCH waveform (or PUSCH scheduling DCI type). In particular, when the PUSCH related to the fallback operation is transmitted, the UE may apply the default beta offset (or default beta offset step) configured through the system information (e.g., PBCH, SIB, RMSI, etc.). In this case, the fallback operation may mean the basic transmission scheme that can be supported by the UE (without any separate specific information).

In the present invention, a (specific) beta offset value corresponding to an element of the beta offset set could be interpreted to mean a combination of (specific) beta offset values regarding a (specific) UCI type. For example, when there are N UCI types (e.g., UCI1, UCI2, UCI3, . . . , UCIN), The above-described twenty-first UCI transmission method can be applied together with other proposed methods of the present invention unless they collide with each other.

3.22. Twenty-Second UCI Transmission Method

In the following description, it is assumed that a counter DAI (downlink assignment indicator) in DL scheduling DCI (downlink control information) (hereinafter referred to DL assignment) means information indicating scheduling order of PDSCHs (TBs or CBGs (code block groups)) (scheduled by the DL assignment) and a total DAI (in DL assignment or UL scheduling DCI (hereinafter referred to UL grant)) means information indicating the (total) number of PDSCHs (TBs or CBGs) scheduled until a specific time.

When the UE transmits the PUSCH in the $(n+k_0)^{th}$ slot based on the UL grant received in the $n^{th}$ slot, the UE may calculate the HARQ-ACK payload size based on the counter DAI which is detected (or observed) in the $(n+k_0-k_1)^{th}$ slot and the total DAI (indicated by the UL grant) and then transmit HARQ-ACK on the PUSCH. In this case, $k_0$, and $k_1$ are integers equal to or greater than zero and satisfy the condition of $k_0 \geq k_1$.

In addition, the value of $k_1$ (or $k_2=k_0-k_1$) may be determined according to one of the following methods.
(1) The predetermined value
(2) The value configured by the eNB through a higher layer signal (e.g., RRC signaling) and/or DCI
(3) The value corresponding to the (minimum) UL grant-to-PUSCH timing: for example, if the UE complies with the (minimum) UL grant-to-PUSCH timing, the UE may transmit the PUSCH in the $(n+k1)^{th}$ slot based on the UL grant received in the $n^{th}$ slot.
(4) The value corresponding to the (minimum) UE processing time for (PUSCH transmission)
(5) The value obtained by adding the UE processing time for UCI encoding to the value in (3) or (4)

In this case, the UE may interpret that the total DAI (indicated by the UL grant) corresponds to the (total) number of PDSCHs scheduled until the $(n+k_0-k_1)^{th}$ slot In addition, the UE may exclude HARQ-ACK for the PDSCH(s) received after the time (e.g., $((n+m0)^{th}$ slot) prior to the (minimum) UL grant-to-PUSCH timing (or (minimum) PUSCH processing time (e.g., m0) with reference to the PUSCH transmission time (e.g., $n^{th}$ slot) from UCI piggyback targets.

Specifically, as part of the UCI piggyback operation, the UE may transmit HARQ-ACK information on one or more PDSCHs on a specific PUSCH. According to the legacy LTE system, the UE has calculated the HARQ-ACK payload size based on the counter DAI values observed by the UE until reception of UL grant and to total DAI indicated by the UL grant. However, according to the NR system to which the present invention is applicable, the eNB can configure a plurality of UL grant-to-PUSCH timing values for the UE through a higher layer signal such as RRC signaling, and then instruct to apply a specific UL grant-to-PUSCH timing value among the plurality of UL grant-to-PUSCH timing values through DCI.

In this case, the UE may need to transmit HARQ-ACK information on PDSCHs received after reception of UL grant on the PUSCH scheduled by the UL grant. To this end, the UE should observe the counter DAI until receiving the PDSCHs corresponding to potential HARQ-ACK reporting targets rather than the reception of the UL grant. In this case, the time duration for which the UE observes the counter DAI (after the UL grant) should guarantee the minimum UL grant-to-PUSCH timing. For example, the UE may observe the counter DAI starting from the PUSCH transmission time to the time calculated by adding the minimum UL grant-to-PUSCH timing. In this case, the UE may interpret that the total DAI (indicated by the UL grant) indicates the (total) number of PDSCHs scheduled until the counter DAI is observed.

Additionally, when the counter DAI and total DAI respectively represent specific counters by using X states sequentially and repeatedly (that is, when the $n^{th}$ element of the sequence where X states are sequentially repeated matches one by one with the $n^{th}$ count value of the counter having N count units), the counters represented by the counter DAI and total DAI may be configured to have different count units (e.g., the value of N). The count unit of the counter represented by each of the counter DAI and total DAI may be determined between the eNB and UE in advance or configured by the eNB through a higher layer signal (e.g., RRC signaling) and/or DCI. For example, the counter DAI may represent a counter increased by one as shown in Table 15 below, whereas the total DAI may represent a counter increased by two as shown in Table 16 below.

TABLE 15

| counter DAI | Scheduling order of PDSCH (or TB of CBG) |
|---|---|
| 0 | 1, 5, . . . |
| 1 | 2, 6, . . . |
| 2 | 3, 7, . . . |
| 3 | 4, 8, . . . |

TABLE 16

| total DAI | # of PDSCH (or TB or CBG) |
|---|---|
| 0 | 2, 10, . . . |
| 1 | 4, 12, . . . |
| 2 | 6, 14, . . . |
| 3 | 8, 16, . . . |

The above-described twenty-second UCI transmission method can be applied together with other proposed methods of the present invention unless they collide with each other.

3.23. Twenty-Third UCI Transmission Method

When the UE transmits HARQ-ACK and CSI on the PUSCH, the same RE mapping rule (e.g., frequency-first mapping) can be applied for the HARQ-ACK and CSI. In this case, the UE can perform RE mapping for the HARQ-ACK and UCI as follows.
 (1) When the UE performs rate-matching on the PUSCH for HARQ-ACK transmission
  A. The UE performs RE mapping for the HARQ-ACK first and then performs RE mapping for the CSI (starting at the next RE in the order defined in the RE mapping rule).
 (2) When the UE performs puncturing on the PUSCH for HARQ-ACK transmission
  A. The UE skips (first) N REs (in the order defined in the RE mapping rule) and performs RE mapping for the CSI (starting at the $(N+1)^{th}$ RE).
   i. The UE may use the N REs for data transmission.
   ii. If there is HARQ-ACK to be transmitted to the eNB, the UE may perform the RE mapping for the HARQ-ACK (based on PUSCH puncturing) (starting at the first RE in the order in the RE mapping rule). In this case, the actual number of REs used for HARQ-ACK transmission may not be N.
  B. The value of N may be calculated according to the method predetermined between the eNB and UE or the value configured by the eNB through a higher layer signal (e.g., RRC signaling) and/or DCI.

For example, it is assumed that for both the HARQ-ACK and CSI, the UE performs the RE mapping in a frequency-first manner starting at the symbol next to a PUSCH DM-RS symbol. In this case, if the UE performs rate-matching on the PUSCH for the HARQ-ACK transmission, the eNB should separately transmit information on the HARQ-ACK payload size to the UE. Accordingly, the UE may perform the RE mapping for the HARQ-ACK and then perform the RE mapping for the CSI.

Figure 39:
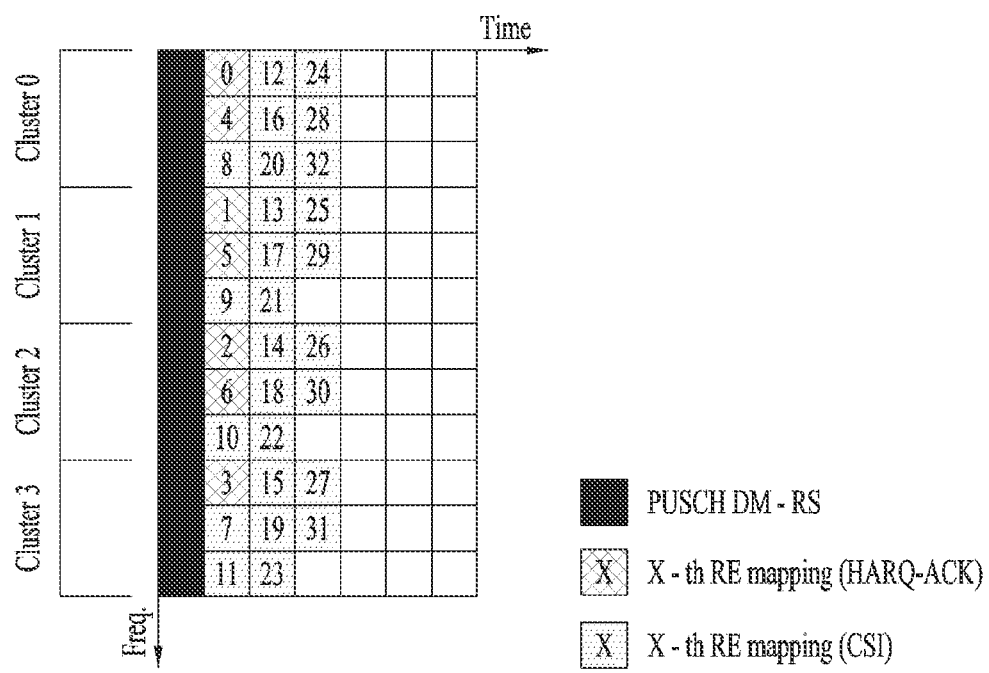
FIG. 39 is a diagram schematically illustrating the configuration of performing RE mapping for HARQ-ACK on first 7 REs and then performing RE mapping for CSI on next 25 REs.

FIG. 39 is a diagram schematically illustrating the configuration of performing RE mapping for HARQ-ACK on first 7 REs and then performing RE mapping for CSI on next 25 REs.

Meanwhile, if the UE performs puncturing on the PUSCH for the HARQ-ACK transmission, the eNB may not need to transmit the HARQ-ACK payload size information. Accordingly, when performing the RE mapping for the CSI, the UE may keep the first N REs empty in accordance with the RE mapping rule by considering the HARQ-ACK transmission.

In this case, the value of N may be calculated from the maximum HARQ-ACK payload size that can be transmitted when puncturing is performed on PUSCH.

Figure 40:
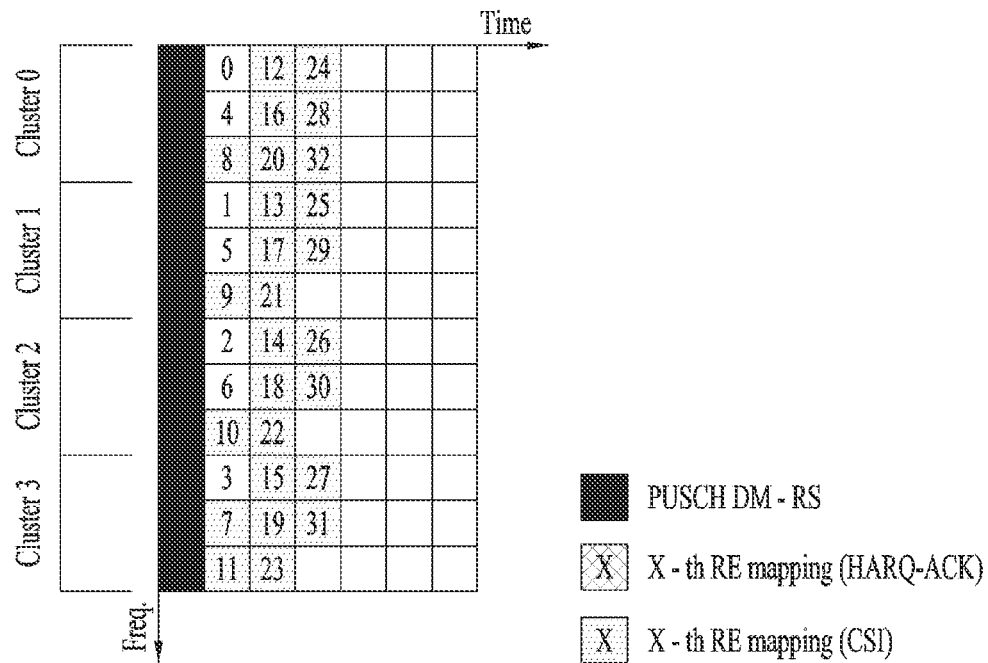
FIG. 40 is a diagram schematically illustrating the operation where a UE keeps front REs empty in consideration of HARQ-ACK transmission resources before performing RE mapping for CSI.
Figure 40:
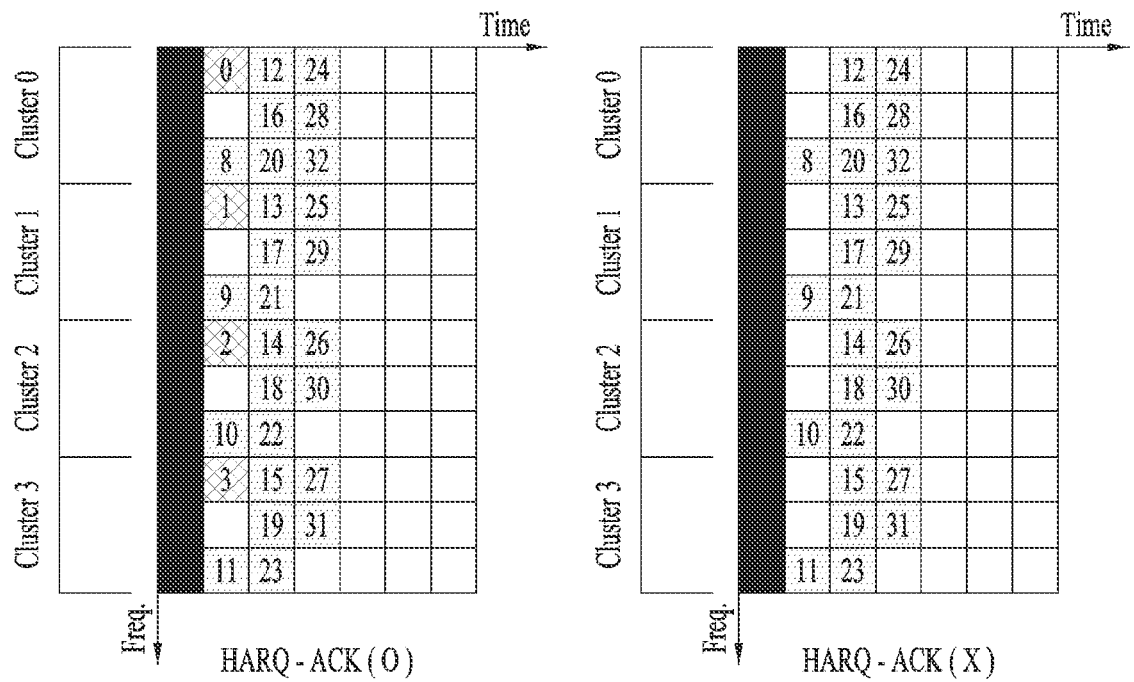

FIG. 40 is a diagram schematically illustrating the operation where a UE keeps front REs empty in consideration of HARQ-ACK transmission resources before performing RE mapping for CSI.

As shown in FIG. 40, the UE can perform data-to-RE mapping on the empty REs. Then, if there is HARQ-ACK (to be reported), the UE may transmit the HARQ-ACK by puncturing data as shown in the left side of FIG. 40. On the other hand, if there is no HARQ-ACK (to be reported), the UE may not perform HARQ-ACK transmission.

In the following description, an RE mapping rule related to specific UCI may mean the positions of REs to which coded bits (or coded symbols) of the corresponding UCI are allocated and the allocation order thereof. Regarding the UCI-to-RE mapping rule, if the $k_1^{th}$ RE(s) is not available, the UE may skip the corresponding RE(s) and then reinitiate the coded bits (or coded symbols) to RE mapping process at the next RE (e.g., $k_1+1$).

Additionally, when the UE transmits HARQ-ACK and CSI on the PUSCH, the same RE mapping rule or different RE mapping rules (e.g., distributed REs in time and localized REs in time) may be applied to the HARQ-ACK and CSI. In this case, the UE can perform RE mapping for the HARQ-ACK and UCI as follows.

1) The UE assumes the HARQ-ACK payload size to be X bits.
   A. When the UE performs rate-matching on the PUSCH for HARQ-ACK transmission, the value of X may be transmitted from the eNB to the UE through DCI and/or a higher layer signal.
   B. When the UE performs puncturing on the PUSCH for HARQ-ACK transmission, the value of X may be determined in advance or transmitted from the eNB to the UE through DCI and/or a higher layer signal. In this case, the actual number of HARQ-ACK bits may be different from the value of X.
2) The UE calculates the number of REs to which the HARQ-ACK is allocated and positions thereof based on the value of X and the RE mapping rule for HARQ-ACK.
3) The UE calculates the number of REs to which CSI will be allocated (among the remaining REs except the calculated HARQ-ACK REs) and positions thereof based on the CSI payload size and the RE mapping rule for CSI. In this case, if the (calculated) HARQ-ACK RE is allocated as the $k^{th}$ RE (in UCI mapping order), the UE may skip CSI mapping at the corresponding RE and attempt the CSI mapping at the $(k+1)^{th}$ RE (in the CSI mapping order).
4) In the case of 1)-A (that is, when the UE performs rate-matching on the PUSCH for the HARQ-ACK transmission), the UE calculates the number and positions of REs to which data is allocated (among the remaining REs except the calculated HARQ-ACK REs and CSI REs) based on the PUSCH data payload size and data-to-RE mapping rule. In this case, if the (calculated) HARQ-ACK RE or CSI RE is allocated as the $k^{th}$ RE (in data mapping order), the UE may skip data mapping at the corresponding RE and attempt the data mapping at the $(k+1)^{th}$ RE (in the data mapping order).
5) In the case of 1)-B (that is, when the UE performs puncturing on the PUSCH for the HARQ-ACK transmission), the UE calculates the number and positions of REs to which data is allocated (among the remaining REs except the calculated CSI REs) based on the PUSCH data payload size and data-to-RE mapping rule. In this case, if the (calculated) CSI RE is allocated as the $k^{th}$ RE (in data mapping order), the UE may skip data mapping at the corresponding RE and attempt the data mapping at the $(k+1)^{th}$ RE (in the data mapping order).
6) Thereafter, the UE generates coded bits according to the calculated number of REs for the HARQ-ACK, CSI, or data and then perform transmission at the calculated RE positions.

In this case, if the UE respectively calculates REs capable of transmitting the HARQ-ACK and REs capable of transmitting the CSI based on the RE mapping rule for HARQ-ACK and the RE mapping rule for CSI (without excluding a specific RE(s) in advance), the REs capable of transmitting the HARQ-ACK may partially overlap with the REs capable of transmitting (in the time/frequency domain).

In the following description, DCI format 0_0 means a DCI format corresponding to fallback DCI among DCI formats in UL grant that schedules the PUSCH, and DCI format 0_1 means a DCI format corresponding to non-fallback DCI among DCI formats in UL grant that schedules the PUSCH. However, if UL grant is fallback DCI, UL DAI information may not be included in the UL grant.

Moreover, a counter DAI may indicate the number of PDSCHs (TBs or HARQ-ACK bits) accumulated until corresponding DL assignment, and a UL DAI may indicate the total number of PDSCHs (TBs or HARQ-ACK bits) to be UCI-piggybacked on the PUSCH.

Furthermore, a semi-static HARQ-ACK codebook may mean a case where HARQ-ACK payload size to be reported by a UE is semi-statically configured through a (UE-specific) higher layer signal, and a dynamic HARQ-ACK codebook may mean a case where HARQ-ACK payload size to be reported by a UE can be dynamically changed through DCI and the like.

Further, a beta offset value may mean a design parameter used for calculating the number of REs (or modulation symbols) capable of transmitting specific UCI when the specific UCI is UCI-piggybacked on a PUSCH. Thus, an eNB can inform a UE of the beta offset value through a (UE-specific) higher layer signal and/or DCI. For example, the beta offset value may mean the ratio of a coding rate (c_1) for data and a coding rate (c_2) for UCI.

Additionally, floor(X) means rounding down X, and ceil (X) means rounding up X.

Additionally, when the UE transmits HARQ-ACK and CSI through UCI piggyback, the same RE mapping rule or different RE mapping rules may be applied to the HARQ-ACK and CSI. In this case, the UE may perform RE mapping for the HARQ-ACK and UCI as follows.

[1] The UE assumes the HARQ-ACK payload size to be X bits. When the UE performs rate-matching on the PUSCH for the HARQ-ACK transmission (or when the HARQ-ACK bits are more than 2 bits) or when the UE performs puncturing on the PUSCH for the HARQ-ACK transmission (or when the HARQ-ACK bits are equal to or less than 2 bits), the value of X may be determined according to one of the following options.
   i. Opt. 1: The value of X is configured for the UE by the eNB through a (UE-specific) higher layer signal. For example, option 1 may be applied when there is no UL DAI in UL grant (e.g., fallback DCI) and a semi-static HARQ-ACK codebook is configured.

ii. Opt. 2: The value of X is determined based on a counter DAI in DL assignment transmitted from the eNB to the UE. For example, option 2 may be applied when there is no UL DAI in UL grant (e.g., fallback DCI) and a dynamic HARQ-ACK codebook is configured.

iii. Opt. 3: The value of X is configured for the UE by the eNB through a (UE-specific) higher layer signal and/or calculated based on a UL DAI in UL grant. For example, option 3 may be applied when a UL DAI is present in UL grant (e.g., non-fallback DCI) and a semi-static HARQ-ACK codebook is configured.

iv. Opt 4: The value of X is calculated based on a counter DAI in DL assignment transmitted from the eNB to the UE and/or a UL DAI in UL grant. For example, option 4 may be applied when a UL DAI is present in UL grant (e.g., non-fallback DCI) and a dynamic-static HARQ-ACK codebook is configured.

v. Opt. 5: The value of X is predetermined between the eNB and UE. For example, option 5 may be applied when a UL DAI is present in UL grant (e.g., non-fallback DCI) and the type of HARQ-ACK codebook is not configured through a (UE-specific) higher layer signal or when puncturing is performed on the PUSCH for the HARQ-ACK transmission (that is, when the HARQ-ACK bits are equal to or less than 2 bits).

vi. In this case, the value of X may be different from the HARQ-ACK bit number.

vii. In addition, the UE may selectively apply one of options 1 to 5 according to whether a UL DAI is present in UL grant and/or based on the HARQ-ACK codebook type (e.g., semi-static or dynamic HARQ-ACK codebook) as described in the above examples.

[2] The UE calculates the number of REs (reserved) for the HARQ-ACK transmission. In this case, the UE may calculated the number of HARQ-ACK REs according to one of the following options.

i. Opt. 1: The UE calculates the number of REs based on the beta offset value predetermined between the eNB and UE (or configured through a higher layer signal) and the value of X corresponding to the number of HARQ-ACK bits. For example, option 1 may be applied when there is no beta-offset indicator in UL grant.

ii. Opt. 2: The UE calculates the number of REs based on the beta offset value calculated from a (UE-specific) higher layer signal and/or DCI (e.g., UL grant) and the value of X corresponding to the number of HARQ-ACK bits. For example, option 2 may be applied when a beta offset indicator is present in UL grant (e.g., non-fallback DCI).

iii. In this case, the UE may selectively apply one of options 1 and 2 depending on whether there is a beta offset indicator in UL grant.

[3] The UE calculates the positions of the REs (reserved) for the HARQ-ACK transmission (hereinafter this RE is referred to as the HARQ-ACK RE) based on the calculated number of (reserved) REs according to the RE mapping rule for HARQ-ACK.

A. In this case, the HARQ-ACK RE positions may be determined in the same manner regardless of whether the UE performs either rate-matching or puncturing on the PUSCH for the HARQ-ACK transmission.

B. For example, the UE may calculate the positions of the (reserved) HARQ-ACK REs as follows.

i. When frequency hopping is applied to the PUSCH, if the total number of HARQ-ACK modulation symbols is N, the UE transmits floor(N/2) symbols via the first frequency hop and the remaining ceil(N/2) symbols via the second frequency hop.

A. In this case, the same RE mapping rule may be applied to each frequency hop.

B. In addition, regarding coded UCI bits, the UE may divide all code UCI bits with respect to the two frequency hops (based on granularity of transmittable coded bits per RE) and map the divided coded UCI bits to REs in each frequency hop.

ii. In the time domain, the RE mapping can be performed (per frequency hop) as follows. For example, the UE performs UCI mapping on UCI mapping-available subcarriers in the same OFDD symbol and then performs the RE mapping on the next symbol according to the frequency-first time-second mapping scheme.

iii. In the frequency domain, the RE mapping can be performed (per OFDM symbol) according to one of the following methods.

1. Hereinafter, the following definitions are used.

A. M(k): The number of REs available for RE mapping for HARQ-ACK in the kV OFDM symbol (or the number of transmittable coded bits)

B. N(k): The number of HARQ-ACK modulation symbols remaining without being used for RE mapping before the $k^{th}$ OFDM symbol 2. Opt. 1: When the UE intends to perform the RE mapping on the $k^{th}$ OFDM symbol with respect to a specific type of UCI, the UE may perform the RE mapping in a distributed manner such that HARQ-ACK modulation symbols are spaced from each other by a predetermined (frequency-domain) length d between adjacent REs (among REs available for the HARQ-ACK transmission in the corresponding symbol)

$$d = \text{floor}(M(k)/N(k)) \quad \text{[Equation 6]}$$

2. Opt. 2: When the UE intends to perform the RE mapping on the $k^{th}$ OFDM symbol with respect to a specific type of UCI, the UE may perform the RE mapping such that the $n^{th}$ allocated modulation symbol (e.g., n=0, 1, ..., N(k)) allocated to the corresponding OFDM symbol among HARQ-ACK modulation symbols is mapped to a (virtual) RE index, p(n) (among REs available for the HARQ-ACK transmission in the corresponding symbol).

$$p(n) = \text{floor}(n*M(k)/N(k)) (\text{or ceil}(n*M(k)/N(k))) \quad \text{[Equation 7]}$$

[4] The UE calculates the number and positions of REs for CSI transmission (hereinafter this RE is referred to as the CSI RE) (among the remaining REs except the calculated HARQ-ACK REs) based on the CSI payload size and RE mapping rule for CSI.

A. If the (calculated) HARQ-ACK RE is allocated as the $k^{th}$ RE (in UCI mapping order), the UE may skip CSI mapping at the corresponding RE and attempt the CSI mapping at the $(k+1)^{th}$ RE (in the UCI mapping order).

B. When the UE performs rate-matching on the PUSCH for the HARQ-ACK transmission (or when the HARQ-ACK bits are more than 2 bits), the UE may perform CSI mapping by assuming that there is no RE (reserved) for the HARQ-ACK transmission (or not valid)

i. Case 1: A case in which there is no UL-SCH transmission on the PUSCH (i.e., in the case of a UCI-only PUSCH). For example, in the case of a PUSCH with UL-SCH, the UE may calculate the REs (reserved) for the HARQ-ACK transmission and then perform RE mapping without using the corresponding REs during the CSI mapping process. Alternatively, in the case of a PUSCH without UL-SCH, the UE may perform CSI mapping by assuming that there is no RE (reserved) for the HARQ-ACK transmission.
  ii. Case 2: A case in which there is no UL-SCH transmission on the PUSCH and on CSI part (e.g., CSI part 2) to be transmitted on the PUSCH (i.e., in the case of a UCI-only PUSCH). For example, in the case of a PUSCH without UL-SCH, if the UE intends to transmits only HARQ-ACK and CIS part 1 through the UCI piggyback on the PUSCH, the UE may perform RE mapping by assuming that there is no RE (reserved) for the HARQ-ACK transmission (or not valid) to perform mapping of CSI part 1. Alternatively, when the UE intends to transmit HARQ-ACK, CSI part 1, and CSI part 2 through the UCI piggyback on the PUSCH, the UE may not use the REs (reserved) for the HARQ-ACK transmission while mapping CSI part 1.
  iii. Case 3: A case in which DCI (e.g., UL grant) (and/or a higher layer signal) indicates that there is no HARQ-ACK (to be UCI-piggybacked).
  C. When the UE performs puncturing on the PUSCH for the HARQ-ACK transmission (or when the HARQ-ACK bits are equal to or less than 2 bits), there may be no HARQ-ACK bits to be transmitted although the (reserved) REs for the HARQ-ACK transmission are present. In this case, the UE may fill HARQ-ACK modulation symbols in the (reserved) HARQ-ACK REs by setting the HARQ-ACK payload corresponding to the (reserved) REs for the HARQ-ACK transmission to all NACK.
[5] When the UE performs rate-matching on the PUSCH for the HACK-ACK transmission (or when the HARQ-ACK bits are more than 2 bits), the UE calculates the number of positions of REs to which data is allocated (among the remaining REs except the calculated HARQ-ACK REs and CSI REs) based on the PUSCH data payload size and data-to-RE mapping rule. In this case, if the (calculated) HARQ-ACK RE or CSI RE is allocated as the $k^{th}$ RE (in data mapping order), the UE may skip data mapping at the corresponding RE and attempt the data mapping at the $(k+1)^{th}$ RE (in the data mapping order).
[6] When the UE performs puncturing on the PUSCH for the HARQ-ACK transmission (or when the HARQ-ACK bits are equal to or less than 2 bits), the UE calculates the number and positions of REs to which data is allocated (among the remaining REs except the calculated CSI REs) based on the PUSCH data payload size and data-to-RE mapping rule. In this case, if the (calculated) CSI RE is allocated as the kV RE (in data mapping order), the UE may skip data mapping at the corresponding RE and attempt the data mapping at the $(k+1)^{th}$ RE (in the data mapping order).
[7] Thereafter, the UE generates coded bits according to the calculated number of REs for the HARQ-ACK, CSI, or data and then perform transmission at the calculated RE positions.
In this case, if the UE respectively calculates REs capable of transmitting the HARQ-ACK and REs capable of transmitting the CSI based on the RE mapping rule for HARQ-ACK and the RE mapping rule for CSI (without excluding a specific RE(s) in advance), the REs capable of transmitting the HARQ-ACK may partially overlap with the REs capable of transmitting (in the time/frequency domain).

In addition, when puncturing is performed on the PUSCH for the HARQ-ACK transmission (or when the HARQ-ACK bits are equal to or less than 2 bits), the CSI may be divided into CSI part 1 and CSI part 2. In the case of CSI part 1, the method for performing the CSI mapping with respect to the (reserved) HARQ-ACK REs, which has been described in [4], may be applied. However, in the case of CSI part 2, the (reserved) HARQ-ACK REs may not be reflected in the CSI mapping (that is, in the case of CSI part 2, it is possible to assume that there is no (reserved) RE for HARQ-ACK transmission).

In addition, when the UE performs the UCI piggyback, RE indexing that applies the UCI-to-RE mapping rule may match with RE indexing of virtual resource blocks (VRBs) allocated to the PUSCH. That is, the UCI-to-RE mapping rule may be defined in the VRB region allocated to the PUSCH. The positions of UCI REs that are actually and physically allocated later may vary according to VRB-to-PRB (physical resource block) mapping. For example, the UE may perform UCI RE mapping on the VRBs allocated to the PUSCH, and then apply interleaving on UCI REs and data REs during a VRB-to-PRB mapping process.

Additionally, when the UE transmits HARQ-ACK through the UCI piggyback on the PUSCH, the UE may determine the HARQ-ACK payload size (or HARQ-ACK codebook size) (that the UE should report) as follows.

When the semi-static HARQ-ACK codebook is configured for the UE, if the UL DAI value (in UL gran) is set to 0, it may mean that the HARQ-ACK bits are less than 2 bits (that is, HARQ-ACK bits may be one of 0, 1, and 2). On the other hand, if the UL DAI value is set to 1, it may mean that the number of HARQ-ACK bits is as large as the semi-static HARQ-ACK codebook size.

The following detailed configuration may be used to calculate the number of HARQ-ACK bits, which is required to be determine the number of (reserved) REs for the HARQ-ACK transmission.
  1] When the HARQ-ACK codebook is a semi-static codebook
    A. In the case of 1-bit UL DAI=bit '0'
      i. Opt. 1: The UE transmits HARQ-ACK equal to or less than 2 bits corresponding to the scheduled PDSCH through the UCI piggyback on the PUSCH after performing puncturing on the PUSCH.
        1. In this case, the UE may assume the maximum HARQ-ACK payload size to be 2 bits.
        2. In addition, the (entire) HARQ-ACK bits may be configured such that as the component carrier (CC) index decreases and in the case of the same CC index, as the slot index becomes lower, the HARQ-ACK bits are arranged forward (or backward) (on a bit sequence).
      ii. Opt. 2: The UE assumes 2-bit HARQ-ACK at all times regardless of the presence of the scheduled PDSCH. Thereafter, the UE transmits the HARQ-ACK through the UCI piggyback on the PUSCH after performing puncturing on the PUSCH. In this case, if there is no received PDSCH, the HARQ-ACK bit may be considered as NACK.
    B. In the case of 1-bit UL DAI=bit '1'
      i. The UE transmits HARQ-ACK corresponding to the (configured) maximum HARQ-ACK payload size through the UCI piggyback on the PUSCH.
        1. The (entire) HARQ-ACK bits may be configured such that as the component carrier (CC) index decreases and in the case of the same CC index, as the slot index becomes lower, the HARQ-ACK bits are arranged forward (or backward) (on a bit sequence) (CC-first slot-second manner).

2. If the (configured) maximum HARQ-ACK payload size is equal to or less than 2 bits, the UE may perform the UCI piggyback by performing puncturing on the PUSCH. On the contrary, if the maximum HARQ-ACK payload size is more than 2 bits, the UE may perform the UCI piggyback by performing rate-matching on the PUSCH. Alternatively, the UE may perform the UCI piggyback by performing rate-matching on the PUSCH at all times (regardless of the maximum HARQ-ACK payload size).

C. In the case of an SPS PUSCH, the UE operates in the same way as in the case of 1-bit UL DAI=0. In this case, the UE may assume 2-bit HARQ-ACK at all times regardless of the presence of the scheduled PDSCH.

D. If the PUSCH is scheduled by DCI format 00, the UE operates in the same way as in the case of 1-bit UL DAI=1.

2] When the HARQ-ACK codebook is a dynamic codebook

A. In the case of 2-bit UL DAI<=(total) 2 (that is, when the UL DAI indicates that the HARQ-ACK bits are equal to or less than 2 bits)
i. The UE transmits HARQ-ACK equal to or less than 2 bits corresponding to the UL DAI through the UCI piggyback on the PUSCH after performing puncturing on the PUSCH. In this case, the (entire) HARQ-ACK bits may be configured in ascending (or descending) order (on a bit sequence) according to counter-DAI value order.

B. In the case of 2-bit UL DAI>(total) 2 (that is, when the UL DAI indicates that the HARQ-ACK bits are more than 2 bits)
i. The UE transmits HARQ-ACK more than 2 bits corresponding to the UL DAI through the UCI piggyback on the PUSCH after rate-matching on the PUSCH. In this case, the (entire) HARQ-ACK bits may be configured in ascending (or descending) order (on a bit sequence) according to counter-DAI value order.

C. In the case of an SPS PUSCH
i. Opt. 1: The UE transmits HARQ-ACK equal to or less than 2 bits corresponding to the scheduled PDSCH through the UCI piggyback on the PUSCH after performing puncturing on the PUSCH.
1. In this case, the UE may assume the maximum HARQ-ACK payload size to be 2 bits.
2. In addition, the (entire) HARQ-ACK bits may be configured in ascending (or descending) order (on a bit sequence) according to counter-DAI value order.
ii. Opt. 2: The UE assumes 2-bit HARQ-ACK at all times regardless of the presence of the scheduled PDSCH.

D. When the PUSCH is scheduled by DCI format 0_0
i. The UE transmits HARQ-ACK corresponding to the (configured) maximum HARQ-ACK payload size through the UCI piggyback on the PUSCH
1. In this case, the (entire) HARQ-ACK bits may be configured in ascending (or descending) order (on a bit sequence) according to counter-DAI value order.
2. If the (configured) maximum HARQ-ACK payload size is equal to or less than 2 bits, the UE may perform the UCI piggyback by performing puncturing on the PUSCH. On the contrary, if the maximum HARQ-ACK payload size is more than 2 bits, the UE may perform the UCI piggyback by performing rate-matching on the PUSCH. Alternatively, the UE may perform the UCI piggyback by performing rate-matching on the PUSCH at all times (regardless of the maximum HARQ-ACK payload size).

Additionally, when two HARQ-ACK codebooks (e.g., sub-codebook A and sub-codebook B) are configured and only a single (2-bits) UL DAI exists in UL grant, the UE may transmit HARQ-ACK through UCI piggyback on the PUSCH. In this case, the UE may commonly apply the single UL DAI (field) to the two HARQ-ACK codebooks.

For example, in DL assignment (or DL scheduling DCI), two counter DAIs (e.g., counter DAI A and counter DAI B) corresponding to the two HARQ-ACK codebooks (e.g., sub-codebook A and sub-codebook B) may exist. The HARQ-ACK payload size (or sub-codebook size) for sub-codebook A may be calculated from counter DAI A and the UL DAI, and the HARQ-ACK payload size (or sub-codebook size) for sub-codebook B may be calculated from counter DAI B and the UL DAI.

Alternatively, when the UE receives that the last PDSCH scheduling order (counter) value associated with sub-codebook A is 2 or 3 and the last PDSCH scheduling order (counter) value associated with sub-codebook B is 6 or 7 (through DL assignment (or DL scheduling DCI)), if it is indicated through the single UL DAI field that the total value of PDSCH scheduling is 3 or 7, the corresponding UE may perform relevant calculation by applying total=3 to the HARQ-ACK payload size (or sub-codebook size) for sub-codebook A and total=7 to the HARQ-ACK payload size (or sub-codebook size) for sub-codebook B.

The above-described twenty-third UCI transmission method can be applied together with other proposed methods of the present invention unless they collide with each other.

3.24. Twenty-Fourth UCI Transmission Method

According to the present invention, the eNB may configure PUSCH transmission resources and periods in advance through a higher layer signal and then indicate activation or release of PUSCH transmission through DCI. For example, when the eNB instructs to activate the PUSCH transmission through the DCI, the UE performs the PUSCH transmission based on the configured transmission resources and periods. As another example, when the eNB instructs to release the PUSCH transmission through the DCI, the UE may stop the PUSCH transmission. Hereinafter, the PUSCH transmitted as described above is referred to as the semi-persistent scheduling (SPS) PUSCH.

When the UE performs UCI piggyback on the SPS PUSCH for specific UCI, the eNB may provide the following information to the UE through the DCI which activates the SPS PUSCH.

(1) UCI payload size of UCI (to be UCI-piggybacked)
(2) Beta offset value of UCI (to be UCI-piggybacked)
(3) Information on PUSCH rate-matching/puncturing (e.g., the amount of resources to be rate-matched or punctured)

In this case, the beta offset value may mean a design value used for calculating the number of coded symbols or REs used to perform UCI mapping on the PUSCH.

In addition, the above-described configuration can be applied to not only the SPS PUSCH (for UL-SCH transmission such as VoIP) but also the SPS PUSCH (for semi-persistent CSI transmission).

For example, when the UE intends to perform UCI piggyback on the SPS PUSCH, the UE may receive information on the UCI payload size of the UCI to be UCI-piggybacked through activation DCI. Thereafter, the UE may perform rate-matching or puncturing on the PUSCH based on the UCI payload size received through the DCI.

In the NR system to which the present invention is applicable, a dynamic beta-offset indication method where the beta offset value is indicated through DCI can be applied. Thus, it may be desirable that in the case of an SPS PUSCH, the eNB indicates the beta offset value applied to UCI piggyback on the SPS PUSCH through activation DCI.

The operation of providing UCI piggyback related information (e.g., UCI payload size, beta offset value, etc.) through activation DCI has an advantage of controlling the number of UCI mapping REs rapidly, compared to the case where the eNB semi-statically configures the UCI piggyback related information (e.g., UCI payload size, beta offset value, etc.) through a higher layer signal, etc. By doing so, the eNB may support the UCI piggyback more efficiently.

Additionally, when the eNB configures the beta offset value applied to SPS PUSCH transmission through a higher layer signal, the beta offset value may be configured as follows.
 1) Opt. 1: The eNB configures a single beta offset for the SPS PUSCH.
    This beta offset may be equally applied when the SPS PUSCH carries a UL-SCH (e.g., VoIP) and when the SPS PUSCH carries UCI (e.g., SP-CSI).
 2) Opt. 2: The eNB configures the beta offset by use for the SPS PUSCH.
    For example, different beta offsets may be applied according to whether the SPS PUSCH carries a UL-SCH (e.g., VoIP) or UCI (e.g., SP-CSI).

The above-described twenty-fourth UCI transmission method can be applied together with other proposed methods of the present invention unless they collide with each other.

3.25. Twenty-Fifth UCI Transmission Method

Hereinafter, it is assumed that channel state information (CSI) is divided into CSI part 1 and CSI part 2. In this case, CSI part 1 may include information such as channel quality information (CQI) (on the first transport block), and CSI part 2 may include other CSI. In this case, the UCI payload size of CSI part 1 may be fixed, and the UCI payload size of CSI part 2 may be changed and included in CSI part 1.

When the UE performs UCI piggyback on the PUSCH with respect to HARQ-ACK and CSI, the UE may perform RE mapping using the frequency-first mapping scheme based on the following resources and rules.
 (1) (UCI mapping target) time resource (symbol)
 A. Opt. 1: All OFDM symbols except DM-RS transmission symbols in the PUSCH
 B. Opt. 2: The OFDM symbols configured by the eNB (through a higher layer signal) in the PUSCH
 (2) (UCI mapping target) frequency resource (Subcarrier)
 A. Opt. 1: All subcarriers (except PT-RS transmission symbols) in the PUSCH
 B. Opt. 2: The subcarriers configured by the eNB (through a higher layer signal) in the PUSCH
 (3) (UCI mapping target) UCI mapping order between time resources
 A. Opt. 1: The order predetermined between the eNB and UE according to DM-RS patterns in the PUSCH and PUSCH duration (=the number of OFDM symbols in the PUSCH)
   i. Opt. 1-A: Ascending (or descending) order with reference to time-domain resource index (OFDM symbol index)
   ii. Opt. 1-B: The order based on priority according to the distance to a DM-RS. In this case, the priority may be determined according to the following rules.
   A. As the minimum distance between a specific symbol and a (random) DM-RS symbol decrease, the priority increase.
   B. As the OFDM symbol index of a specific symbol (in a slot) decreases, the priority increase.
 B. Opt. 2: The order configured by the eNB (through a higher layer signal)
 (4) (UCI mapping target) UCI mapping order between frequency resources in a time resource
 A. Opt. 1: Ascending (or descending) order with reference to frequency index (Subcarrier index)
 B. Opt. 2: The order between subcarriers where cluster-based permutation is applied
   i. All subcarrier resources in the PUSCH may be divided into N clusters. In this case, each subcarrier may include consecutive subcarriers and have a cluster index in accordance with ascending (or descending) order with reference to the frequency domain
   ii. The UCI mapping order between the N clusters may be determined according to specific order. For example, it may be given as follows.
   1. Opt. 2-A: In the case of N=2M, it may be given as the bit reversal permutation of 2M length.
   2. Opt. 2-B: In the case of N=4, it may be given as one of [0 1 2 3], [0 2 1 3], [0 3 1 2], [1 3 0 2], and [0 3 2 1] in terms of the cluster index.
   3. Opt. 2-C: For random N, it may be determined as follows in terms of the cluster index: 0, N−1, 1, N−2, . . . k, (N−1)-k, . . . .
   iii. The UCI mapping order between subcarriers in the cluster may be determined according to ascending (or descending) order with reference to the subcarrier index.
 (5) UCI mapping order between different types of UCI (e.g., HARQ-ACK→CSI part 1→CSI part 2)
   i. The UE may skip UCI mapping at the RE where another type of UCI is already allocated.
   ii. The order between (UCI mapping target) time resources may vary according to UCI types.
   iii. The (UCI mapping target) time resource may have a virtual time index according to the UCI mapping order, and the offset value for the virtual time index for starting UCI mapping may vary according to UCI types.

In this case, frequency-first mapping means the process where a UE performs UCI mapping on all (UCI mapping target) frequency resources in a specific (UCI mapping target) time resource, moves to the next time resource in UCI mapping order, and then performs the UCI mapping thereon.

In addition, the number of clusters or the number of subcarriers in the cluster (i.e., cluster size in the frequency domain) may be configured by the eNB through a higher layer signal.

For example, in the case of a PUSCH, all OFDM symbols except DM-RS transmission symbols in the PUSCH may be defined as (UCI mapping target) time resources, and all subcarriers except PT-RS transmission symbols in the PUSCH may be defined as (UCI mapping target) frequency resources. The UCI mapping order between (UCI mapping target) symbols may correspond to ascending order of symbol indices, and the UCI mapping order between frequency resources in a (UCI mapping target) symbol may correspond to the order between subcarriers where the cluster-based permutation is applied.

As a particular example, when option 2-C is applied, the UCI mapping order between different types of UCI may be determined as follows: HARQ-ACK→CSI part 1→CSI part 2, and data-to-RE mapping may be performed last.

Figure 41:
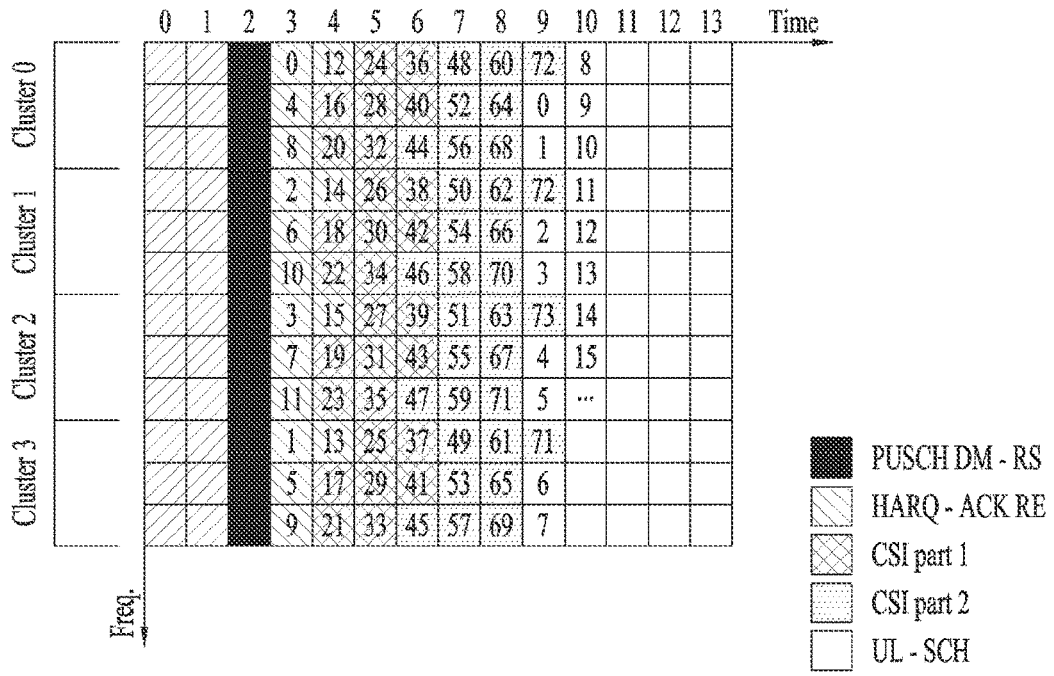
FIG. 41 is a diagram schematically illustrating the configuration of allowing a UE to perform UCI mapping in the following order: HARQ-ACK→CSI part 1→CSI part 2→data.

FIG. 41 is a diagram schematically illustrating the configuration of allowing a UE to perform UCI mapping in the following order: HARQ-ACK→CSI part 1→CSI part 2→data. In FIG. 41, the number in each RE may mean UCI-to-RE mapping priority or data-to-RE mapping (UL-SCH-to-RE mapping) priority.

Alternatively, the UCI mapping order between the (UCI mapping target) symbols may be predetermined between the eNB and UE based on DM-RS patterns in the PUSCH and PUSCH duration (=the number of OFDM symbols in the PUSCH). For example, the UCI mapping order between the symbols may be determined based on priority according to the distance to a DM-RS. In this case, as the minimum distance between a specific symbol and a (random) DM-RS symbol decrease, the priority increase. Alternatively, (in the case of symbols with the same distance to the (random) DM-RS symbol) as the OFDM symbol index (in a slot) decreases, the priority increase.

Figure 42:
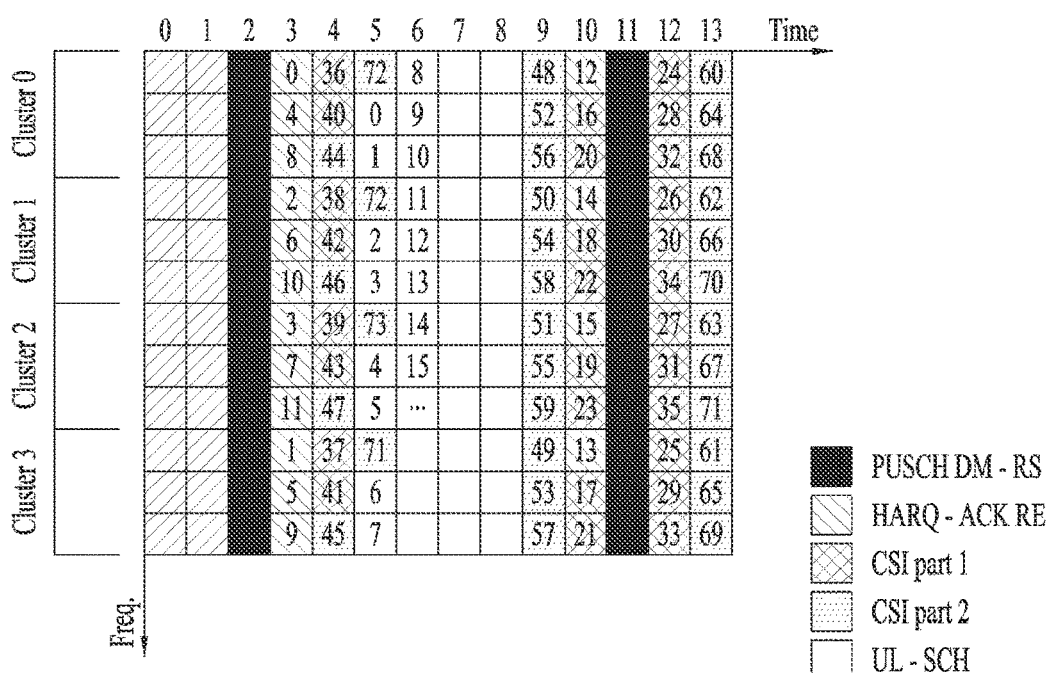
FIG. 42 is a diagram schematically illustrating UCI mapping configuration when a PUSCH has a length of twelve OFDM symbols and DM-RS symbols exist in OFDM symbols #2 and #11, respectively.

FIG. 42 is a diagram schematically illustrating UCI mapping configuration when a PUSCH has a length of twelve OFDM symbols and DM-RS symbols exist in OFDM symbols #2 and #11, respectively. As shown in FIG. 42, the UCI mapping order between (UCI mapping target) symbols may be determined as follows: 3, 10, 12, 4, 9, 13, 5, 8, 6, 7 in terms of OFDM symbol indices.

Additionally, when frequency hopping is applied to the PUSCH, coded bits of each type of UCI may be divided in two parts: UCI part 1 and UCI part 2. In this case, the UE performs UCI-to-RE mapping for UCI part 1 on the first frequency hop and performs UCI-to-RE mapping for UCI part 2 on the second frequency hop. In this case, UCI may be divided into UCI part 1 and UCI part 2 as follows.

1) Opt. 1: A method for dividing UCI into UCI part 1 and UCI part 2 such that the ratio between the number of (UCI mapping target) OFDM symbols (or UCI mapping target REs) on the first frequency hop of the PUSCH and the number of (UCI mapping target) OFDM symbols (or UCI mapping target REs) on the second frequency hop becomes identical (as much as possible) to the ratio between UCI part 1 and UCI part 2 (in terms of the number of coded bits)

2) Opt. 2: A method of dividing UCI into UCI part 1 and UCI part 2 such that the number of UL data (UL-SCH) transmission OFDM symbols (or REs) remaining after PUSCH rate-matching (or puncturing) (for UCI part 1) is performed on the first frequency hop of the PUSCH becomes identical (as much as possible) to the number of UL data (UL-SCH) transmission OFDM symbols (or REs) remaining after PUSCH rate-matching (or puncturing) (for UCI part 2) is performed on the second frequency hop (in terms of the number of coded bits)

In this case, a unified RE mapping rule may be applied to the two frequency hops. In other words, a method for mapping UCI part 1 to REs on the first frequency hop may be identical to a method for mapping UCI part 2 to REs on the second frequency hop.

In this case, (UCI mapping target) OFDM symbols in each frequency hop may mean all symbol in each frequency hop or only UCI transmission symbols (except DMRS symbols).

Specifically, when frequency hopping is applied to the PUSCH, the UE may divide coded bits of each type of UCI into two parts: UCI part 1 and UCI part 2, perform UCI-to-RE mapping for UCI part 1 on the first frequency hop, and then perform UCI-to-RE mapping for UCI part 2 on the second frequency hop (according to the same RE mapping rule as that used for CSI part 1).

However, in the NR system to which the present invention is applicable, the number of OFDM symbols (or REs) available for UCI mapping may differ in each frequency hop. Accordingly, it is desirable that when the UE divides UCI into UCI part 1 and UCI part 2, the UE divides the UCI into UCI part 1 and UCI part 2 based on the number of available REs in each frequency hop. When frequency hopping is applied to the PUSCH, the UC may divide UCI into two UCI parts according to the symbol ratio of each hop. In this case, the symbols may mean all symbols in each hop or only UCI transmission symbols (except DMRS symbols).

In the following description, a cluster-based RE mapping rule may mean that when a UE performs RE mapping on one OFDM symbol, the UE divides all frequency resources into a plurality of clusters and performs the RE mapping on a single UCI RE alternately in each cluster (according to the predetermined or preconfigured order) such that UCI is mapped to REs in ascending or descending order of frequency resource indices in each cluster (as described in section [4] of the twenty-fifth UCI transmission method).

Additionally, when the UE intends to perform UCI transmission on the PUSCH, the UE may perform UCI mapping as follows (according to whether PUSCH puncturing or PUSCH rate-matching is applied). In this case, it is assumed that the PUSCH rate-matching is applied for CSI transmission.

[1] Case 1: PUSCH puncturing (for HARQ-ACK)

A. Whether a (single) RE mapping rule is applied i. The (single) RE mapping rule is applied to HARQ-ACK, CSI part 1, CSI part 2

1. In this case, the same RE mapping rule may be a cluster-based RE mapping rule.

2. In addition, the RE mapping may be performed based on the frequency-first mapping scheme and performed (on UCI mapping target symbols) (by starting at the symbol next to the first DM-RS symbol in a slot or in each frequency hop) in ascending order of symbol indices.

B. RE mapping starting position (in each type of UCI)

i. For CSI part 1, the RE mapping is performed according to the (single) RE mapping rule by starting at the first RE in the UCI mapping order defined in the (single) RE mapping rule.

ii. For CSI part 2, the RE mapping is performed according to the (single) RE mapping rule by starting at the RE next to the last RE allocated for CSI part 1 in the (UCI mapping) order defined in the (single) RE mapping rule.

iii. For the HARQ-ACK, the RE mapping is performed according to the (single) RE mapping rule by starting at the RE next to the last RE allocated for CSI part 2 in the (UCI mapping) order defined in the (single) RE mapping rule.

Case 2: PUSCH rate-matching (for HARQ-ACK)

A. Whether a (single) RE mapping rule is applied i. The (single) RE mapping rule is applied to HARQ-ACK, CSI part 1, CSI part 2

1. In this case, the same RE mapping rule may be a cluster-based RE mapping rule.

2. In addition, the RE mapping may be performed based on the frequency-first mapping scheme and performed (on UCI mapping target symbols) (by starting at the symbol next to the first DM-RS symbol in a slot or in each frequency hop) in ascending order of symbol indices.

B. RE mapping starting position (in each type of UCI)
i. For the HARQ-ACK, the RE mapping is performed according to the (single) RE mapping rule by starting at the first RE in the UCI mapping order defined in the (single) RE mapping rule.
ii. For CSI part 1, the RE mapping is performed according to the (single) RE mapping rule by starting at the RE next to the last RE allocated for the HARQ-ACK in the (UCI mapping) order defined in the (single) RE mapping rule.
iii. For CSI part 2, the RE mapping is performed according to the (single) RE mapping rule by starting at the RE next to the last RE allocated for CSI part 1 in the (UCI mapping) order defined in the (single) RE mapping rule.

In this case, the HARQ-ACK may be transmitted by puncturing a UL-SCH region in the PUSCH.

In addition, the (OFDM) symbols for DM-RS transmission may be excluded from UCI mapping target symbols.

Figure 43:
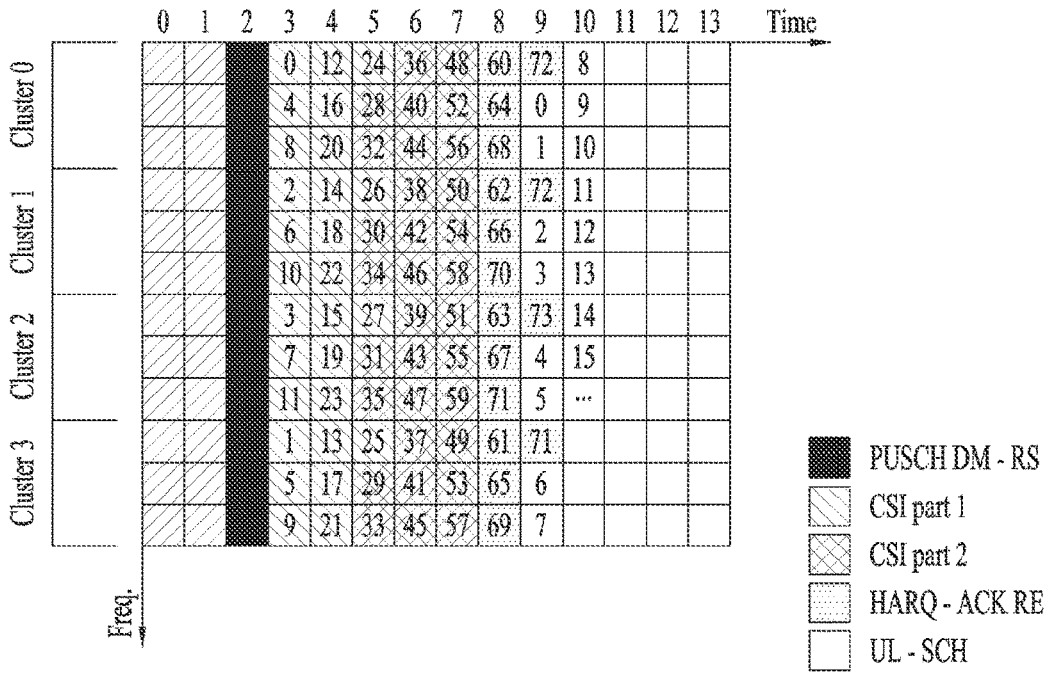
Figure 44:
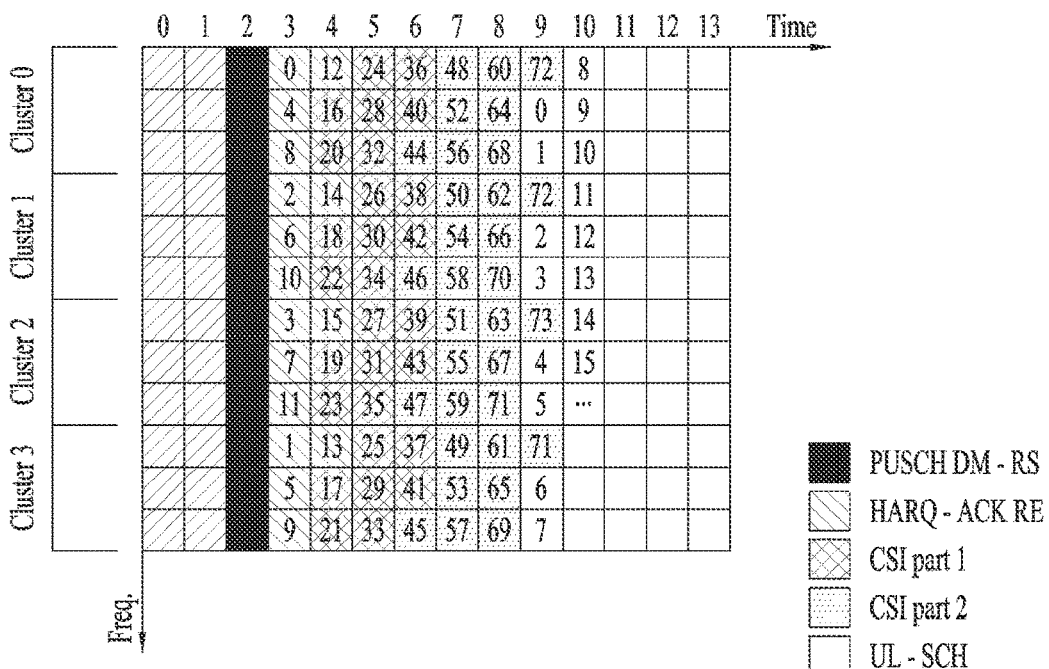

FIGS. 43 and 44 are diagrams schematically illustrating examples where PUSCH puncturing or rate-matching is applied for HARQ-ACK.

Specifically, FIG. 43 shows an example of case 1, and FIG. 44 shows an example of case 2.

Additionally, when the UE intends to perform UCI transmission on the PUSCH, the UE may perform UCI mapping as follows (according to whether PUSCH puncturing or PUSCH rate-matching is applied). In this case, it is assumed that the PUSCH rate-matching is applied for CSI transmission.

Case 3: PUSCH puncturing (for HARQ-ACK)
A. Whether a (single) RE mapping rule is applied
i. The (single) RE mapping rule is applied to HARQ-ACK, CSI part 1, CSI part 2
1. In this case, the same RE mapping rule may be a cluster-based RE mapping rule.
2. In addition, the RE mapping may be performed based on the frequency-first mapping scheme and performed (on UCI mapping target symbols) (by starting at the symbol next to the first DM-RS symbol in a slot or in each frequency hop) in ascending order of symbol indices.

B. RE mapping starting position (in each type of UCI)
i. For CSI part 1, the RE mapping is performed according to the (single) RE mapping rule by starting at the first RE in the UCI mapping order defined in the (single) RE mapping rule.
ii. For the HARQ-ACK, the RE mapping is performed according to the (single) RE mapping rule by starting at the RE next to the last RE allocated for CSI part 1 in the (UCI mapping) order defined in the (single) RE mapping rule.
iii. For CSI part 2, the RE mapping is performed according to the (single) RE mapping rule by starting at the RE next to the last RE allocated for the HARQ-ACK in the (UCI mapping) order defined in the (single) RE mapping rule.

Case 4: PUSCH rate-matching (for HARQ-ACK)
A. Whether a (single) RE mapping rule is applied
i. The (single) RE mapping rule is applied to HARQ-ACK, CSI part 1, CSI part 2
1. In this case, the same RE mapping rule may be a cluster-based RE mapping rule.
2. In addition, the RE mapping may be performed based on the frequency-first mapping scheme and performed (on UCI mapping target symbols) (by starting at the symbol next to the first DM-RS symbol in a slot or in each frequency hop) in ascending order of symbol indices.

B. RE mapping starting position (in each type of UCI)
i. For CSI part 1, the RE mapping is performed according to the (single) RE mapping rule by starting at the first RE in the UCI mapping order defined in the (single) RE mapping rule.
ii. For the HARQ-ACK, the RE mapping is performed according to the (single) RE mapping rule by starting at the RE next to the last RE allocated for CSI part 1 in the (UCI mapping) order defined in the (single) RE mapping rule.
iii. For CSI part 2, the RE mapping is performed according to the (single) RE mapping rule by starting at the RE next to the last RE allocated for the HARQ-ACK in the (UCI mapping) order defined in the (single) RE mapping rule.

In this case, the HARQ-ACK may be transmitted by puncturing a UL-SCH region in the PUSCH.

In addition, the (OFDM) symbols for DM-RS transmission may be excluded from UCI mapping target symbols.

Figures 45, 46:
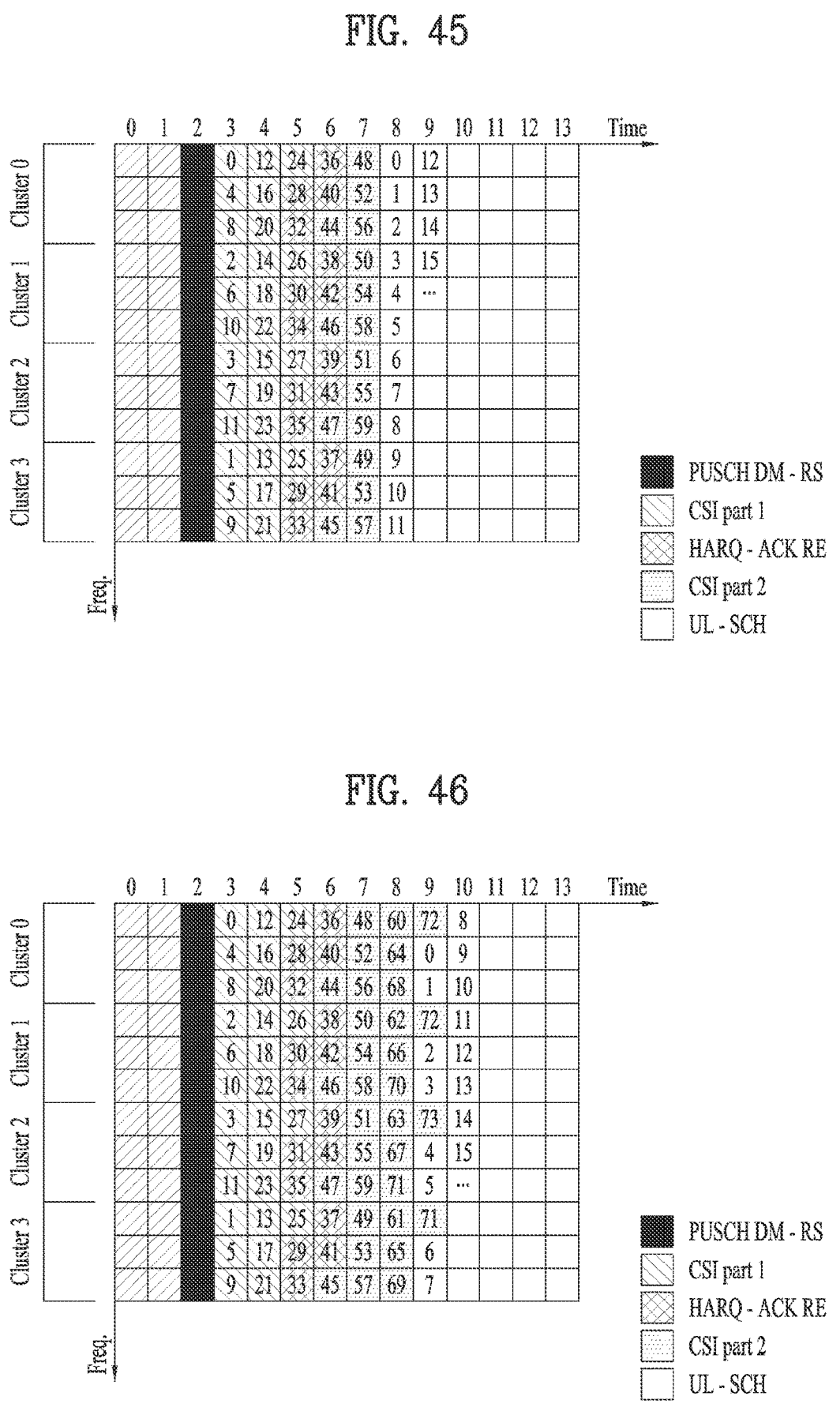

FIGS. 45 and 46 diagrams schematically illustrating different examples where PUSCH puncturing or rate-matching is applied for HARQ-ACK.

Specifically, FIG. 45 shows an example of case 3, and FIG. 46 shows an example of case 4.

Additionally, when the UE intends to perform UCI transmission on the PUSCH, the UE may perform UCI mapping as follows (according to whether PUSCH puncturing or PUSCH rate-matching is applied). In this case, it is assumed that the PUSCH rate-matching is applied for CSI transmission.

<1> Case 5: PUSCH puncturing/rate-matching (for HARQ-ACK)
A. Whether a (single) RE mapping rule is applied
i. (single) RE mapping rule A is applied to HARQ-ACK and CSI part 1.
1. In this case, RE mapping rule A may be a cluster-based RE mapping rule.
2. In addition, the RE mapping may be performed based on the frequency-first mapping scheme and performed (on UCI mapping target symbols) (by starting at the symbol next to the first DM-RS symbol in a slot or in each frequency hop) in ascending order of symbol indices.
ii. (single) RE mapping rule B is applied to CSI part 2.
1. In this case, RE mapping rule B may be a cluster-based RE mapping rule. In addition, (relative) UCI mapping order between REs in the cluster may be opposite to that of RE mapping rule A.
2. In addition, the RE mapping may be performed based on the frequency-first mapping scheme and performed (on UCI mapping target symbols) (by starting at the last symbol in the slot or frequency hop) in descending order of symbol indices (that is, it may be opposite to that of RE mapping rule A in the time domain).

B. RE mapping starting position (in each type of UCI)
i. For CSI part 1, the RE mapping is performed according to (single) RE mapping rule A by starting at the first RE in the UCI mapping order defined in (single) RE mapping rule A.
ii. For the HARQ-ACK, the RE mapping is performed according to (single) RE mapping rule A by starting at the RE next to the last RE allocated for CSI part 1 in the (UCI mapping) order defined in (single) RE mapping rule A.

iii. For CSI part 2, the RE mapping is performed according to (single) RE mapping rule B by starting at the first RE in the UCI mapping order defined in (single) RE mapping rule B.

In this case, the HARQ-ACK may be transmitted by puncturing a UL-SCH region and/or a CSI region (e.g., CSI part 2) in the PUSCH.

In addition, the (OFDM) symbols for DM-RS transmission may be excluded from UCI mapping target symbols.

Figure 47:
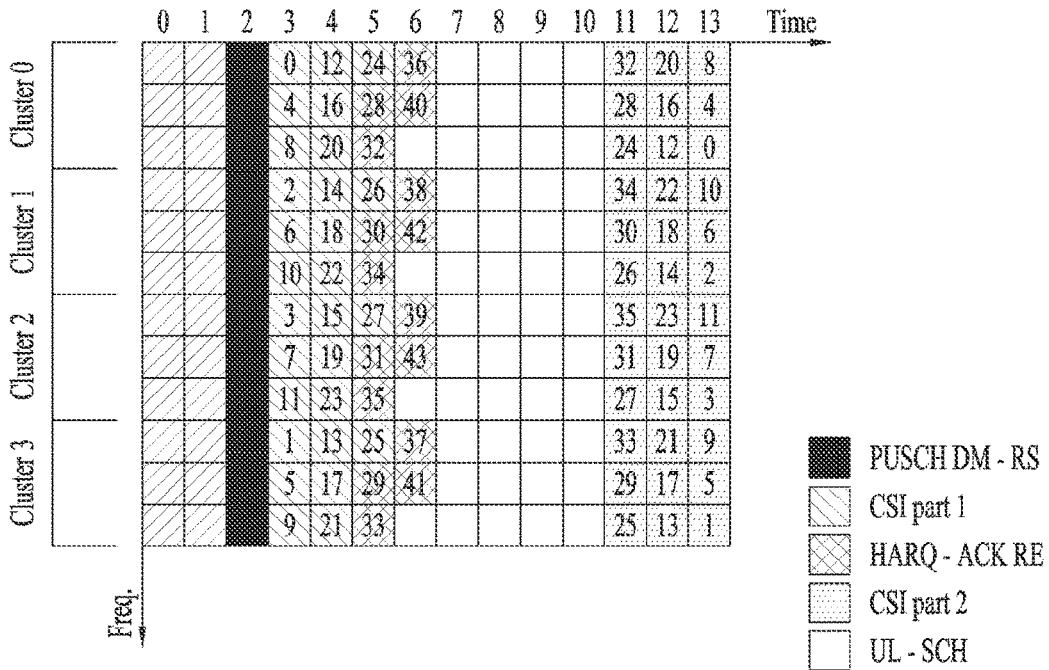

FIG. 47 is a diagram schematically illustrating another example where PUSCH puncturing or rate-matching is applied for HARQ-ACK.

Specifically, FIG. 47 shows an example of case 5.

Additionally, when the UE intends to perform UCI transmission on the PUSCH, the UE may perform UCI mapping as follows (according to whether PUSCH puncturing or PUSCH rate-matching is applied). In this case, it is assumed that the PUSCH rate-matching is applied for CSI transmission.

1> Case 6: PUSCH puncturing/rate-matching (for HARQ-ACK)

A. Whether a (single) RE mapping rule is applied i. (single) RE mapping rule A is applied to HARQ-ACK.
1. In this case, RE mapping rule A may be a cluster-based RE mapping rule.
2. In addition, the RE mapping may be performed based on the frequency-first mapping scheme and performed (on UCI mapping target symbols) (by starting at the symbol next to the first DM-RS symbol in a slot or in each frequency hop) in ascending order of symbol indices.

ii. (single) RE mapping rule B is applied to CSI part 1 and CSI part 2.
1. In this case, RE mapping rule B may be a cluster-based RE mapping rule. In addition, (relative) UCI mapping order between REs in the cluster may be opposite to that of RE mapping rule A. For example, if (relative) UCI mapping order between REs in the cluster according to RE mapping rule A is ascending (or descending) order of frequency resource (e.g., subcarrier) indices, the (relative) UCI mapping order between the REs in the cluster according to RE mapping rule B may be descending (or ascending) order of frequency resource indices.
2. In addition, the RE mapping may be performed based on the frequency-first mapping scheme and performed (on UCI mapping target symbols) (by starting at the last symbol in the slot or frequency hop) in descending order of symbol indices (alternatively, it may be opposite to the time-domain UCI mapping order (between UCI mapping target symbols) defined in RE mapping rule A).

B. RE mapping starting position (in each type of UCI)
i. For the HARQ-ACK, the RE mapping is performed according to (single) RE mapping rule A by starting at the first RE in the UCI mapping order defined in (single) RE mapping rule A.
ii. For CSI part 2, the RE mapping is performed according to (single) RE mapping rule B by starting at the first RE in the UCI mapping order defined in (single) RE mapping rule B.
iii. For CSI part 1, the RE mapping is performed according to (single) RE mapping rule B by starting at the RE next to the last RE allocated for CSI part 2 in the (UCI mapping) order defined in (single) RE mapping rule B.

In this case, the HARQ-ACK may be transmitted by puncturing a UL-SCH region and/or a CSI region (e.g., CSI part 2) in the PUSCH.

In addition, the (OFDM) symbols for DM-RS transmission may be excluded from UCI mapping target symbols.

Figure 48:
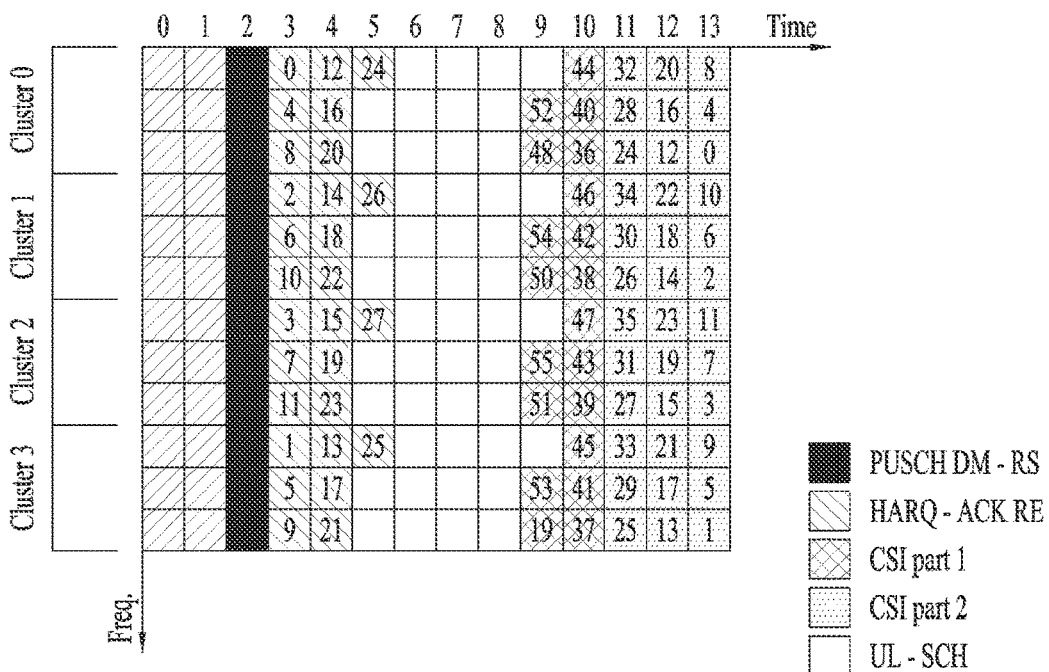

FIG. 48 is a diagram schematically illustrating a further example where PUSCH puncturing or rate-matching is applied for HARQ-ACK.

Specifically, FIG. 48 shows an example of case 6.

Additionally, when the UE intends to perform UCI transmission on the PUSCH, the UE may perform UCI mapping as follows (regardless of whether PUSCH puncturing or PUSCH rate-matching is applied). In this case, it is assumed that the PUSCH rate-matching is applied for CSI transmission.

{1} Case 7: PUSCH puncturing/rate-matching (for HARQ-ACK)

A. Whether a (single) RE mapping rule is applied
i. (single) RE mapping rule A is applied to HARQ-ACK.
1. In this case, RE mapping rule A may be a cluster-based RE mapping rule.
2. In addition, the RE mapping may be performed based on the frequency-first mapping scheme and performed (on UCI mapping target symbols) (by starting at the symbol next to the first DM-RS symbol in a slot or in each frequency hop) in ascending order of symbol indices.

ii. (single) RE mapping rule B is applied to CSI part 1 and CSI part 2.
1. In this case, RE mapping rule B may be a cluster-based RE mapping rule. In addition, (relative) UCI mapping order between REs in the cluster may be opposite to that of RE mapping rule A. For example, if (relative) UCI mapping order between REs in the cluster according to RE mapping rule A is ascending (or descending) order of frequency resource (e.g., subcarrier) indices, the (relative) UCI mapping order between the REs in the cluster according to RE mapping rule B may be descending (or ascending) order of frequency resource indices.
2. In addition, the RE mapping may be performed based on the frequency-first mapping scheme and performed (on UCI mapping target symbols) (by starting at the last symbol in the slot or frequency hop) in descending order of symbol indices (alternatively, it may be opposite to the time-domain UCI mapping order (between UCI mapping target symbols) defined in RE mapping rule A).

B. RE mapping starting position (in each type of UCI)
i. For the HARQ-ACK, the RE mapping is performed according to (single) RE mapping rule A by starting at the first RE in the UCI mapping order defined in (single) RE mapping rule A.
ii. For CSI part 1, the RE mapping is performed according to (single) RE mapping rule B by starting at the first RE in the UCI mapping order defined in (single) RE mapping rule B.
iii. For CSI part 2, the RE mapping is performed according to (single) RE mapping rule B by starting at the RE next to the last RE allocated for CSI part 1 in the (UCI mapping) order defined in (single) RE mapping rule B.

In this case, the HARQ-ACK may be transmitted by puncturing a UL-SCH region and/or a CSI region (e.g., CSI part 2) in the PUSCH.

In addition, the (OFDM) symbols for DM-RS transmission may be excluded from UCI mapping target symbols.

Figure 49:
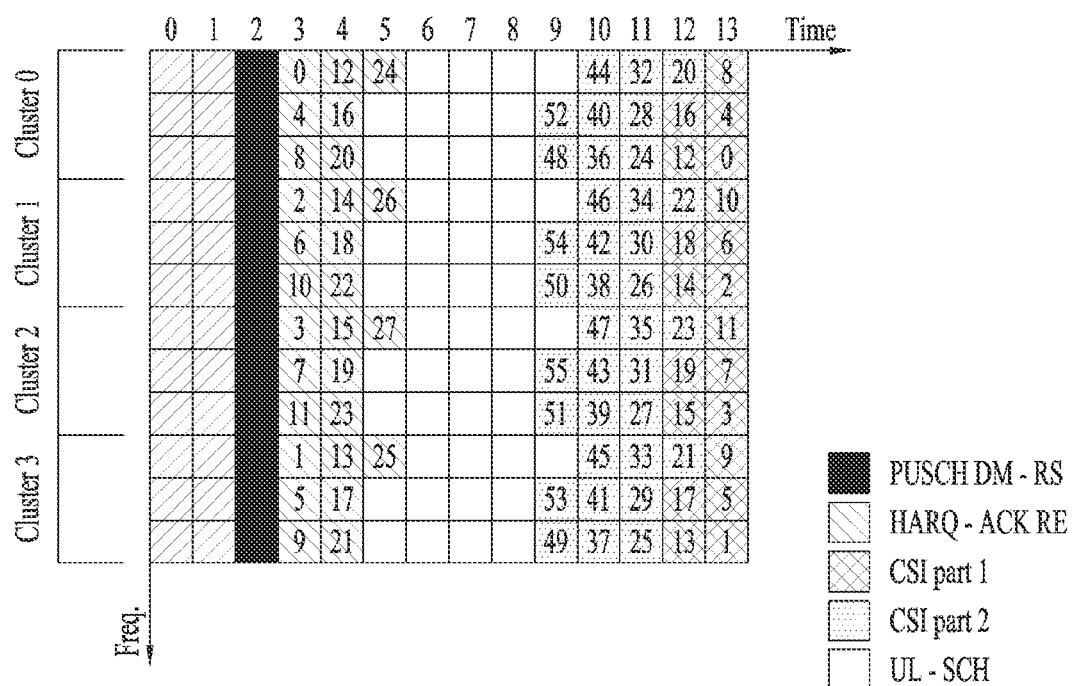

FIG. 49 is a diagram schematically illustrating still a further example where PUSCH puncturing or rate-matching is applied for HARQ-ACK.

Specifically, FIG. 49 shows an example of case 7.

In case 6 or case 7 mentioned in the foregoing description, although the UE applies the same (cluster-based) RE mapping rule (based on the frequency-first mapping scheme) to HARQ-ACK and CSI (e.g., CSI part 1 and CSI part 2), the UE may apply different RE mapping rules to (1) UCI mapping order between symbols and/or (2) (relative) RE mapping order in the cluster (e.g., RE mapping rule A for HARQ-ACK and RE mapping rule B for CSI) (here, RE mapping rules A and B may differ only in (1) the UCI mapping order between the symbols and/or (2) the (relative) RE mapping order in the cluster).

Alternatively, when frequency hopping is applied, code bits of every type of UCI may be divided into two parts. In this case, the RE mapping described above with reference to cases 1 to 6 may be applied per UCI part (in a frequency hop) to each frequency hop (that is, the same RE mapping rule may be applied to each frequency hop).

Figure 50:
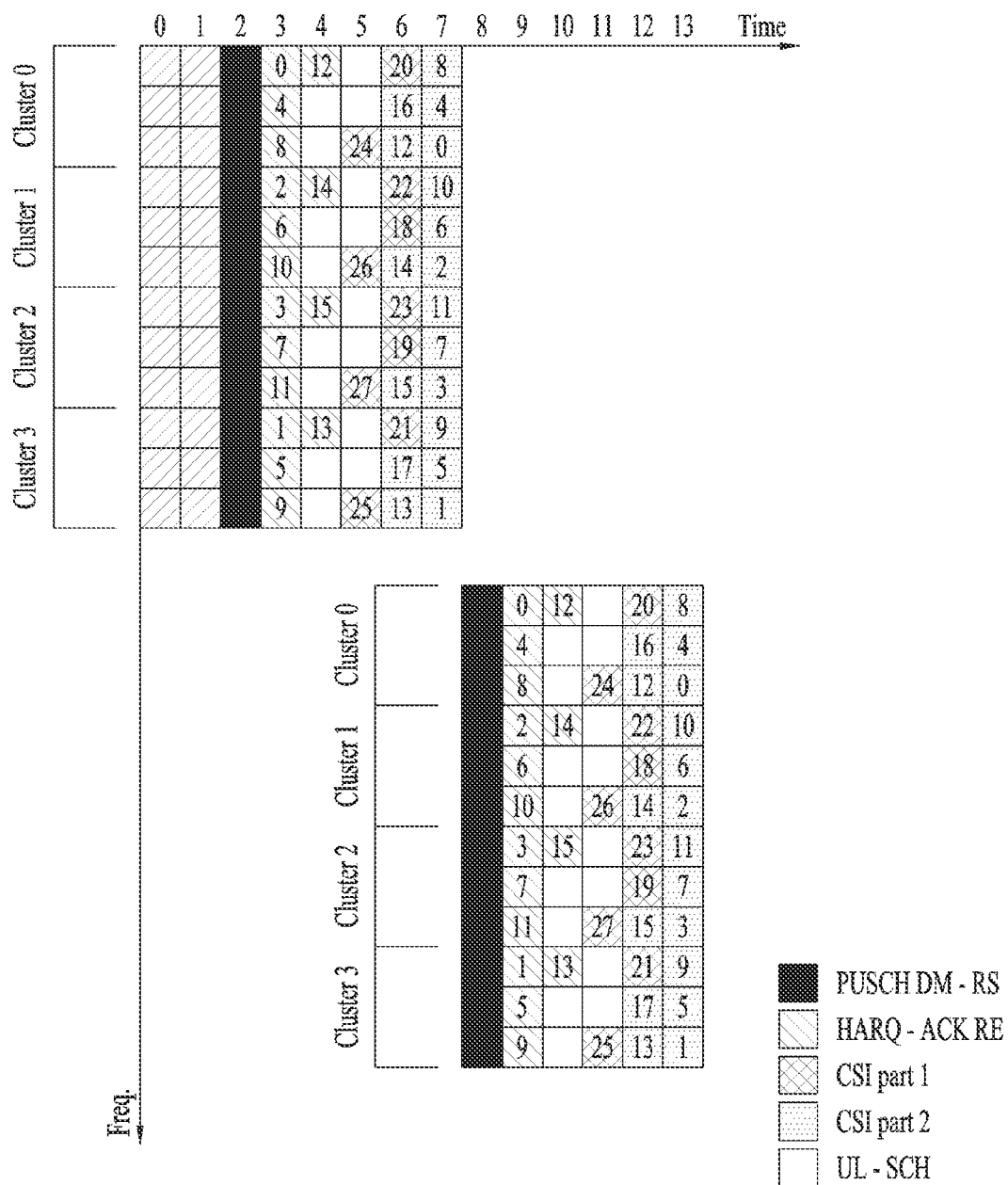
FIG. 50 is a diagram schematically illustrating UCI mapping according to the present invention when the method in case 6 is applied to each frequency hop.

FIG. 50 is a diagram schematically illustrating UCI mapping according to the present invention when the method in case 6 is applied to each frequency hop Additionally, when the UE transmits UCI on the PUSCH, the eNB may configure, for the UE, a (maximum) coding rate (in each type of UCI) through DCI and/or a higher layer signal. In this case, if the number of (UCI mapping) REs, which is calculated based on the beta offset, and the coding rate, which is calculated based on the UCI payload size, exceeds the configured (maximum) coding rate, the UE may drop transmission of a corresponding type of UCI.

In this case, the maximum number of REs for HARQ-ACK transmission may be equal to the total number of (UCI mapping target) REs in the PUSCH (or the number of specific REs in proportion to PUSCH duration). In addition, the maximum number of REs for CSI part 1 transmission may be obtained by subtracting the number of REs allocated for HARQ-ACK transmission from the total number of (UCI mapping target) REs in the PUSCH, and the maximum number of REs for CSI part 2 transmission may be obtained by subtracting both the number of REs allocated for HARQ-ACK transmission and the number of REs allocated for the CSI part 1 transmission from the total number of (UCI mapping target) REs in the PUSCH.

The above-described twenty-fifth UCI transmission method can be applied together with other proposed methods of the present invention unless they collide with each other.

Figure 51:
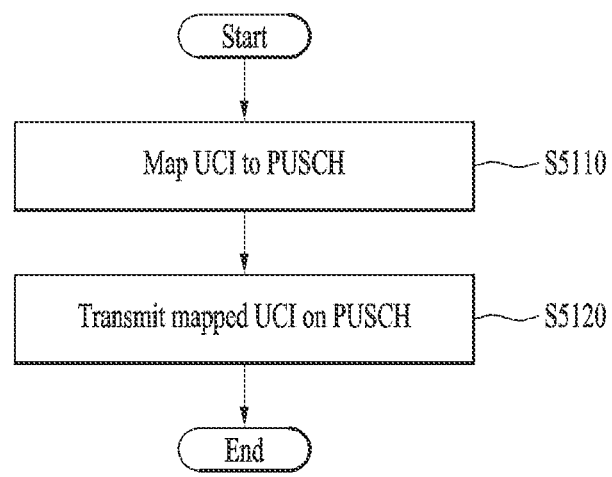
FIG. 51 is a flowchart schematically illustrating a UCI transmission method applicable to the present invention.

FIG. 51 is a flowchart schematically illustrating a UCI transmission method applicable to the present invention.

As shown in FIG. 51, a UE maps uplink control information (UCI) to a physical uplink shared channel (PUSCH) [S5110]. This mapping operation can be named UCI piggyback.

In this case, the UE may perform rate-matching or puncturing based on size included in the UCI in order to map acknowledgement information to the PUSCH. In other words, the acknowledgement information included in the UCI may be mapped to the PUSCH by applying the rate-matching or the puncturing to resources for transmitting the acknowledgement information on the PUSCH based on the size of the acknowledgement information.

As a preferred example, when the size of the acknowledgement information is more than a predetermined value, the UE may perform the rate-matching on the resources for transmitting the acknowledgement information in the PUSCH in order to map the acknowledgement information to the PUSCH. On the other hand, when the size of the acknowledgement information is equal to or less than the predetermined value, the UE may perform the puncturing on the resources for transmitting the acknowledgement information in the PUSCH in order to map the acknowledgement information to the PUSCH. In this case, the predetermined value may be 2 bits.

In this case, the acknowledgement information may not be mapped to a symbol before a symbol in which a first demodulation reference signal (DM-RS) is transmitted in the PUSCH. In this case, the first DM-RS may mean a DM-RS located at the first symbol in the PUSCH.

Additionally, the UCI may further include channel state information (CSI). In this case, the UE may perform the rate-matching on resources for transmitting the CSI in the PUSCH in order to map the CSI to the PUSCH. In other words, the CSI may be mapped to the PUSCH by applying the rate-matching to the resources for transmitting the CSI on the PUSCH.

In this case, the CSI may be mapped to resources except a predetermined amount of resources reserved for the acknowledgement information in the PUSCH. In this case, the predetermined amount of the resources may be resources corresponding to 2 bits.

Next, the UE may determine the size of the acknowledgement information based on an uplink downlink assignment index (DAI) value in uplink grant received from the eNB.

In addition, the UE may determine the amount of the resources for transmitting the acknowledgement information in the PUSCH based on a specific beta parameter. In this case, the specific beta parameter may be indicated according to the following method.

First, a plurality of sets may be configured through higher layer signaling. Thereafter, the eNB may indicate one set among the plurality of sets via uplink grant. In this case, the UE may determine the amount of the resources for transmitting the acknowledgement information based on one beta parameter, which is determined based on the size of the acknowledgement information, among a plurality of beta parameters included in the one set indicated by the uplink grant.

In addition, the UE may map part or all of the UCI to a DM-RS in the PUSCH. To this end, the UE may receive a DM-RS symbol where the UCI can be mapped and/or interlace resource information in the symbol from the eNB.

Additionally, when the PUSCH is a semi persistence scheduling (SPS) PUSCH, the UE may perform the rate-matching or puncturing based on maximum UCI payload dedicated to the SPS PUSCH. In this case, the UE may separately receive information on the maximum UCI payload dedicated to the SPS PUSCH from the eNB Further, when the PUSCH is a semi persistence scheduling (SPS) PUSCH, the UE may perform the rate-matching or puncturing based on a beta offset value included in downlink control information that activates the SPS PUSCH.

After mapping the UCI to the PUSCH as described above, the UE transmits the mapped UCI on the PUSCH [S5110].

Since each embodiment of the above-described proposed method can be considered as one method for implementing the present invention, it is apparent that each embodiment can be regarded as a proposed method. In addition, the present invention can be implemented not only using the proposed methods independently but also by combining (or merging) some of the proposed methods. In addition, it is possible to define a rule that information on whether the proposed methods are applied (or information on rules related to the proposed methods) should be transmitted from the eNB to the UE through a predefined signal (e.g., physical layer signal, higher layer signal, etc.).

4. Device Configuration

Figure 52:
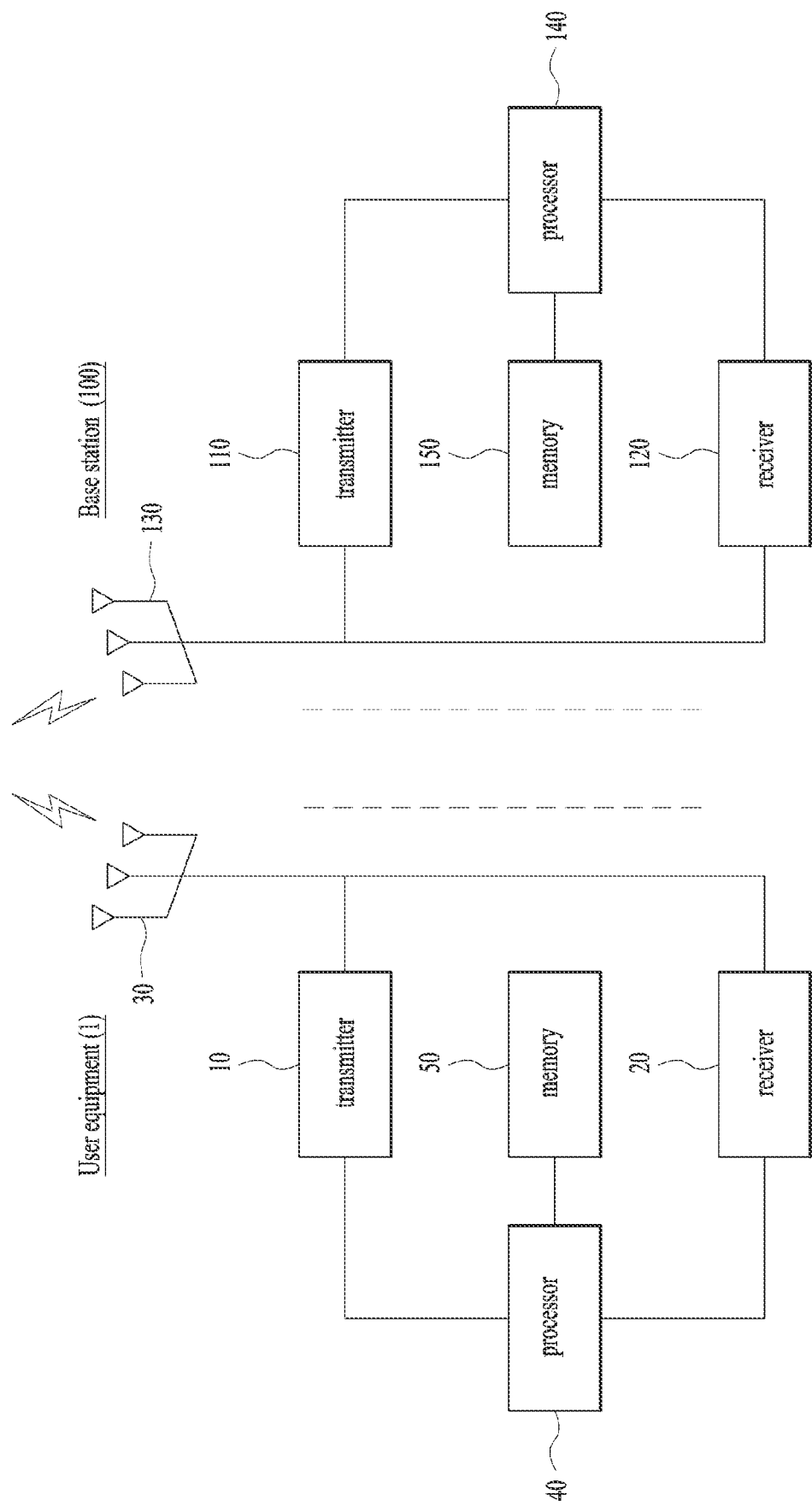
FIG. 52 is a diagram illustrating configuration of a user equipment and a base station for implementing the proposed embodiments.

FIG. 52 is a diagram illustrating configurations of a UE and a base station capable of being implemented by the embodiments proposed in the present invention. The UE and the base station shown in FIG. 52 operate to implement the embodiments for a method of transmitting and receiving an uplink control information between the base station and the UE.

A UE 1 may act as a transmission end on a UL and as a reception end on a DL. A base station (eNB or gNB) 100 may act as a reception end on a UL and as a transmission end on a DL.

That is, each of the UE and the base station may include a Transmitter (Tx) 10 or 110 and a Receiver (Rx) 20 or 120, for controlling transmission and reception of information, data, and/or messages, and an antenna 30 or 130 for transmitting and receiving information, data, and/or messages.

Each of the UE and the base station may further include a processor 40 or 140 for implementing the afore-described embodiments of the present disclosure and a memory 50 or 150 for temporarily or permanently storing operations of the processor 40 or 140.

With the above-described configuration, the UE 1 maps uplink control information to a physical uplink shared channel (PUSCH) through the processor 40. In this case, acknowledgement information included in the uplink control information may be mapped to the PUSCH by applying rate-matching or puncturing to resources for transmitting the acknowledgement information on the PUSCH based on size of the acknowledgement information.

Thereafter, the UE 1 transmits the mapped uplink control information on the PUSCH through the transmitter 10.

The Tx and Rx of the UE and the base station may perform a packet modulation/demodulation function for data transmission, a high-speed packet channel coding function, OFDM packet scheduling, TDD packet scheduling, and/or channelization. Each of the UE and the base station of FIG. 52 may further include a low-power Radio Frequency (RF)/Intermediate Frequency (IF) module.

Meanwhile, the UE may be any of a Personal Digital Assistant (PDA), a cellular phone, a Personal Communication Service (PCS) phone, a Global System for Mobile (GSM) phone, a Wideband Code Division Multiple Access (WCDMA) phone, a Mobile Broadband System (MBS) phone, a hand-held PC, a laptop PC, a smart phone, a Multi Mode-Multi Band (MM-MB) terminal, etc.

The smart phone is a terminal taking the advantages of both a mobile phone and a PDA. It incorporates the functions of a PDA, that is, scheduling and data communications such as fax transmission and reception and Internet connection into a mobile phone. The MB-MM terminal refers to a terminal which has a multi-modem chip built therein and which can operate in any of a mobile Internet system and other mobile communication systems (e.g. CDMA 2000, WCDMA, etc.).

Embodiments of the present disclosure may be achieved by various means, for example, hardware, firmware, software, or a combination thereof.

In a hardware configuration, the methods according to exemplary embodiments of the present disclosure may be achieved by one or more Application Specific Integrated Circuits (ASICs), Digital Signal Processors (DSPs), Digital Signal Processing Devices (DSPDs), Programmable Logic Devices (PLDs), Field Programmable Gate Arrays (FPGAs), processors, controllers, microcontrollers, microprocessors, etc.

In a firmware or software configuration, the methods according to the embodiments of the present disclosure may be implemented in the form of a module, a procedure, a function, etc. performing the above-described functions or operations. A software code may be stored in the memory 50 or 150 and executed by the processor 40 or 140. The memory is located at the interior or exterior of the processor and may transmit and receive data to and from the processor via various known means.

Those skilled in the art will appreciate that the present disclosure may be carried out in other specific ways than those set forth herein without departing from the spirit and essential characteristics of the present disclosure. The above embodiments are therefore to be construed in all aspects as illustrative and not restrictive. The scope of the disclosure should be determined by the appended claims and their legal equivalents, not by the above description, and all changes coming within the meaning and equivalency range of the appended claims are intended to be embraced therein. It is obvious to those skilled in the art that claims that are not explicitly cited in each other in the appended claims may be presented in combination as an embodiment of the present disclosure or included as a new claim by a subsequent amendment after the application is filed.

INDUSTRIAL APPLICABILITY

The present disclosure is applicable to various wireless access systems including a 3GPP system, and/or a 3GPP2 system. Besides these wireless access systems, the embodiments of the present disclosure are applicable to all technical fields in which the wireless access systems find their applications. Moreover, the proposed method can also be applied to mmWave communication using an ultra-high frequency band.

What is claimed is:

1. A method of transmitting a physical uplink shared channel (PUSCH) by a user equipment (UE) in a wireless communication system, the method comprising:
   multiplexing uplink data and uplink control information (UCI) including Hybrid Automatic Repeat Request-Acknowledgement (HARQ-ACK) information onto the PUSCH,
   wherein, based on a bit size of the HARQ-ACK information being equal to or less than 2 bits, the HARQ-ACK information is multiplexed onto the PUSCH by a first method, and
   wherein, based on the bit size of the HARQ-ACK information being more than 2 bits, the HARQ-ACK information is multiplexed onto the PUSCH by a second method,
   wherein a number of coded modulation symbols for the HARQ-ACK information is determined based on a beta offset value and the bit size of the HARQ-ACK information; and
   transmitting the PUSCH,
   wherein the beta offset value is determined based on the bit size of the HARQ-ACK information among beta offset values included in a beta offset set, and wherein the beta offset set is determined based on a beta offset indicator included in downlink control information among a plurality of beta offset sets configured via a higher layer signaling, each beta offset set including a plurality of beta offset values.

2. The method of claim 1, wherein the HARQ-ACK information is not multiplexed onto any symbol before a symbol where a first demodulation reference signal (DM-RS) is transmitted on the PUSCH.

3. The method of claim 1, further comprising:
receiving an uplink grant including an uplink downlink assignment index (DAI) value,
wherein the bit size of the HARQ-ACK is determined based on the DAI value.

4. The method of claim 1,
wherein, based on the PUSCH being a semi-persistently scheduled PUSCH, the first or second method is performed based on maximum UCI payload dedicated to the semi-persistently scheduled PUSCH.

5. The method of claim 1,
wherein, based on the PUSCH being a semi-persistently scheduled PUSCH, the downlink control information is downlink control information which activates the semi-persistently scheduled PUSCH.

6. The method of claim 1, wherein, based on the PUSCH being a semi-persistently scheduled PUSCH, beta offset sets configured for semi-persistently scheduled PUSCH transmissions are used as the plurality of beta offset sets, and
wherein, based on the PUSCH being not a semi-persistently scheduled PUSCH, beta offset sets configured for non-semi-persistently scheduled PUSCH transmissions are used as the plurality of beta offset sets.

7. The method of claim 1, wherein the first method is puncturing, and the second method is rate-matching.

8. The method of claim 1, wherein the first method comprises multiplexing M coded bits of the HARQ-ACK information onto the PUSCH by puncturing M coded data bits on the PUSCH, and
wherein the second method comprises multiplexing the M coded bits of the HARQ-ACK information onto the PUSCH by not puncturing coded data bits on the PUSCH but by multiplexing, onto the PUSCH, N coded bits obtained by combining the M coded bits of the HARQ-ACK information and (N−M) coded bits of uplink data.

9. A user equipment (UE) configured to transmit a physical uplink shared channel (PUSCH) in a wireless communication system, the UE comprising:
at least one transceiver;
at least one processor; and
a memory storing instructions that cause the at least one processor to perform operations comprising:
multiplexing uplink data and uplink control information (UCI) including Hybrid Automatic Repeat Request-Acknowledgement (HARQ-ACK) information onto the PUSCH,
wherein, based on a bit size of the HARQ-ACK information being equal to or less than 2 bits, the HARQ-ACK information is multiplexed onto the PUSCH by a first method,
wherein, based on the bit size of the HARQ-ACK information being more than 2 bits, the HARQ-ACK information is multiplexed onto the PUSCH by a second method,
wherein a number of coded modulation symbols for the HARQ-ACK information is determined based on a beta offset value and the bit size of the HARQ-ACK information; and
transmitting the PUSCH,
wherein the beta offset value is determined based on the bit size of the HARQ-ACK information among beta offset values included in a beta offset set, and
wherein the beta offset set is determined based on a beta offset indicator included in downlink control information among a plurality of beta offset sets configured via a higher layer signaling, each beta offset set including a plurality of beta offset values.

10. The UE of claim 9,
wherein the HARQ-ACK information is not multiplexed onto any symbol before a symbol where a first demodulation reference signal (DM-RS) is transmitted on the PUSCH.

11. The UE of claim 9, wherein the operations further comprise:
receiving an uplink grant including an uplink downlink assignment index (DAI) value,
wherein the bit size of the HARQ-ACK information is determined based on the DAI value.

12. The UE of claim 9,
wherein a part or all of the UCI is multiplexed onto resources in a symbol where a demodulation reference signal (DM-RS) is transmitted on the PUSCH.

13. The UE of claim 9,
wherein, based on the PUSCH being a semi-persistently scheduled PUSCH, the first or second method is performed based on maximum UCI payload dedicated to the semi-persistently scheduled PUSCH.

14. The UE of claim 9,
wherein, based on the PUSCH being a semi-persistently scheduled PUSCH, the downlink control information is downlink control information which activates the semi-persistently scheduled PUSCH.

15. The UE of claim 9, wherein, based on the PUSCH being a semi-persistently scheduled PUSCH, beta offset sets configured for semi-persistently scheduled PUSCH transmissions are used as the plurality of beta offset sets, and
wherein, based on the PUSCH being not a semi-persistently scheduled PUSCH, beta offset sets configured for non-semi-persistently scheduled PUSCH transmissions are used as the plurality of beta offset sets.

16. The UE of claim 9, wherein the first method is puncturing, and the second method is rate-matching.

17. The UE of claim 9, wherein the first method comprises multiplexing M coded bits of the HARQ-ACK information onto the PUSCH by puncturing M coded data bits on the PUSCH, and
wherein the second method comprises multiplexing the M coded bits of the HARQ-ACK information onto the PUSCH by not puncturing coded data bits on the PUSCH but by multiplexing, onto the PUSCH, N coded bits obtained by combining the M coded bits of the HARQ-ACK information and (N−M) coded bits of uplink data.

18. A base station (BS) configured to receive a physical uplink shared channel (PUSCH) from a user equipment (UE) in a wireless communication system, the BS comprising:
  at least one transceiver;
  at least one processor; and
  a memory storing instructions that cause the at least one processor to perform operations comprising:
  receiving the PUSCH; and
  obtaining multiplexed uplink data and uplink control information (UCI) including Hybrid Automatic Repeat Request-Acknowledgement (HARQ-ACK) information based on the PUSCH,
  wherein, based on a bit size of the HARQ-ACK information being equal to or less than 2 bits, the HARQ-ACK information is multiplexed onto the PUSCH by a first method,
  wherein, based on the bit size of the HARQ-ACK information being more than 2 bits, the HARQ-ACK information is multiplexed onto the PUSCH by a second method,
  wherein a number of coded modulation symbols for the HARQ-ACK information is determined based on a beta offset value and the bit size of the HARQ-ACK information,
  wherein the beta offset value is determined based on the bit size of the HARQ-ACK information among beta offset values included in a beta offset set, and
  wherein the beta offset set is determined based on a beta offset indicator included in downlink control information among a plurality of beta offset sets configured via a higher layer signaling, each beta offset set including a plurality of beta offset values.

19. The BS of claim 18, wherein the first method is puncturing, and the second method is rate-matching.

20. The BS of claim 18, wherein the first method comprises multiplexing M coded bits of the HARQ-ACK information onto the PUSCH by puncturing M coded data bits on the PUSCH, and
  wherein the second method comprises multiplexing the M coded bits of the HARQ-ACK information onto the PUSCH by not puncturing coded data bits onto the PUSCH but by multiplexing, onto the PUSCH, N coded bits obtained by combining the M coded bits of the HARQ-ACK information and (N−M) coded bits of uplink data.

* * * * *